US008533803B2

(12) United States Patent
Cha et al.

(10) Patent No.: US 8,533,803 B2
(45) Date of Patent: Sep. 10, 2013

(54) METHOD AND APPARATUS FOR TRUSTED FEDERATED IDENTITY

(75) Inventors: Inhyok Cha, Yardley, PA (US); Andreas Schmidt, Frankfurt am Main (DE); Andreas Leicher, Frankfurt (DE); Yogendra C. Shah, Exton, PA (US); Louis J. Guccione, East Chester, NY (US); Dolores F. Howry, Malvern, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 205 days.

(21) Appl. No.: 13/023,985

(22) Filed: Feb. 9, 2011

(65) Prior Publication Data
US 2012/0072979 A1 Mar. 22, 2012

Related U.S. Application Data

(60) Provisional application No. 61/396,602, filed on May 28, 2010, provisional application No. 61/302,890, filed on Feb. 9, 2010.

(51) Int. Cl.
*G06F 7/04* (2006.01)
*H04L 29/06* (2006.01)
*G06F 17/30* (2006.01)

(52) U.S. Cl.
USPC .................................................. 726/8; 726/7

(58) Field of Classification Search
USPC ......................................................... 726/7, 8
See application file for complete search history.

(56) References Cited

U.S. PATENT DOCUMENTS

| 5,590,199 A | 12/1996 | Krajewski et al. |
| 8,275,985 B1 * | 9/2012 | Narayanan et al. ........... 713/160 |
| 2001/0045451 A1 * | 11/2001 | Tan et al. ...................... 235/375 |
| 2005/0105734 A1 | 5/2005 | Buer et al. |
| 2006/0155993 A1 * | 7/2006 | Busboon ........................ 713/169 |
| 2006/0251257 A1 * | 11/2006 | Haverinen et al. ............ 380/270 |
| 2007/0056025 A1 * | 3/2007 | Sachdeva et al. ................. 726/5 |
| 2007/0266256 A1 | 11/2007 | Shah et al. |
| 2008/0059804 A1 * | 3/2008 | Shah et al. .................... 713/186 |

(Continued)

FOREIGN PATENT DOCUMENTS
WO WO 2008/024454 A1 2/2008

OTHER PUBLICATIONS

Abe, Tsuyoshi et al. "Implementing Identity Provider on Mobile Phone", 2007.*

(Continued)

*Primary Examiner* — Michael Simitoski
(74) *Attorney, Agent, or Firm* — Woodcock Washburn LLP

(57) ABSTRACT

A trusted computing environment, such as a smartcard, UICC, Java card, global platform, or the like may be used as a local host trust center and a proxy for a single-sign on (SSO) provider. This may be referred to as a local SSO provider (OP). This may be done, for example, to keep authentication traffic local and to prevent over the air communications, which may burden an operator network. To establish the OP proxy in the trusted environment, the trusted environment may bind to the SSO provider in a number of ways. For example, the SSO provider may interoperate with UICC-based UE authentication or GBA. In this way, user equipment may leverage the trusted environment in order to provide increased security and reduce over the air communications and authentication burden on the OP or operator network.

43 Claims, 50 Drawing Sheets

(56) References Cited

U.S. PATENT DOCUMENTS

| | | | |
|---|---|---|---|
| 2009/0013391 A1* | 1/2009 | Ernst | 726/6 |
| 2010/0217799 A1* | 8/2010 | Heider et al. | 709/203 |
| 2011/0030043 A1* | 2/2011 | Jones et al. | 726/7 |
| 2011/0067095 A1* | 3/2011 | Leicher et al. | 726/10 |
| 2011/0083169 A1* | 4/2011 | Moeller et al. | 726/5 |
| 2011/0213959 A1* | 9/2011 | Bodi et al. | 713/155 |
| 2011/0283337 A1* | 11/2011 | Schatzmayr | 726/3 |
| 2011/0289567 A1* | 11/2011 | Bauer-Hermann et al. | 726/6 |
| 2011/0302627 A1* | 12/2011 | Blom et al. | 726/2 |

OTHER PUBLICATIONS

Alsaleh, Mansour and Carlisle Adams. "Enhancing Consumer Privacy in the Liberty Alliance Identity Federation and Web Services Frameworks", 2006.*
Cahill, Conor P. et al. "Liberty ID-WSF Advanced Client Technologies Overview", 2007.*
Cantor, Scott et al. "Liberty ID-FF Protocols and Schema Specification", 2005.*
Gourmelen, Gaël et al. "Liberty ID-WSF Advanced Client Implementation and Deployment guidelines for SIM/UICC Card environment", available at least Jun. 2009.*
Hodges, Jeff et al. "Liberty ID-WSF Authentication, Single Sign-On, and Identity Mapping Services Specification", 2007.*
Jones, James Edward et al. WO 2009/118502, Oct. 2009.*
Pashalidis, Andreas and Chris J. Mitchell. "Single Sign-On using Trusted Platforms", 2003.*
3GPP. "3GPP TS 29.109 V9.1.0", Dec. 2009.*
Cahill, Conor P., ed. "Liberty IDP Service Specification", Dec. 2007.*
Friese, Ingo et al., ed. "Bridging IMS and Internet Identity", Dec. 2009.*
Hirsch, Frederick, et al., ed. "Security and Privacy Considerations for the OASIS Security Assertion Markup Language (SAML) V2.0", 2005.*
Jorstad, Ivar et al. "Releasing the potential of OpenID & SIM", 2009.*
Leicher, Andreas et al. "Smart OpenID: A Smart Card Based OpenID Protocol", 2012.*
OpenID. "OpenID Authentication 2.0—Final", Dec. 2007.*
"Disruptive Civil Technologies Six Technologies with Potential Impacts on US Interests out to 2025", National Intelligence Council, Appendix F: The Internet of Things(Background), Apr. 10, 2008, 19 pages.
"Shared Destinies—How the Internet of Things, Social Networks & Creative Collaboration Will Shape Future Market Structure", White Paper, Harbor Research, Inc., San Francisco, California, Jun. 2009, 19 pages.
3GPP TR 33.812 V9.2.0, "3rd Generation Partnership Project; Technical Specification Group Services and System Aspects; Feasibility study on the security aspects of remote provisioning and change of subscription for Machine to Machine (M2M) equipment (Release 9)", Jun. 2010, 1-87.
3GPP TR 33.820 V8.1.0, "3rd Generation Partnership Project; Technical Specification Group Service and System Aspects; Security of H(e)NB", Jun. 2009, 1-78.
3GPP TS 33.320, V9.4.0, "3rd Generation Partnership Project; Technical Specification Group Services and System Aspects; Security of Home Node B (HNB) / Home evolved Node B (HeNB) (Release 9)", Dec. 2010, 1-34.
Arm, "TrustZone™", http://www.arm.com/products/security/trustzone, accessed Dec. 28, 2010, 4 pages.
Azema et al., "M-Shield™ Mobile Security Technology: Making Wireless Secure", Texas Instruments White Paper, copyright 2008, 1-6.
BCC Research, ID Technologies, "Safety and Security", Report code SAS013A, Jun. 2005, 1 page.
Bellare et al., "Keying Hash Functions for Message Authentication", Advances in Cryptology—Crypto '96 Proceedings, Lecture Notes in Computer Science, Jun. 1996, 1109, 1-19.
Bellare, "New Proofs for NMAC and HMAC: Security without Collision-Resistance", Advances in Cryptology—CRYPTO '06, Jun. 2006, 1-31.
Canitrot, "SIMAlliance@SIMposium2009", SIMAlliance, Vienna, Apr. 21-22, 2009, 1-40.
European Telecommunications Standards Institute (ETSI), TS 102 127, V6.13.0, "Smart Cards; Transport Protocol for CAT applications; Stage 2 (Release 6)", Apr. 2009, 1-67.
European Telecommunications Standards Institute (ETSI), TS 102 483, V8.1.0, "Smart Cards; UICC-Terminal interface; Internet Protocol connectivity between UICC and terminal (Release 8)", Apr. 2009, 1-21.
European Telecommunications Standards Institute (ETSI), TS 102 689, V1.1.1, "Machine-to-Machine communications (M2M); M2M service requirements", Aug. 2010, 1-34.
European Telecommunications Standards Institute (ETSI), TS 102 691, V1.1.1, "Machine-to-Machine communications (M2M); Smart metering use cases", May 2010, 1-49.
Google Code, OAuth, Authentication and Authorization for Google APIs, "OAuth for Web Applications", http://code.google.com/intl/de-DE/apis/accounts/docs/OAuth.html, accessed on Dec. 28, 2010, 7 pages.
Google Code, OpenID, Authentication and Authorization for Google APIs, "Federated Login for Google Account Users", http://code.google.com/intl/de-DE/apis/accounts/docs/OpenID.html, accessed on Dec. 28, 2010, 13 pages.
IBM, "IBM PCI Cryptographic Coprocessor: Notice of Withdrawal from Marketing", www-03.ibm.com, accessed on Jan. 17, 2011, 4 pages.
IDC, Inc. (Gantz—Project Director), "The Expanding Digital Universe. A Forecast of Worldwide Information Growth Through 2010", Mar. 2007, 24 pages.
Klenk et al., "Preventing Identity Theft with Electronic Identity Cards and the Trusted Platform Module", Proceedings of the Second European Workshop on System Security, Mar. 31, 2009, 44-51.
Lamport, "Password authentication with insecure communication", Communications of the ACM, Nov. 1981, 24(11), 770-772.
Lasica, "Identity in the Age of Cloud Computing: The next-generation Internet's impact on business, governance and social-interaction", 17th Annual Aspen Institute Roundtable on Information Technology, Aspen, Colorado, Jul. 29-Aug. 1, 2008, 110 pages.
Leicher et al., "Trusted Computing Enhanced OpenID", International Conference for Internet Technology and Secured Transactions (ICITST), London, England, Nov. 8-11, 2010, 8 pages.
Leicher et al., "Implementation of a Trusted Ticket System", IFIP Advances in Information and Communication Technology, Jun. 11, 2009, 1-12.
Pashalidis et al., "Single Sign-On Using Trusted Platforms", 6th International Conference on Information Security, ISC 2003, Dec. 10, 2003, 54-68.
PCT Application No. PCT/US2011/022141 : International Search Report and Written Opinion of the International Searching Authority, Apr. 21, 2011, 10 pages.
PCT Application No. PCT/US2011/024200 : International Search Report and Written Opinion of the International Searching Authority, May 19, 2011, 12 pages.
Peng et al., "Trust of User Using U-Key on Trusted Platform", 8th International Conference on Signal Processing ICSP-2006, Nov. 16-20, 2006, 4 pages.
Preneel et al., "MDx-MAC and Building Fast MACs from Hash Functions", Proceedings Crypto '95, Aug. 1995, 14 pages.
Preneel et al., "On the Security of Two MAC Algorithms", Advances in Cryptology—EUROCRYPT '96, Nov. 17, 1995, 1-12.
Urien, "An OpenID Provider based on SSL Smart Cards", Consumer Communications and Networking Conference (CCNC), 2010, 7th IEEE, Jan. 9-12, 2010, 2 pages.
VeriSign, "Security and Trust: The Backbone of Doing Business over the Internet", 2010, Accessed on Dec. 28, 2010, 8 pages.
Watanabe et al., "Federated Authentication Mechanism using Cellular Phone—Collaboration with OpenID", 2009 Sixth International Conference on Information Technology: New Generations, Apr. 27-29, 2009, 435-442.

* cited by examiner

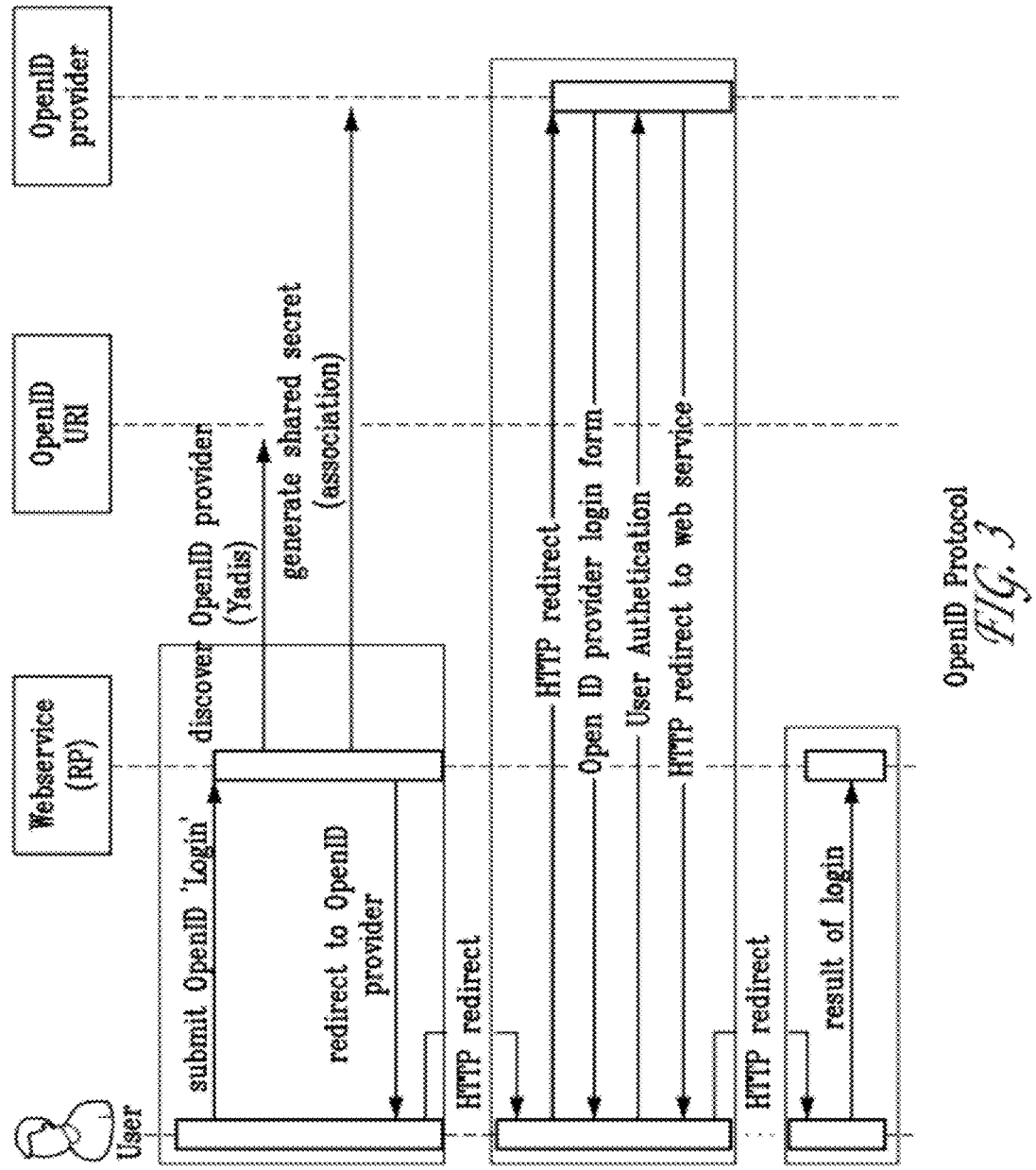

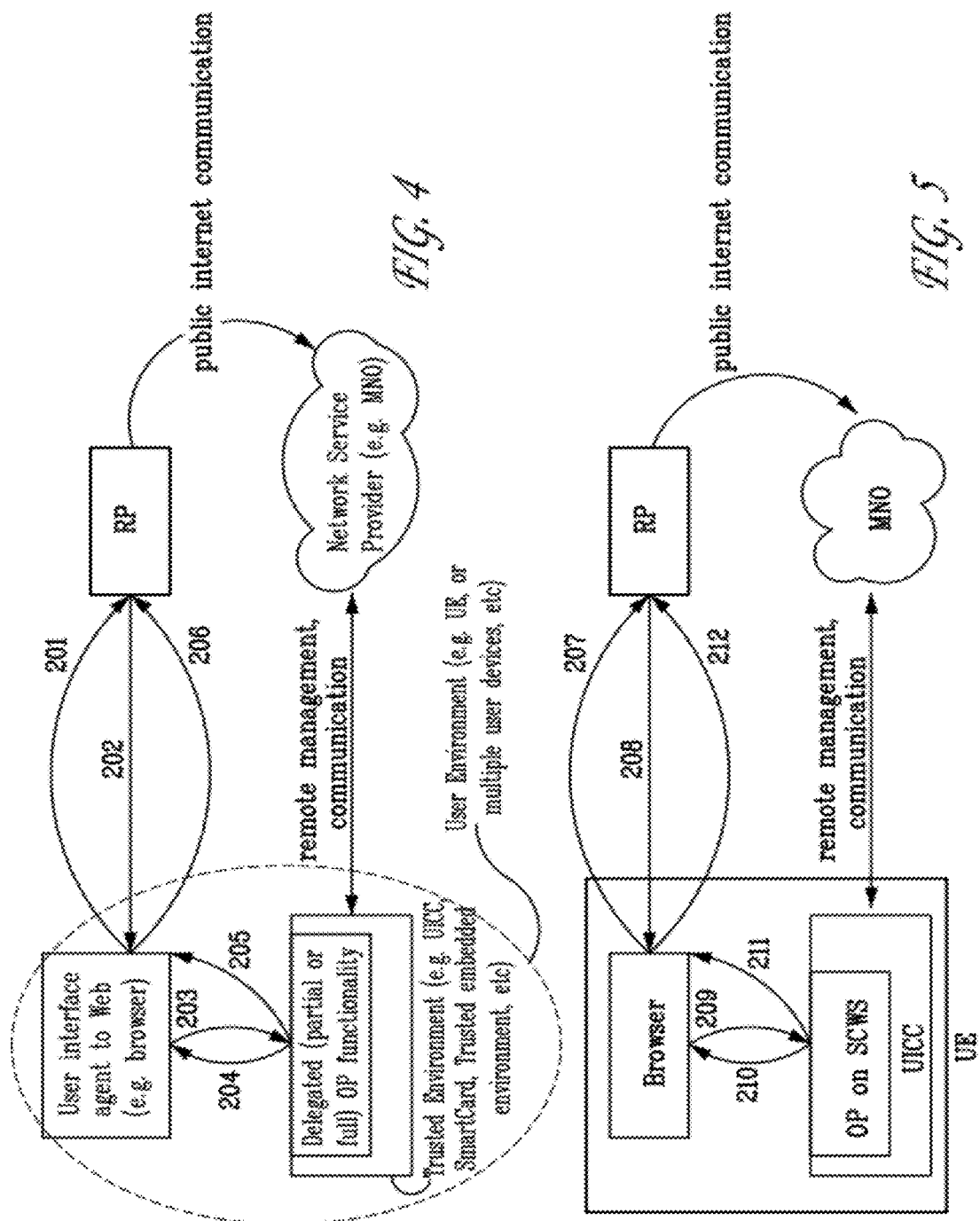

Stateless Signature Verification

Integration of BONDI with Association-based Communication

Integration of BONDI with Stateless Signature Verification

Split-OP Scenario with Stateless Signature Verification

GBA Architecture

GBA Reference Model from 3GPP TS 33.220

GBA Reference Model for Visited Network NAFs from 3GPP TS33.220

Use of GBA for MNO-backed Identity Assertions

Split-OP Scenario

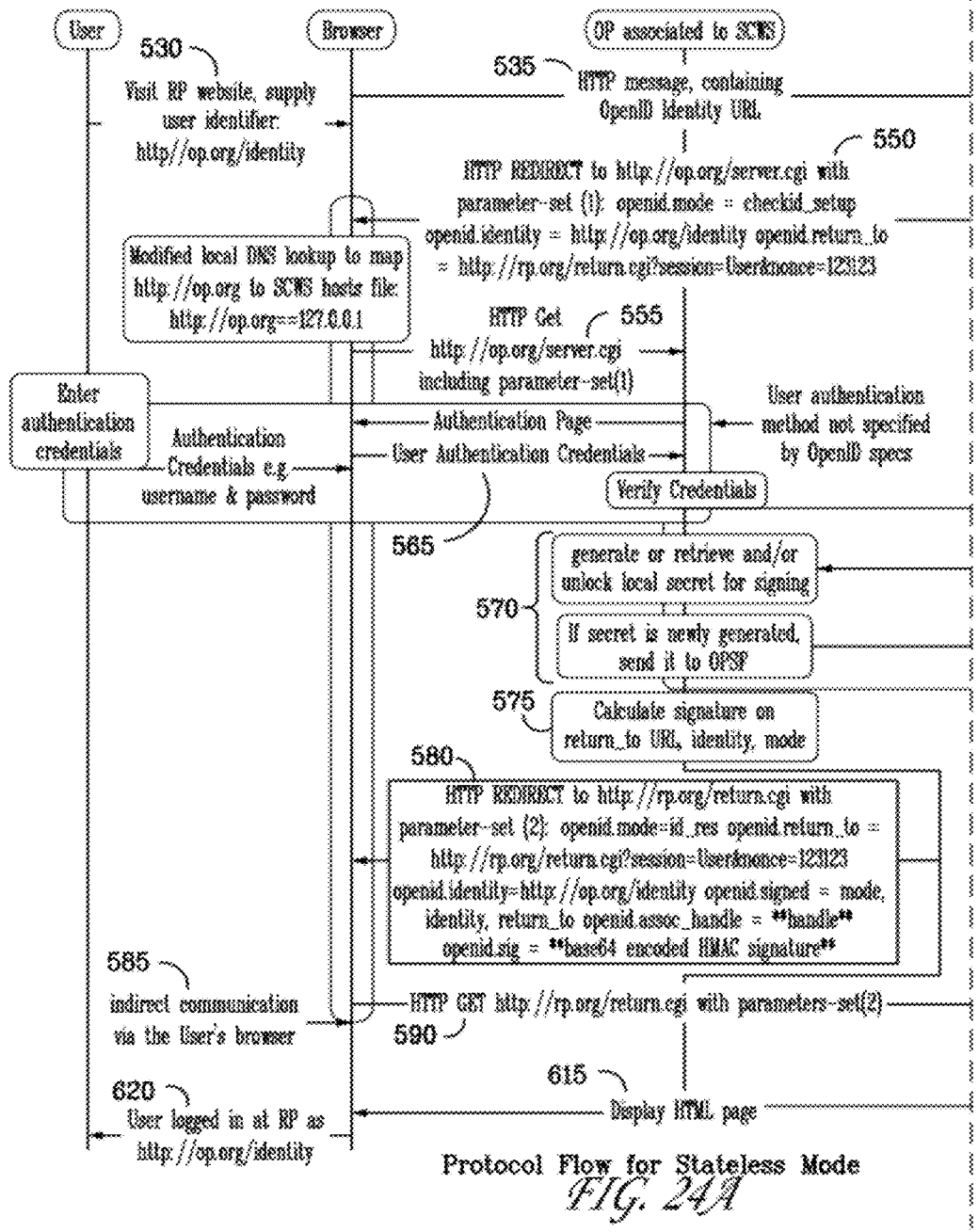

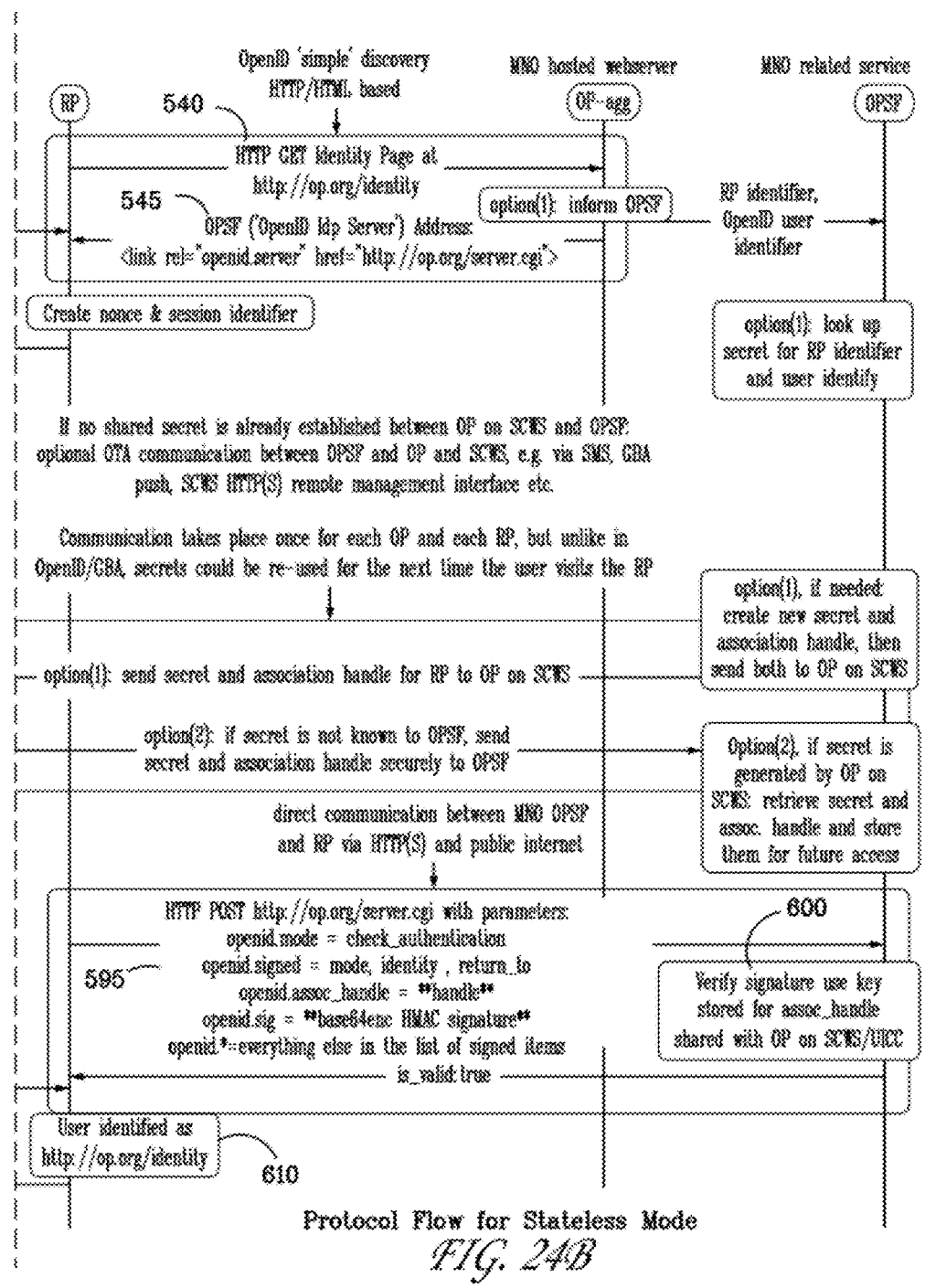

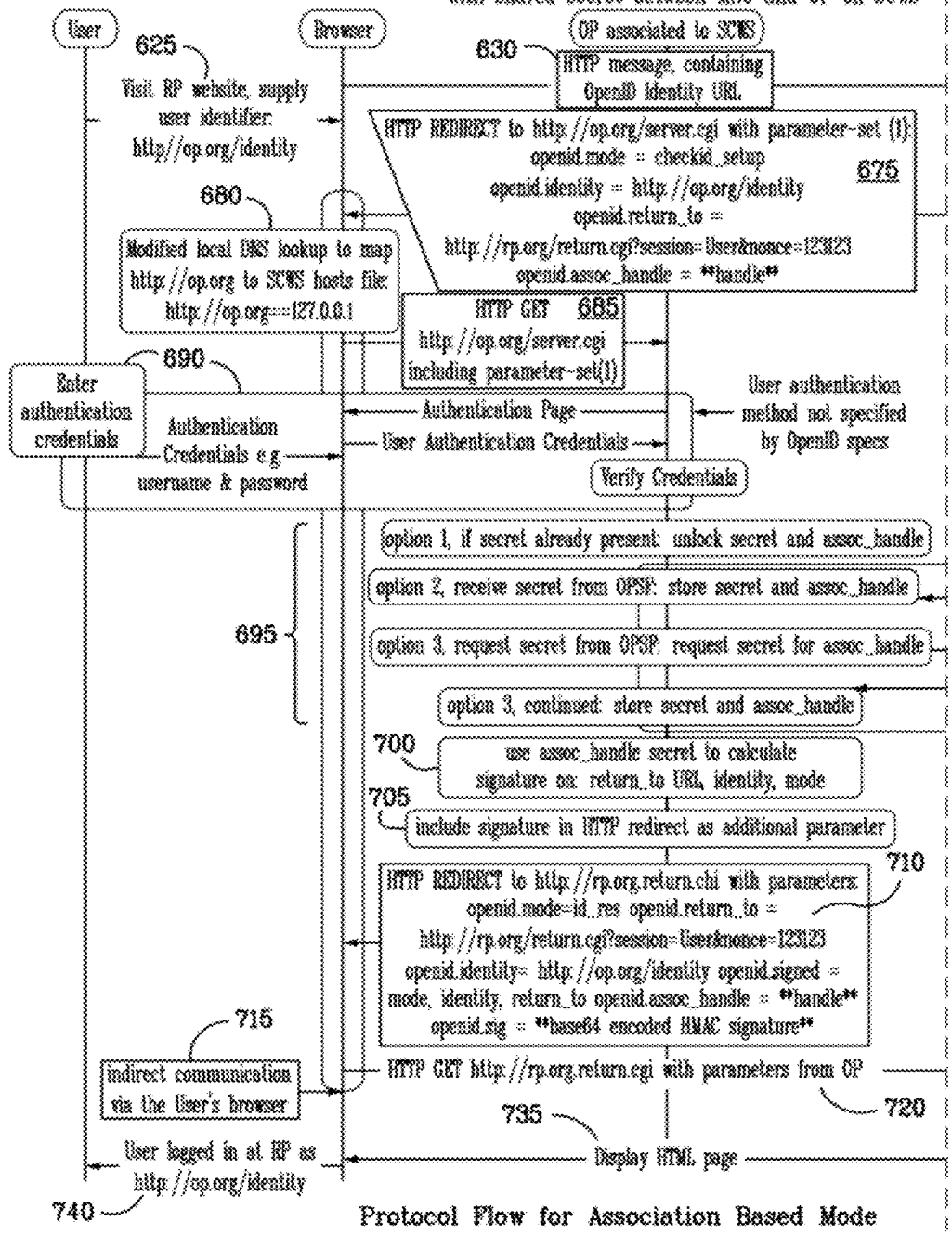

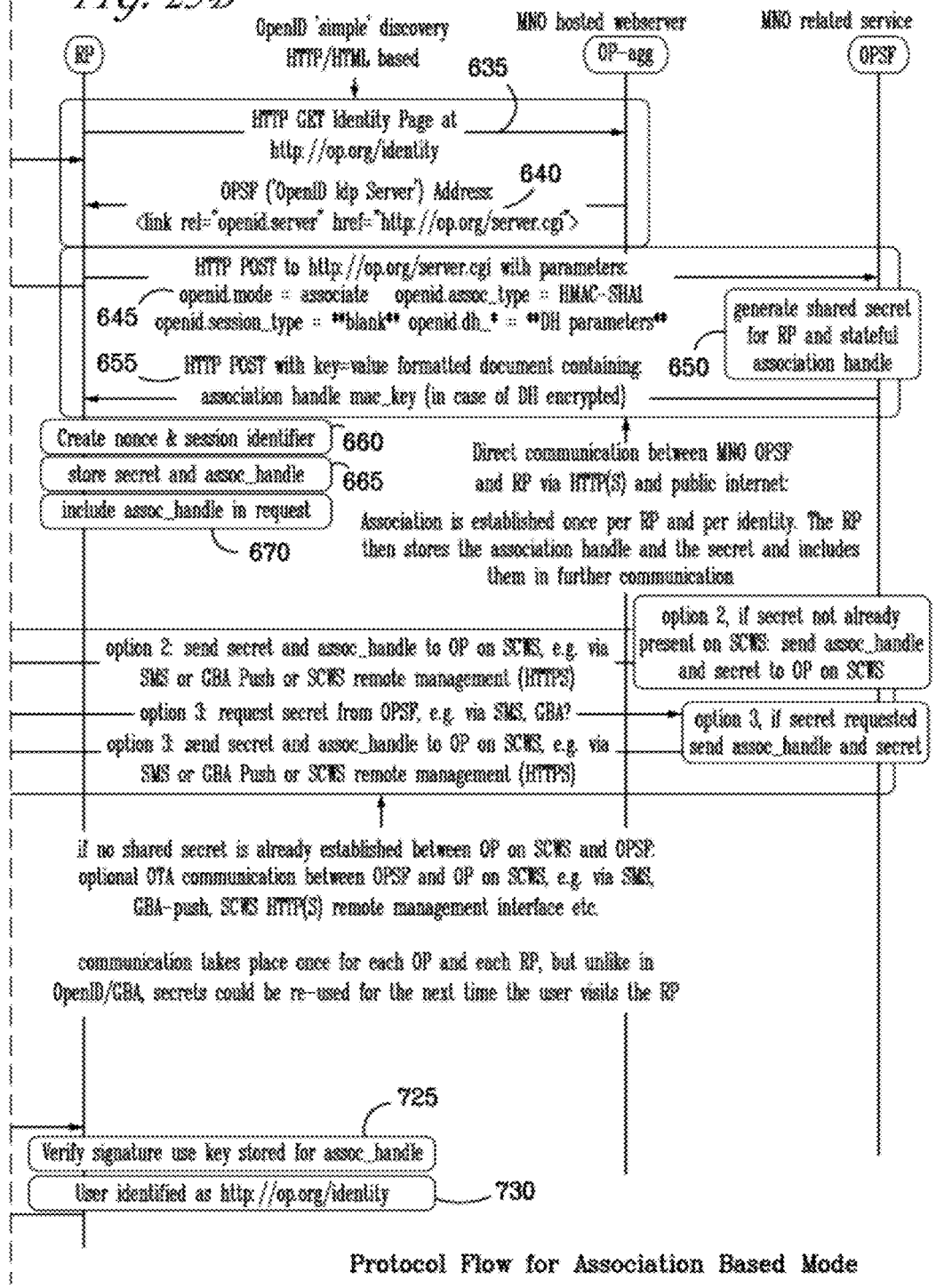

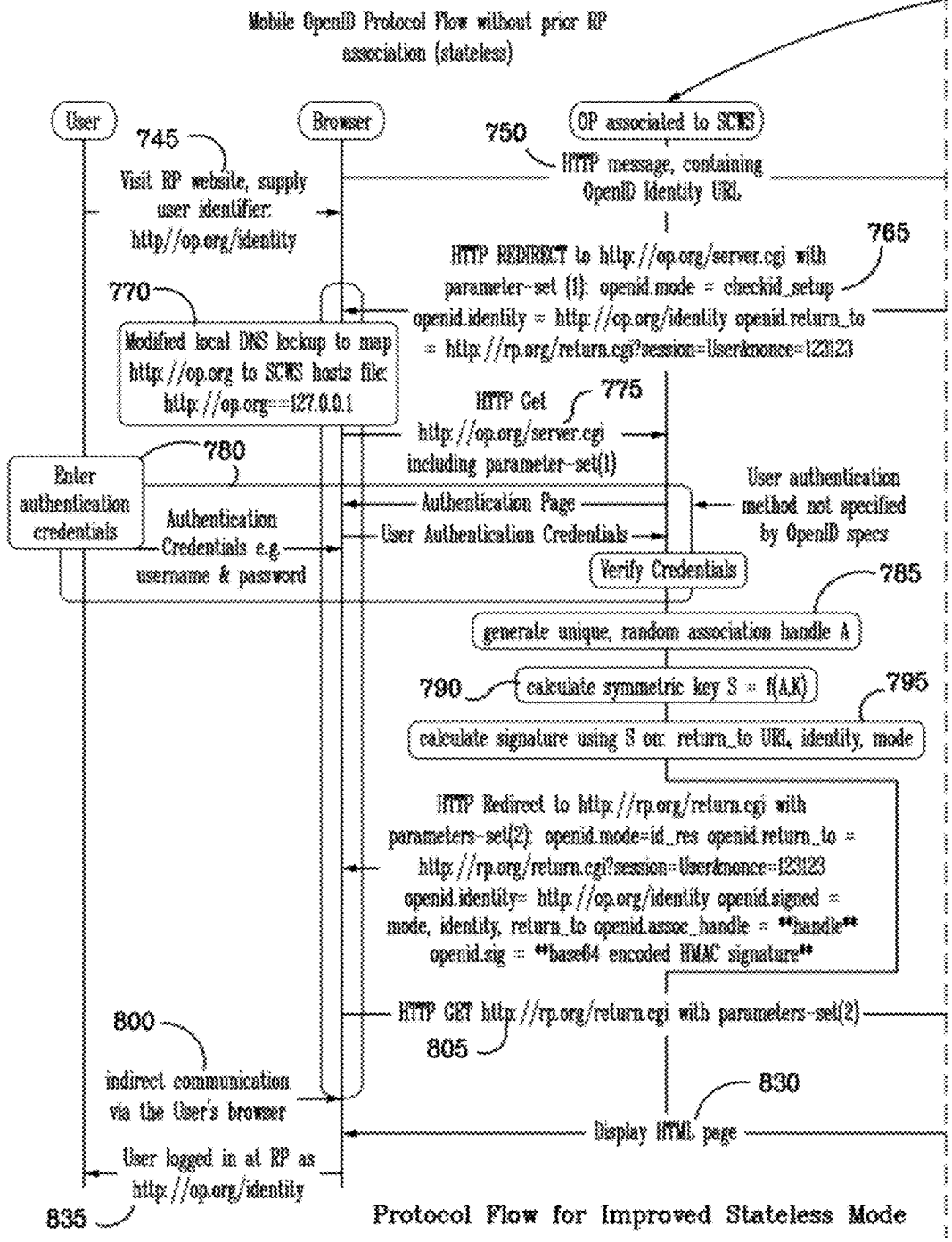

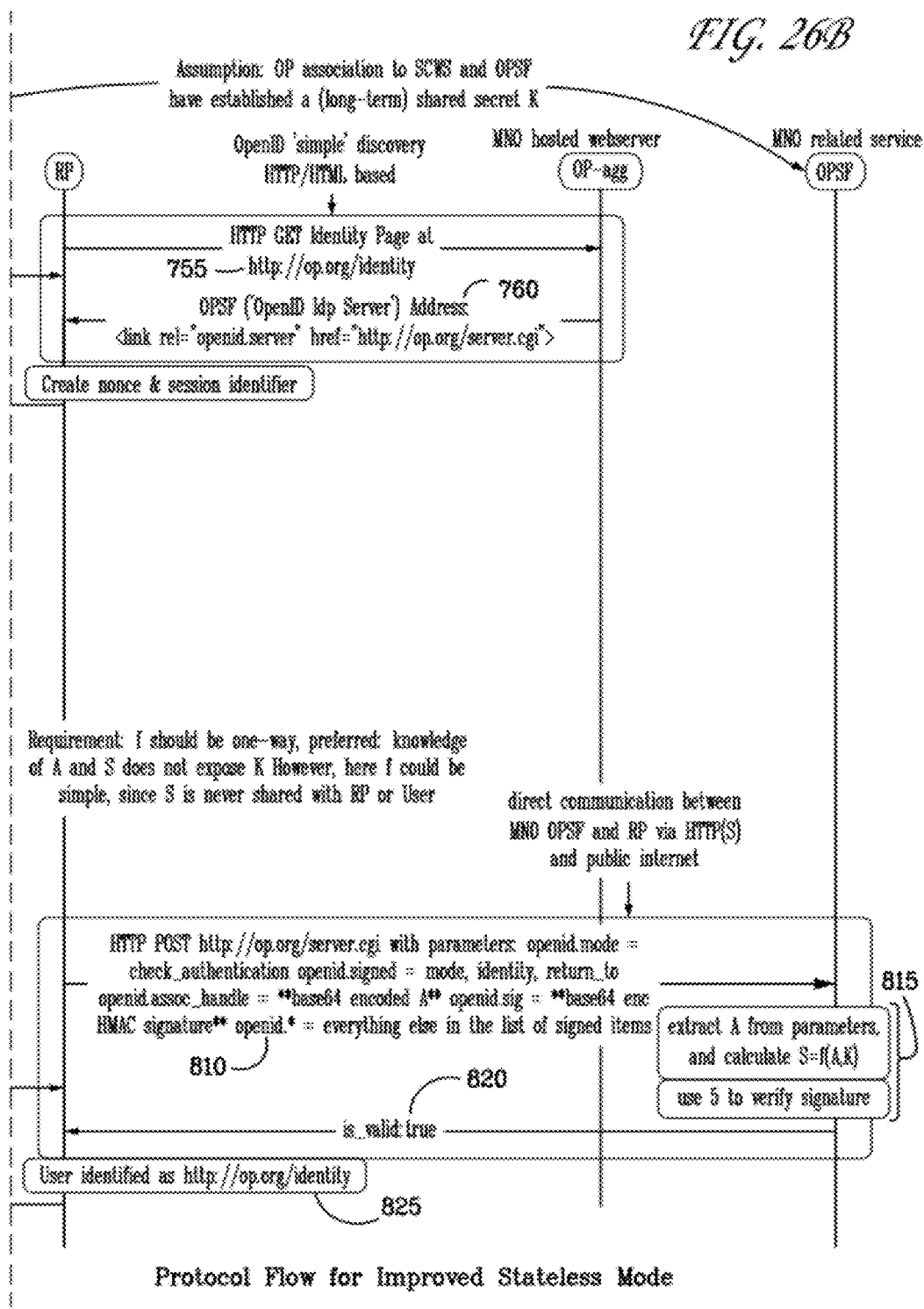

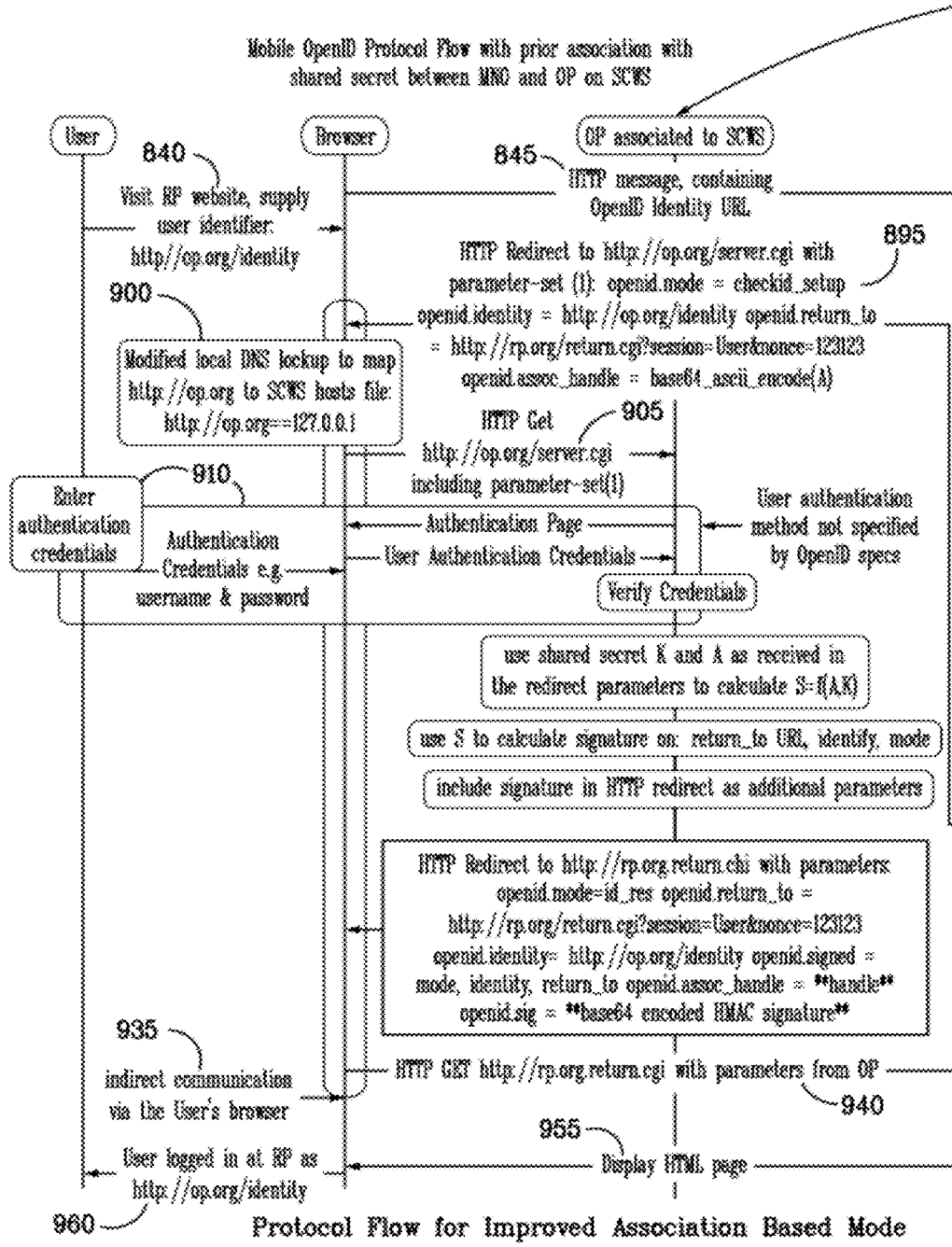

Protocol Flow for Improved Association Based Mode

HMAC Contruction

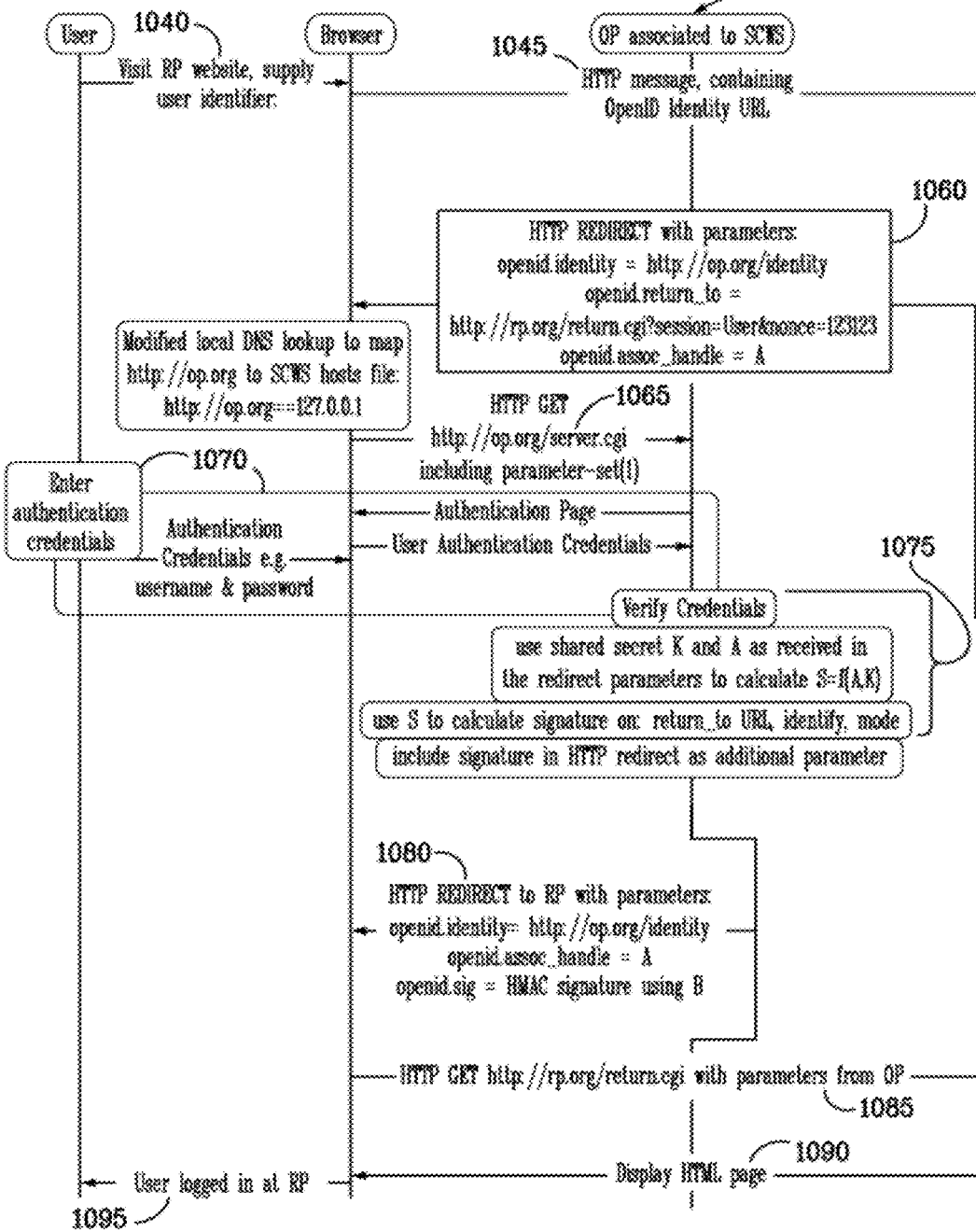

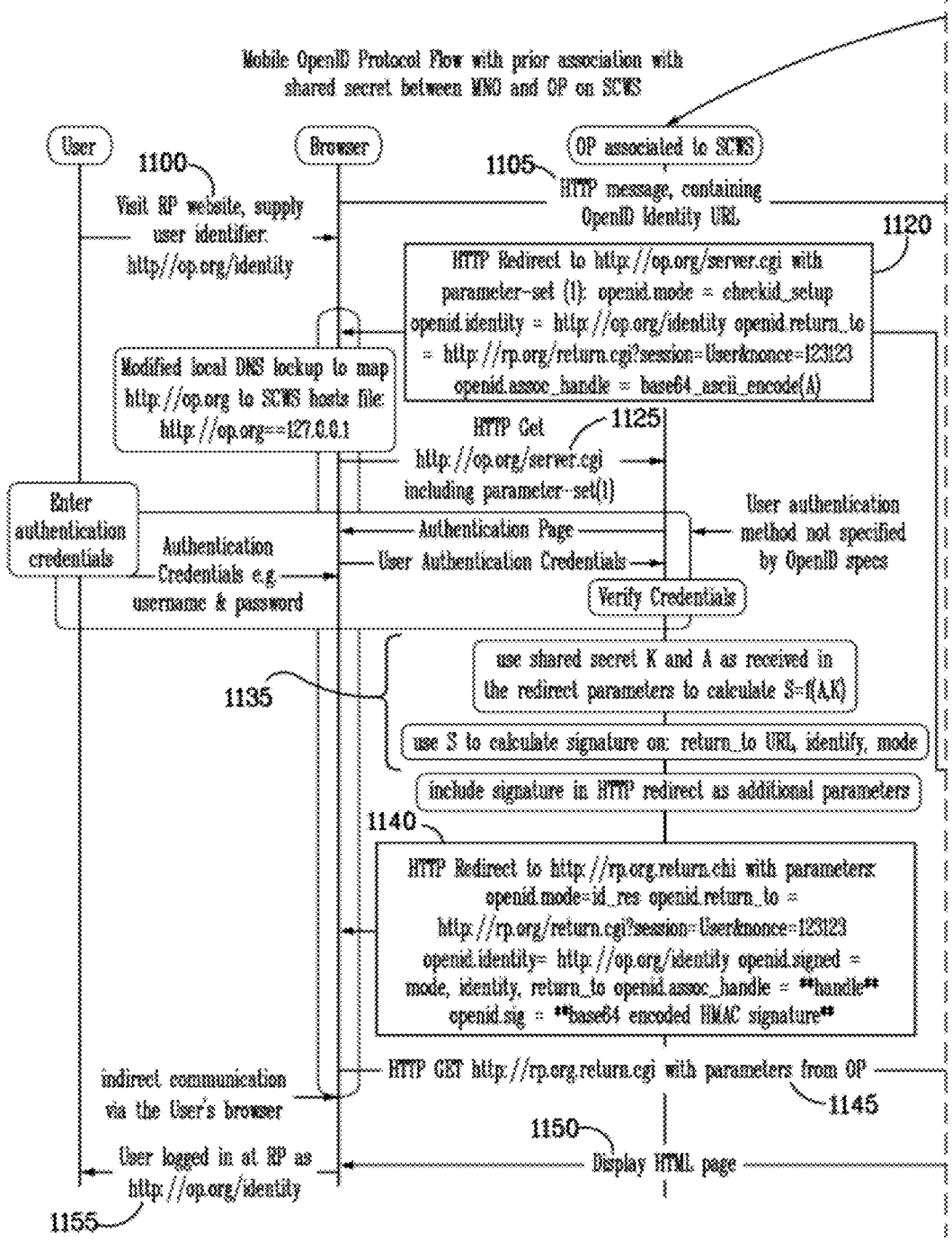

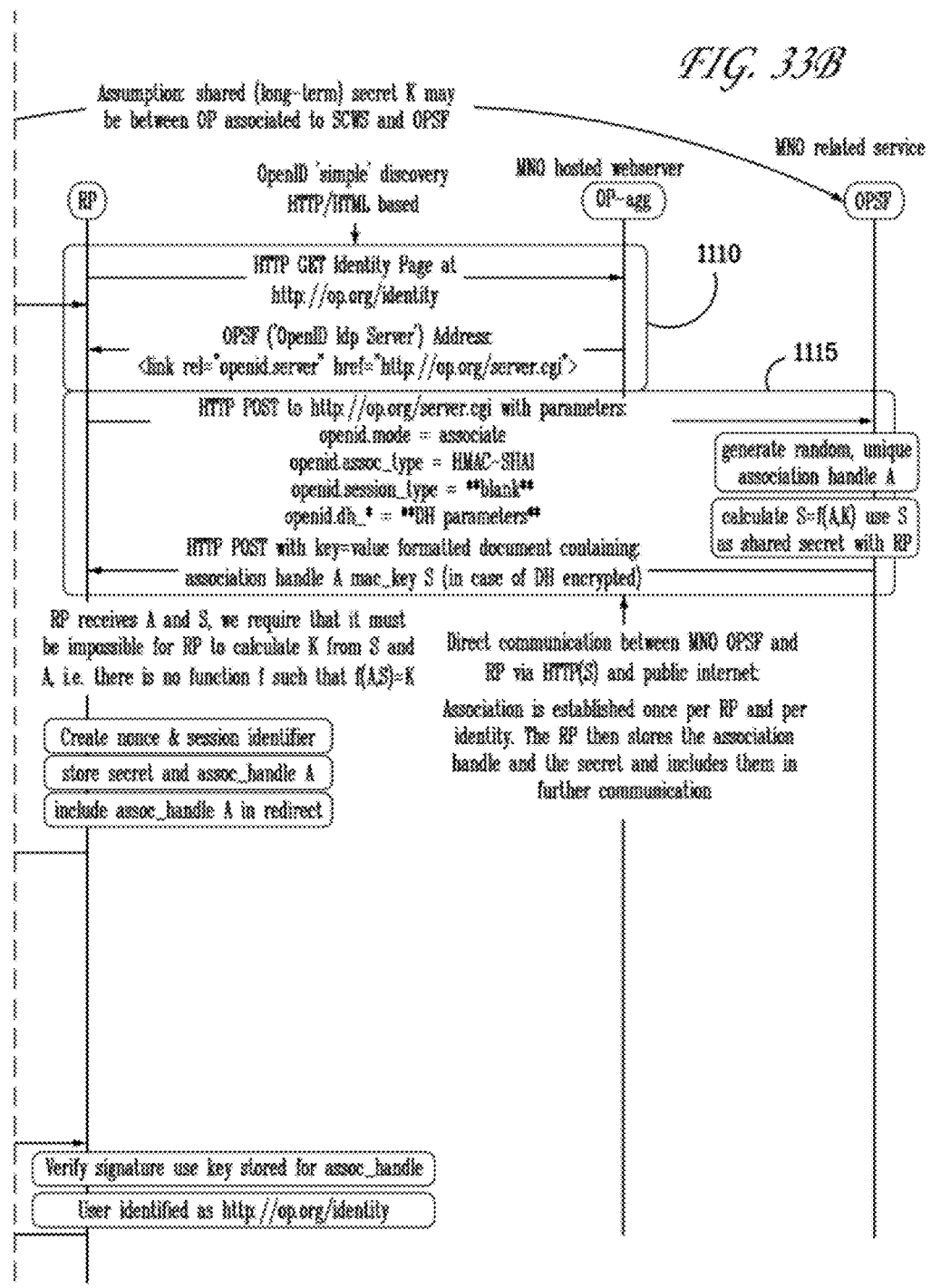

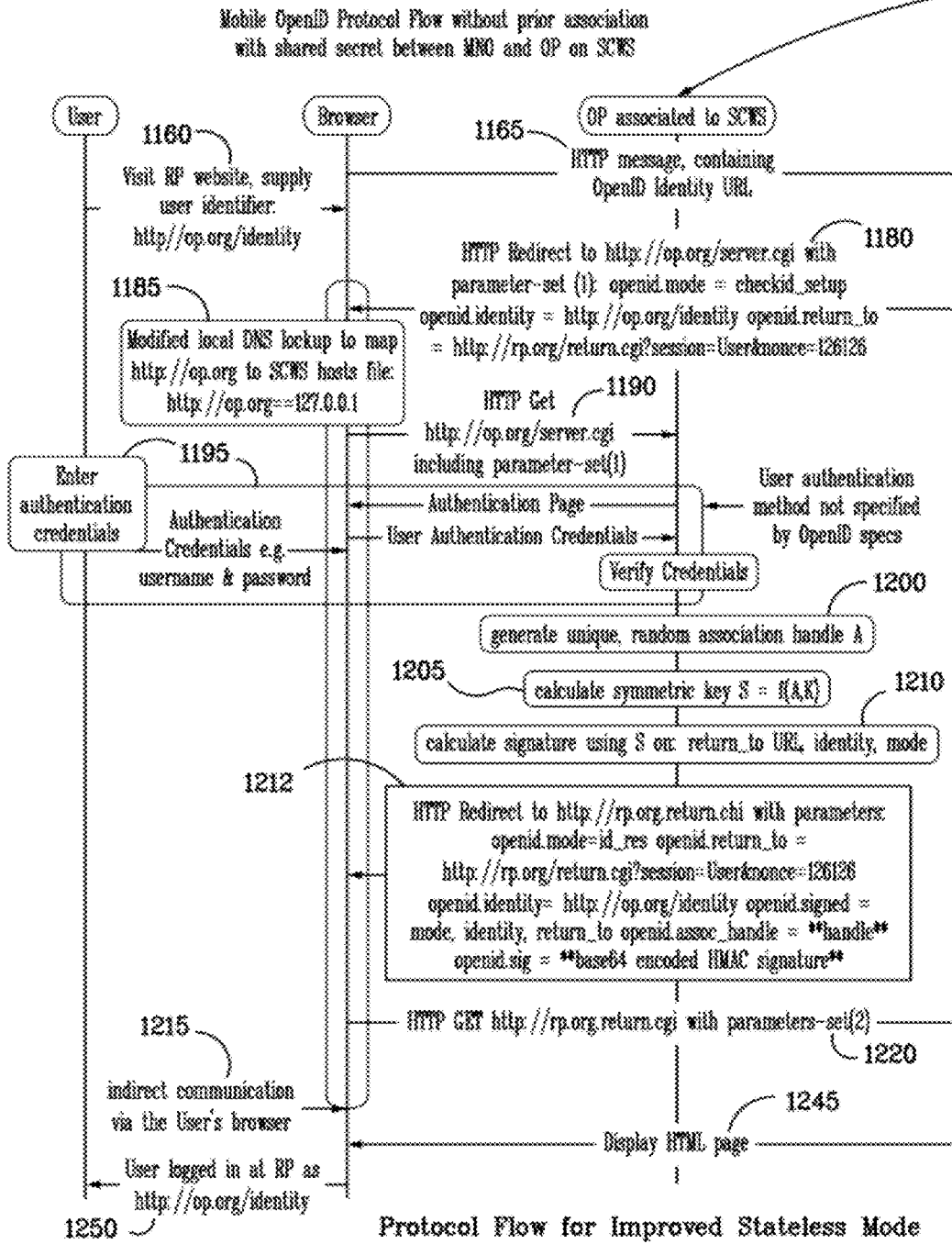

Protocol Flow for Improved Stateless Mode

METHOD AND APPARATUS FOR TRUSTED FEDERATED IDENTITY

CROSS REFERENCE

This application claims priority to U.S. Provisional Patent Application No. 61/396,602, filed on May 28, 2010, entitled, "Identity Management on a Communications Device;" and U.S. Provisional Patent Application No. 61/302,890, filed on Feb. 9, 2010, entitled, "Method and Apparatus for Implementing Local and Mobile OpenID Provider;" the contents of which are hereby incorporated by reference in their entirety.

BACKGROUND

An internet user often has multiple usernames and passwords that may be used for user authentication in order to access a plurality of websites. For example, the internet user may have one username/password combination that is used to access a social networking site, such as Facebook, and another username/password combination that is used to access an email site, such as Gmail. While having multiple username/password combinations may be necessary for user authentication, the internet user may find it cumbersome to remember each username/password combination. For example, the internet user may forget their username/password combination for a website and will not be able to access that website.

To make user authentication less cumbersome for the internet user, single sign-on (SSO) solutions, such as OpenID, have been proposed. However, when SSO is implemented as a web service there are some drawbacks. For example, the user may not have a secure channel to the web based SSO provider. Additionally, the user may have limited control over the SSO provider.

Moreover, authentication in SSO may produce over the air interface communications, which may produce load on both the network entity (i.e. the OpenID provider (OP or NAF) and the network itself by increased traffic. Additionally, the mobile network operator (MNO) may have to bear the cost of this additional traffic and processing.

SUMMARY

In the present application, we describe embodiments for enabling local and distributed single sign-on (SSO) providers to be implemented on a trusted environment, such as smartcards, wireless smart phones, H(e)NBs, or other types of devices. The single sign-on provider may be an OpenID provider, a provider of identity based on Liberty Alliance or Kantara Initiative, identity providers using the security Assertion Markup Language (SAML), an Open Authentication (OAUTH) provider, or the like. This application provides a collection of different scenarios and their implementation options. Whilst the concepts described may be in the context of the OpenID protocol, the ideas are extendable to other single sign-on (SSO) protocols and/or federated identity protocols.

In one example embodiment, a user environment may be used for enabling an open management security protocol to enable a relying party (RP) to authenticate a user. The user environment may comprise:

a user interface that communicates with the RP using a single sign-on security protocol to request access to a service provided by the RP on behalf of a user, and wherein the RP may be outside of the user environment and communicates with a trusted provider of single sign-on credentials to initiate an authentication of the user; and a processor, such as a trusted computing environment, that authenticates the user within the user environment for the trusted provider, the processor configured to perform at least some functions of the trusted provider of single sign-on credentials locally to limit communications outside the user environment during the authentication process.

In another example embodiment, a method may be used for protecting a user environment and/or the local assertion entity (LAE) to authenticate a user for a relying party (RP) in an open management security protocols, such as OpenID. The method may comprise:

receiving a redirection from the RP via a user interface that the RP wishes to authenticate the user, the RP being capable of communicating with a trusted provider of a single sign-on (SSO) credentials, such as an OpenID Provider (OP);

receiving user credentials from the user through the user interface;

authenticating the user with the received user credentials for the RP to perform at least some functions of the trusted provider of SSO credentials, such as the OP locally to limit communications outside the user environment during the authentication process; and transmitting an authentication response via a user interface to the RP.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to embodiments that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 illustrates the OpenID protocol flow for allowing a user to use a single OP to log in to different relying party sites FIG. 4 illustrates an example embodiment of a protocol flow for providing an SSO protocol with an integrated OP on a trusted computing environment.

FIG. 5 illustrates an example embodiment of a protocol flow for providing an SSO protocol with an integrated OP on a trusted computer environment.

FIG. 24 illustrates an example embodiment of a protocol flow for enabling an RP to use a stateless mode to perform OpenID authentication.

FIG. 25 illustrates an example embodiment of a protocol flow for enabling an RP to use association based mode to perform OpenID user authentication.

FIG. 26 illustrates an example embodiment of a protocol flow for improved stateless mode.

FIG. 33 illustrates another example embodiment of a protocol flow for a stateless mode.

DETAILED DESCRIPTION OF ILLUSTRATIVE EMBODIMENTS

Figure 1A:
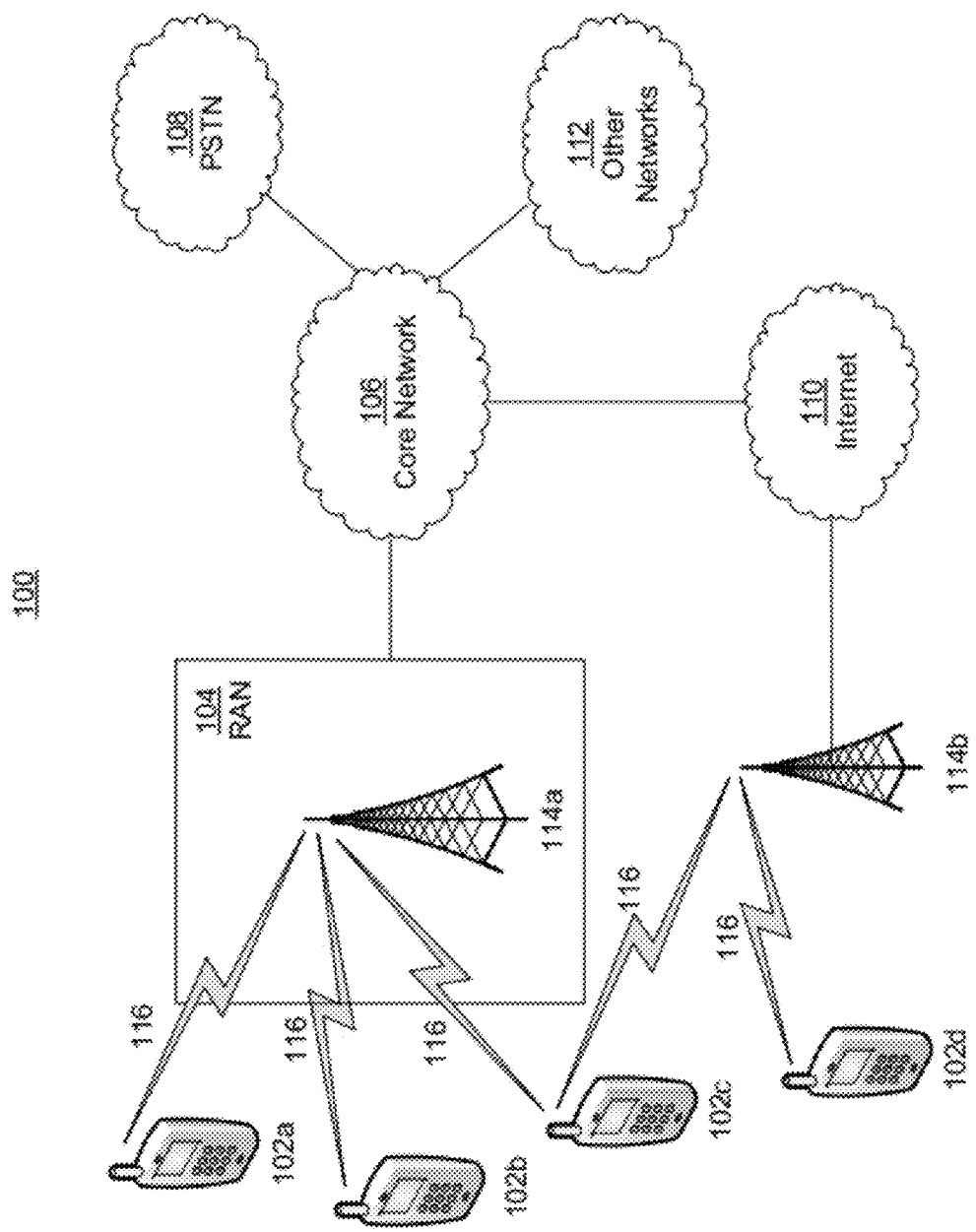
FIG. 1A illustrates an example communications system in which one or more disclosed embodiments may be implemented.

In the present application, we describe ideas and concepts of local and distributed single sign-on (SSO) providers implemented on a trusted computing environment, such as user equipment (UE), smartcards, smart phones, H(e)NBs, or other types of devices. The single sign-on provider may be an OpenID provider, a Liberty Alliance Provider, Open Authentication (OAUTH) provider, or the like. This application provides a collection of different scenarios and their implementation options. Whilst the concepts described may be in the context of the OpenID protocol, the ideas are extendable to other single sign-on (SSO) protocols and/or federated identity protocols.

Local Mobile SSO protocols, such as local mobile OpenID, is a concept that allows a locally located module or entity to perform identity authentication/assertion functions as part of an SSO or identity management protocol, such as the OpenID protocol. The locally located module may be a smartcard, a SIM, a UICC, a Java card, a smartcard Web server (SCWS) enabled Smartcard, wireless device such as a smart phone, or the like.

Local Mobile SSO is a term used to collectively indicate methods whereby part or whole of the single sign-on (SSO) and related identity management functions traditionally performed by a web-based SSO server are performed instead by a locally-based entity and/or module which is a part or whole of the communicating device itself, or where such entity/module is physically and/or logically located (i.e., locally located) in close vicinity of the communicating device and/or its user. For example, an entity/module may be embedded in a device; attached to the device; or connected by local interfaces, wiring, or short-range wireless means to the device.

Local OpenID may also be used as a term to indicate a subset of Local Mobile SSO methods whereby the method of SSO or identity management is based on the OpenID protocol. For example, Local OpenID may be used to indicate the functions of an OpenID Identity Provider (OP, or OpenID IdP, for shorthand notations) that may be performed by a locally located entity/module.

Local IdP is a term used to indicate the entity or module that performs functions of an OpenID server. The Acronym OPloc may be used to denote a Local IdP. One of the main functions of a Local IdP may be to facilitate authentication of the user and/or the device through assertion(s) about the identity of the user and/or the device. Such an assertion may be sent from the Local IdP to a browser agent (BA) running on the device, which may then forward the assertion to the external Relying Party (RP). When the function(s) provided by a Local IdP is primarily limited to providing such identity assertion, the Local IdP may be referred to as a Local Assertion Entity (LAE).

A Local IdP may process, create, manage, or send assertion messages to one or more external recipients. The assertion messages may assert the state of verification of one or more identifies relating to a user and/or a device. For example, in the OpenID protocol, a third-party entity called the Relying Party (RP) may be one of the recipients of the assertion message. The Local IdP may also sign assertion messages using a signature, encryption key, cryptography, or the like.

Local OpenID methods may use one or more cryptographic keys, such as a root session key. The root session key may be denoted by Krp and may be a session key intended for use between the RP and the OP. Krp may also serve as a root session key between the RP and the OP from which other keys may be derived. Local OpenID methods may also use an assertion key, which may be denoted by Kasc. Kasc may be the signing key used to sign one or more of the assertion message(s) for authentication of the user. Kasc may be derived from the Krp.

Local OpenID methods may also use a service called OpenID Server Function (OPSF), whose role may be to generate, share, and distribute secrets that may be used by the Local IdP and/or the Relying Party (RP). The OPSF and the Local IdP may be viewed by the external RP as a single entity. The OPSF may also be able to verify signatures issued by the Local OpenID, and may be directly reachable by the RP, for example, via the public internet. The browser on the device may be redirected to the Local IdP by modifying the local DNS resolving cache on the device such that the address of the OPSF maps to the local IdP.

Local OpenID methods may also use a service denoted by OP-agg, whose role may be to facilitate discovery of a Local IdP on behalf of the RP.

1 Communication Systems

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple users to access such content through the sharing of system resources, including fixed wire or wireless communications bandwidth. For example, the communications systems 100 may employ one or more fixed wire or wireless channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless or fixed wire environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a Smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more fixed wire or wireless channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
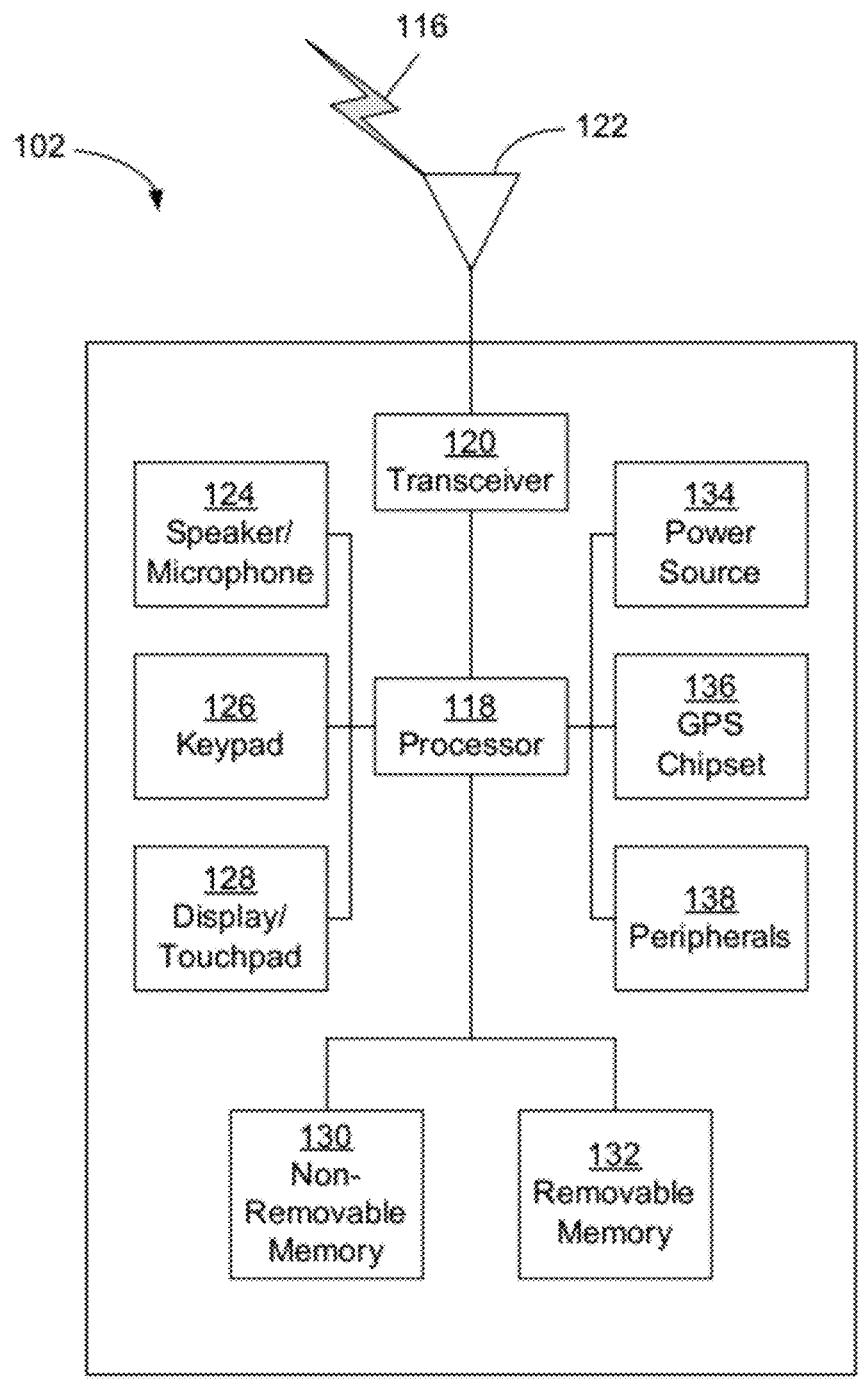
FIG. 1B illustrates an example wireless transmit/receive unit in which one or more disclosed embodiment may be implemented.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may perform application-layer programs (e.g. browsers), radio access-layer (RAN) programs, and/or communication programs. The processor 118 may perform security operations, such as authentication; security key agreement operations; and/or cryptographic operations, or the like. These operations may be performed at the access-layer, at the application layer, or the like.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
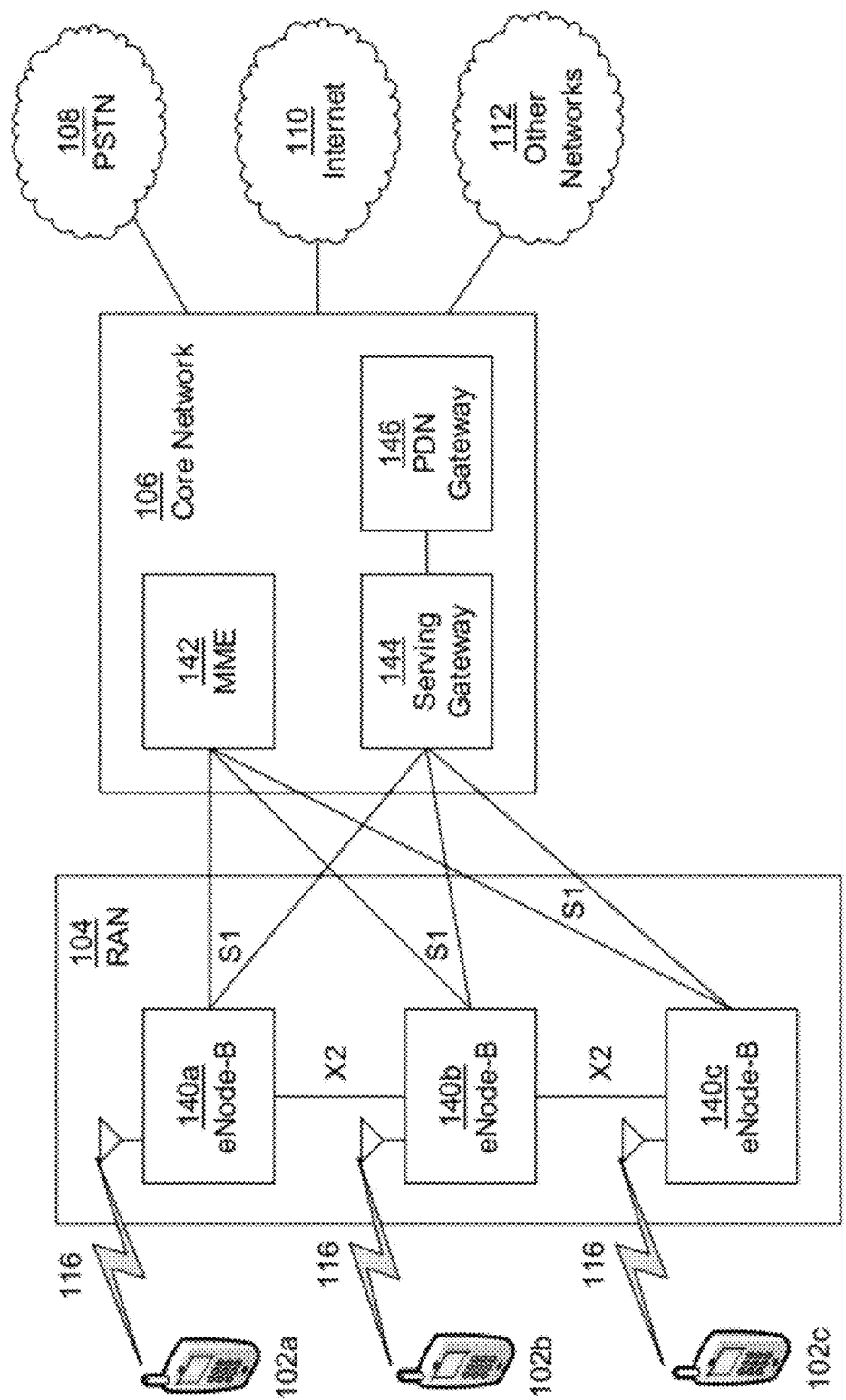
FIG. 1C illustrates an example system radio access network in which one or more disclosed embodiment may be implemented.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

2.3 Identity Management and Useable Security

As users become engaged in accessing information on mobile devices, they are faced with the dilemma of dealing with a plethora of user credentials for one web service to another. The users are faced with remembering these credentials and the cumbersome task of entering the login and password information every time they access a web service. Although a device may remember these credentials, the device may be lost or stolen and may end up in the wrong hands.

A robust authentication solution may be provided that combines local user authentication with transparent network authentication to securely manage user credentials and access to web services. For example, a variety of password or token entry and/or biometric authentication technologies may be used with complimentary seamless network authentication schemes that work with the web service portals. These schemes may be referred to as single sign-on (SSO) or federated identity.

The mobile platform, which may include a UE, may support a variety of proprietary processor architectures and operating systems. This creates a fragmented market for software/firmware developers and forces the operators to negotiate with OEMs to incorporate and support common technologies such as access control and authentication. The following sections discuss embodiments that provide SSO protocols on mobile platforms In one example embodiment, a user environment may be used to enable an open management security protocol to enable a relying party (RP) to authenticate a user. The open management security protocol may be a single sign-on protocol (SSO), such as the OpenID protocol, the Liberty Alliance protocol, the Open Authentication (OAUTH) protocol, the Security Assertion Markup Language, the Identity Assurance Framework, or the like. The relying party may be the party that wants to authenticate or verify the credentials of a user.

The user environment may comprise of a user interface and/or a processor, such as a trusted computing environment.

The user interface may provide an interface between a UE and a user. For example, the user interface may be a web browser, a webpage, an application, or the like. The user interface may also receive user credentials. The user credential may be a combination of a username, a password, a PIN code, a secret key, a token, a biometric identity, or the like.

The user interface may provide an interface and/or communicate with an RP using a SSO protocol, such as OpenID to request access to a service provided by the RP on behalf of a user. For example, a user may use a user interface agent, such as a web browser, to visit a RP and may select to login using OpenID. The user interface may also receive an indication from the RP that the RP wishes to authenticate the user. For example, the user interface may receive a redirection message from the RP that instructs the user interface to use the trusted computing environment to authenticate the user.

The user interface may also communicate with a trusted provider of SSO credentials to initiate an authentication of the user. For example, the RP may redirect the user interface to the trusted computing environment, which may be associated with a trusted provider. The trusted provider may be a provider of the user credentials. For example, the trusted provider may know the user and be capable of authenticating the user through user supplied credentials.

The processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Additionally, the processor In one example embodiment, the processor may be a may be a trusted computing environment, such as a Universal Integrated Circuit Card (UICC), a subscriber identity module (SIM), a machine to machine (M2M) device, a smart card, a java card, a global platform smart card, a secure integrated chip card (ICC), or the like. The trusted computing environment may be implemented using smart card web server (SCWS).

The trusted computing environment may authenticate the user within the user environment for the trusted provider. To authenticate the user, the trusted computing environment may perform at least some functions of the trusted provider of single sign-on credentials locally to limit communications outside the user environment during the authentication process. For example, a user may authenticate locally to the trusted computing environment through a PIN code, a biometric identity, a token or the like or combinations thereof (i.e. a PIN code and a biometric identity). The trusted computing environment may generate an authentication response. The trusted computing environment may redirect the user interface agent to the RP with a redirect message that may include the assertion that the user authenticated. The user interface may then be redirected to the RP and the user may be logged in after the RP verifies the assertion from the trusted computing environment.

In one example embodiment, the trusted computing environment may calculate a signature, such as a base64 encoded HMAC signature, and may provide the signature to the RP via the user interface. This may be done, for example, to allow the RP to verify the credentials of the trusted computing environment. The trusted environment may calculate the signature based a shared secret between the trusted computing environment and a trusted provider that may be associated with the MNO or OP. The shared secret may be established between the trusted computing environment and the trusted provider through the user interface. The signature may be used to sign a list of parameters received from the RP.

The relying party (RP) may be a service, a website, a database, an application, or the like. In one example embodiment, the RP may be outside of the user environment. For example, the RP may be a website hosted on a server that is outside of a user environment, such as a cell phone or other UE being used by a user to access the website. The RP may have to establish a connection using, for example, a public internet communication to a web service entity provided by a mobile network operator (MNO). This may be done, for example, when the relying party (RP) is not able to communicate with the trusted computing environment directly. The MNO may have a remote management interface to the trusted computing environment, and additional communication channels, as for example SMS, which may allow the MNO to communicate with the UE and/or the trusted computing environment. The MNO may act as a negotiating bridge between the RP and the OP on the trusted computing environment.

In another example embodiment, the RP may be within the user environment. For example, the RP may be hosted within a UE that may include a user interface and a trusted computing environment.

In one example embodiment, the RP may be configured to transmit an authentication request to allow the RP to verify the credentials of the trusted computing environment. The user interface may receive the authentication request from the RP. The authentication request may include an association handle. The user interface may provide the association handle to the trusted computing environment. The trusted computing environment may generate a signature based upon a shared secret, and may generate an authentication response that includes the signature and the association handle. The user interface or the trusted computing environment may provide the authentication response generated by the trusted environment to the RP.

In one example embodiment, the user environment may be within a user equipment (UE). For example, the user interface and the trusted computing environment may be included within a single UE. In another example embodiment, the user environment may be deployed in a split terminal configuration where the user interface and the trusted computing environment may reside in separate UEs. For example, the user interface may be on a cell phone that belongs to the user while the trusted computing environment may exist on a banking card that belongs to the user or the UICC. As another example, the user interface may be on a personal computer that belongs to the user while the trusted computing environment may exist on a cell phone that belongs to the user.

In one example embodiment, a method may be provided for protecting a user environment and/or the local assertion entity (LAE) to authenticate a user for a relying party (RP) in an open management security protocol. In one example embodiment, the LAE may be within a processor, such as a trusted computing environment. An indication from the RP may be received via a user interface that the RP wishes to authenticate the user. The RP may be outside of the user environment and may be capable of communicating with a trusted provider of a single sign-on (SSO) credentials. User credentials may be received from the user through the user interface. The user may be authenticated with the received user credentials. For example, a processor, such as a trusted computing environment, may authenticate the user with the received user credentials for the RP to perform at least some functions of the trusted provider of SSO credentials locally to limit communications outside the user environment during the authentication process. Authentication may be through the use of a smart card web server (SCWS).

The authentication response may be transmitted via the user interface to the RP. For example, the authentication response may be transmitted when the user has been authenticated.

The indication received from the RP may be a redirection message. The redirection message may instruct the user interface to use the trusted computing environment to authenticate the user. For example, the redirection message may direct the browser to authenticate the user locally rather than to authenticate with the trusted provider.

A signature, such as a base64 encoded HMAC signature, may be calculated and may be provided to the RP via the user interface. This may be done, for example, to allow the RP to verify the credentials of the trusted computing environment. The trusted computing environment may calculate the signature based a shared secret between the trusted computing environment and a trusted provider, such as the OpenID provider, that may be associated with the MNO. The shared secret may be established between the trusted computing environment and the trusted provider through the user interface.

In one example embodiment, an authentication request may be received from the RP that may allow the RP to verify the credentials of the trusted computing environment. For example, the user interface may receive the authentication request from the RP. The authentication request may include an association handle. The user interface may provide the association handle to the trusted computing environment. A signature based upon a shared secret may be generated. An authentication response may also be generated that includes the signature and the association handle. The authentication response may then be provided to the RP.

2.3.2 Embodiments for Single Sign-On Using OpenID and SCWS

OpenID may provide a relaxed role for the Operator, providing trust in the OpenID Provider (OP) to Relying Parties (RPs) with minimum effort and risk. OpenID may work with pre-existing authentication methods and therefore the Operator may support authentication procedures to the OP using his own AAA and pre-provisioned AKA credentials in the UICC or other authentication methods including but not limited to PKI, pre-shared keys, SIP-Digest credentials, TLS etc.

The combination of OpenID and the smart card offers a path to an interesting value proposition. The Smart Card Web Server (SCWS) offers new IP-based services, which may provide users with a much richer and secure Web experience. The basic functionality of a Web server is the delivery of Web pages using the HTTP protocol. This is the same for a SCWS resident on a smart card or UICC. The SCWS may be the first step in integrating the UICC as a network node in the mobile phone provider's IP network.

In one example embodiment, the UICC may be used as a local trust center and proxy for the Operator. This may be done, for example, to keep authentication traffic local and to prevent burdening the Operator network. The OP enables many ways of binding an OpenID credential to a UICC and/or device and/or subscriber identity and/or subscriber, with scaling authentication strength. OpenID can interoperate with for example UICC-based UE authentication AKA credentials or GBA or other forms of authentication mechanisms such as certificate based authentication mechanisms. In embodiments disclosed herein, UEs may leverage the trust and reputation of the Operator for the on device OP proxy, providing increased security over the standard OpenID protocol.

2.3.3 OP on a Smartcard

Several embodiments described below in section 4, describe the integration of an OP on a smartcard. For example, one embodiment describes OpenID on a Smartcard with the smartcard web server (SCWS) resident. Another example embodiment describes improvements to the OpenID on SCWS.

The derived benefits of the embodiments described herein may include:
   User mobility in the use of OpenID
   Improved user control (enhanced security protection) of credentials since this critical information is now on-card rather than in the cloud
   Reduced need for the use of GBA resulting in considerably less loading on the network resources
   Authentication traffic is confined to the public internet, between network entities, with none required over the air—this is evident in the case of the improved protocol for the OpenID on SCWS

3 Standardization Landscape

Many formal and de-facto (industry) standardization bodies address identity management (IdM); however, most of these bodies focus on the use of IdM in the desktop environment. The embodiments disclosed herein provide IdM through local and/or distributed SSO providers that may be implemented in a trusted environment, such as smartcards, or on platforms such as Smartphones, H(e)NBs, or other types of devices which may include a trusted computing environment. The single sign-on provider may be those provided by standardization bodies, such as Liberty Alliance Providers, SAML providers, Kantara Initiative providers, OpenID providers, or the like.

3.2 Liberty Alliance

Liberty Alliance originated as an industry forum led by companies such as BT, AOL, Oracle, Intel, NTT, CA, Fidelity Investment, NTT and Sun Microsystems. The Alliance has release Liberty Alliance Frameworks series of specifications that address ID Federation (ID-FF) and Identity Web Services (ID-WSF).

The Liberty Identity Federation (ID-FF) specification 1.0 is a specification that allowed consumers and users of Internet-based services and e-commerce applications to authenticate and sign-on to a network or domain once from any device and then visit services from multiple Web sites, thereby bypassing the need for the user to re-authenticate and control privacy issues. The Liberty Alliance released two more versions of the Identity Federation specification, and contributed its federation specification, to OASIS, forming the foundation for Security Assertion Markup Language (SAML) 2.0. Liberty Alliance also published the Liberty Identity Web Services Framework (ID-WSF), which addressed the identity-based web services. This specification is an open framework for deploying and managing a variety of identity-based Web services, such as Geo-location, Contact Book, Calendar, Mobile Messaging, etc, in a secure and privacy-respecting federated social network.

The embodiment discloses herein disclose innovations that may be used to bolster the security and other aspects of Liberty Alliance standards in the context of UEs. For example, one embodiment discloses a mobile device that has, either as a detachable module or as an integrated module, a secure environment such as a UICC, Smart Card, or an integrated Trusted Environment (TrE), which may individually or collectively host some of the disclosed functions such as those of the Trusted Ticket Server or the TT verifier on the UE. These disclosed functions may individually or collectively add to more security and trust attestation than is currently available to ordinary UEs that may just support existing Liberty Alliance client protocols.

3.3 OASIS and SAML

The Organization for the Advancement of Structured Information Standards (OASIS) is a global open consortium for development, convergence, and adoption of e-business and web service standards. In the context of IdM, OASIS developed the Security Assertion Markup Language (SAML), currently in version 2.0.

SAML is an XML-based standard for exchanging authentication and authorization data between security domains, that is, between an identity provider (a producer of assertions about identities) and a service provider (a consumer of said assertions). SAML tries to solve the problem of Web Browser Single Sign-On (Web SSO), extending the traditional, intranet based SSO solutions into the open environment of the Web. SAML attempts to overcome the effects of proliferation of non-interoperable proprietary technologies using an XML (and XHTML) based open, standardized protocol. SAML differs from other IdM technologies such as OpenID in that it relies on the User Agent to provide request and assertions.

Figure 2:
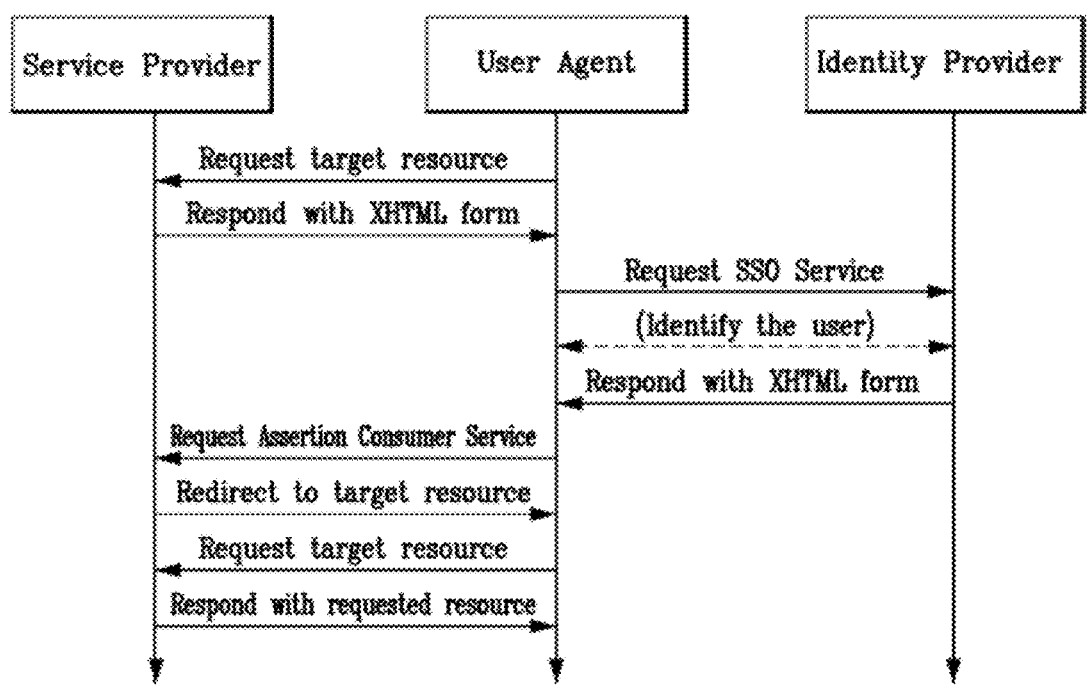
FIG. 2 illustrates the SAML protocol flow for exchanging authentication and data between an identity provider and a service provider.

FIG. 2 illustrates the SAML protocol for exchanging authentication and data between an identity provider and a service provider.

The embodiment discloses herein disclose innovations that may be used to bolster the security and other aspects of SAML in the context of UEs. For example, one embodiment discloses a mobile device that has, either as a detachable module or as an integrated module, a secure environment such as a UICC, Smart Card, or an integrated Trusted Environment (TrE), which may individually or collectively host some of the disclosed functions, such as those of the Trusted Ticket Server or the TTverifier on the UE. These disclosed functions may individually or collectively add to more security and trust attestation than is currently available to ordinary UEs that may just support existing SAML client protocols.

3.4 Kantara Initiative

Kantara Initiative is a successor organization to Liberty Alliance, led by some of the original backers of Liberty Alliance such as BT, NTT, T-Mobile, AOL, and Fidelity Investment. Kantara is not a standard defining organization (SDO) as Kantara's publications are recommendations and that are focused on two main technical topics: Identity Assurance and Interoperability.

Kantara first specified Identity Assurance Framework (IAP) v2.0, which extends the IAP v1.0 specification work done by Liberty Alliance. The IAP specifications original detail a number of identity assurance levels that helps linking together trusted identity-enabled enterprise, social networking and Web 2.0 applications, based on common, standardized rules and security risk assessments associated with each level of identity assurance. As such, the framework enabled a flexible and granular trust assurance to identity claims and evaluations. The Assurance Levels specified in are based on four levels of assurance outlined by the NIST Special Publication 800-63 version 1.0.1, and range in confidence level from low to very high.

The embodiment discloses herein disclose innovations to bolster the security and other aspects of IAP in the context of UEs. For example, one embodiment discloses a mobile device that has, either as a detachable module or as an integrated module, a secure environment such as a UICC, Smart Card, or an integrated Trusted Environment (TrE), which may individually or collectively host some of the disclosed functions such as those of the Trusted Ticket Server or the TTverifier on the UE. These disclosed functions may individually or collectively add to more security and trust attestation than is currently available to ordinary UEs that may just support existing Kantara IAP client protocols.

3.5 OpenID

OpenID is an open standard for authenticating users that can be used for access control, allowing users to log on to different services with the same digital identity where these services trust the authentication body. OpenID replaces traditional user log-on process, thereby allowing a user to log in once and gain access to the resources of multiple software systems. The term OpenID may also refer to an ID used in the standard.

OpenID is developed and maintained by the OpenID Foundation, a US-based non-profit organization. The OpenID Foundation (OIDF) consists of individuals and companies committed to enabling, promoting and protecting OpenID technologies.

As a term for ID used by the OpenID protocol, an OpenID is in the form of a unique URL, and is authenticated by the user's 'OpenID provider' (that is, the entity hosting their OpenID URL). The OpenID protocol does not rely on a central authority to authenticate a user's identity, nor the specific method of authentication itself. Since neither the OpenID protocol nor websites requiring identification may mandate a specific type of authentication, a diversity of authentication can be used, such as smart cards, biometrics, or ordinary passwords.

The embodiment discloses herein disclose innovations to bolster the security and other aspects of OpenID in the context of UEs. For example, one embodiment discloses a mobile device that has, either as a detachable module or as an integrated module, a secure environment such as a UICC, Smart Card, or an integrated Trusted Environment (TrE). As used herein, OpenID is as an exemplary protocol where the newly disclosed functions such as Trusted Ticket Server (TTS), TTverifier, and TCTicket, may be hosted by the said secure environment in the UE, and may make the UE, individually or collectively, more secure and trustworthy and also make such enhanced security and trustworthiness externally verifiable by use of these disclosed methods while the UE performs user identification client functions according to the OpenID protocol.

3.6 3GPP SA3 and its Work on OpenID

At 3GPP SA3, which is a security standardization work group at 3GPP, a comprehensive approach is taken on broad aspects of security for 2G, 3G and beyond mobile phones, terminals, and systems. In the space of IdM, currently, there is one Technical Report (TR 33.924) on integration of OpenID and Generic Bootstrapping Architecture (GBA). There is also another technical report (TR 33.980) on interworking of Liberty Alliance and GBA.

The embodiments herein disclose innovations to bolster the security and other aspects of OpenID and/or the integration of OpenID and GBA or other authentication mechanisms in the context of UEs. For example, one embodiment discloses a mobile device that has, either as a detachable module or as an integrated module, a secure environment such as a UICC, Smart Card, or an integrated Trusted Environment (TrE), which may individually or collectively host some of the disclosed functions such as those of the Trusted Ticket Server or the TTverifier on the UE. These disclosed functions may individually or collectively add to more security and trust attestation than is currently available to ordinary UEs that may just support existing 3GPP specified protocols for interworking of OpenID or Liberty Alliance over 3G networks.

4 Technical Overview

This section provides a technical overview of the embodiments that may provide Identity Management (IdM) solutions. For example, the embodiments may be used to place OpenID Provider (OP) server functionality in a mobile local platform, specifically Smart Cards.

Section 4.1, we provides an introduction to OpenID.

Section 4.2 discusses embodiments that provide OpenID on Smart Card as well as architecture, implementation options, variants, and the integration of 3GPP GBA (generic bootstrapping architecture).

Section 4.3 discusses embodiments that consider OpenID Provider (OP) Implementation Platform options. Additionally, section 4.3 discusses embodiments that implement JavaCard™ compliant smart cards, and embodiments that implement OP on a Smart Card Web Server (SCWS).

Section 4.4 discusses embodiments that handle Local User Authentication. Local User Authentication is a topic that is related to OpenID and other SSO technologies. Additionally, section 4.4 discusses embodiments that use biometrics.

Section 4.5 discusses embodiments that provide methods of 'Trust' and 'Trust relationships' that may be developed in the context of OpenID. For example, several embodiments are described that disclose the role of the MNO and the trust relationships it may have with other entities/actors in the OpenID protocol are treated in detail. In one example embodiment, the MNO is one and same as the main identity provider (IdP) and the OP on the Smart Card is a proxy of the MNO (acting as the IDP). In a second example embodiment, the OP on the smart card is not owned or managed by the MNO and MNO is not the IdP, but a third-party IdP owns and manages the OP on the Smart Card.

Section 4.6 discusses embodiments that may enable the OP to be implemented on platforms other than smart cards. For example, embodiments disclose implementation feasibilities on JavaCard™ and embedded secure elements. Additionally, embodiments describe how the notion of platform trust (as in Trusted Computing) may be integrated with the concept of Mobile OP, to give the Mobile OP even higher level of trust and security.

4.1 Introduction to OpenID

OpenID allows the user to use a single OP to log in to different relying party sites. The OP is the central storage place for the user's identity and acts as the single point of authentication for the user. As the user is authenticated to his OP, this OP can issue assertions to the relying parties (RPs), which in turn allow access to the services for the user. For convenience, the OP is also allowed to store personal information, comparable to a user profile. This information can then be exchanged between the OP and the RP after the login process to provide the RP with more detailed information on the user.

FIG. 3 illustrates the OpenID protocol flow for allowing a user to use a single OP to log in to different relying party sites. As shown in FIG. 3, a user attempts an OpenID login which then launches a discovery for the OpenID URI by the RP. An optional security association, in which a shared secret is established, can be created between the RP and the OP. With the discovery process complete the user is redirected by the RP to the OP where user authentication is attempted. The OP provides the user with a login web page, where the user is authenticated upon entering the appropriate credentials. Upon successful authentication the user is then redirected back to the RP where a login to the web's services is shown to the user.

4.2 OpenID on a Smartcard

In the OpenID protocol, the OP can be a repository for user credentials and other user personal information. As such the OP becomes the target of most attacks in the OpenID protocol, since stealing user credentials for authentication to the OP allows an attacker to access all OpenID enabled sites in the name of the user. In a more moderate attack scenario where the attacker exploits the browser session of a logged-in user, e.g. performs hidden actions on behalf of the user after the user has authenticated with his OP, the attacker does not gain the user credentials and hence cannot use them to log in to arbitrary sites. However, the design of the OpenID protocol allows the attacker to log in to all RP sites the user logged in to in previous browser sessions. The attacker does not necessarily have access to the user's machine, e.g. by malware or MITM, such an attack can be performed by any site (the site does not have to be a RP site) by using XSRF attacks with hidden frames in the website. If the attacker is able to inject malware or act as a MITM, the whole login process can be captured and then replayed whenever needed in a separate browser session. Additionally, if the user decided (at the OP) to allow subsequent logins without having to provide his credentials to the OP again (e.g. if the OP stores a persistent cookie in the user's browser) and sites use the 'request immediate authentication' option of the OpenID protocol, the user can get logged in by the attacker without notice. Thus OP security is a major concern with respect to OpenID implementations.

OpenID itself allows the user to install his own OP on a website he owns, e.g. a blog. However, it is very unlikely that the user is in possession of the host. Hence the user trusts the provider of his host to behave correctly and protect his private data in an appropriate way. While a customized OP with a user-specific design might thwart phishing attacks, since the attack can no longer be performed in an easy and automated way, all attacks which exploit the vulnerabilities of the OP implementation and the interface of the user's browser to the OP (MITM, malware, etc.) are still possible.

In one example embodiment, the functionality of an SSO provider, such as the OP, may be brought to a UE that may be controlled and/or in possession of the user. This may be done, for example, to provide a centralized environment to manage the user's identity whilst at the same time providing seamless and ease of authentication benefits offered by the OpenID protocol. If the user is able to have his own OP on a secure device which he controls, some of the attacks would be rendered more difficult to execute in a general way. Such a device to store and execute the OP for the user may be the trusted computing environment, such as the smartcard, the user carries in his mobile device. Most smartcards, such as UICC, Java cards, or the like are able to execute enhanced functions and are able to interact with the user.

Executing the OP on the smartcard that belongs to the user may allow the user to maintain more control over his private data. For some scenarios, such as when RPs charging fees for their services, it may be useful to convey information on the credibility of the smartcard based OP from the MNO to the RP. This may include a back-channel that allows the RP to charge the user via the MNO. The user may use a local channel for authentication to the OP, for example, via PIN code. The OP may be installed remotely by the MNO and the necessary credentials for the OP may be brought to the smartcard via the GBA protocol.

FIG. 4 illustrates an example embodiment of a protocol flow for providing an SSO protocol with an integrated OP on a trusted computing environment. The protocol flow may be used, for example, to provide OpenID with an integrated OP on the smartcard.

As shown in FIG. 4, at 201a user may use a user interface agent, such as a web browser, to visit a RP and may select to login using OpenID. At 202, the RP may redirect the user interface agent to a local OP that may be included within a trusted computing environment, such as a smartcard, a UICC, a Java card, or the like. At 203, the user may authenticate locally to the OP on the trusted computing environment through a PIN code, a biometric identity, or the like. The OP within the trusted computing environment may generate an authentication response at 204. At 205, the OP may redirect the user interface agent to the RP and may include the assertion that the user authenticated. At 206, the user interface agent may be redirected to the RP and the user may be logged in after the RP verifies the assertion from the OP.

The RP may have to establish a connection using, for example, a public internet communication to a web service entity provided by the MNO (if the OP is provided by the MNO. This may be done, for example, when the RP is not able to communicate with the OP on the trusted computing environment directly. The MNO may have a remote management interface to the trusted computing environment, and additional communication channels, as for example SMS, which allow the MNO to communicate with the device and/or the trusted computing environment. The MNO may act as a negotiating bridge between the RP and the OP on the trusted computing environment.

FIG. 5 illustrates an example embodiment of a protocol flow for providing OpenID with an integrated OP on a smartcard.

As shown in FIG. 5, at 207 the user may visit the RP and select to login using OpenID. At 208 the service may redirect the user (the user's browser) to his local OP. The user may authenticate locally to the OP at 209, for example, by using a PIN code via a smartcard interface and/or biometric identities. The OP may generate an authentication response at 210. At 211, the OP may redirect the browser to the RP and may include the assertion that the user authenticated. At 212, the browser may be redirected to the RP and the user may be logged in after the RP verifies the assertion from the OP.

The RP may have to establish a connection using, for example, a public internet communication to a web service entity provided by the MNO (if the OP is provided by the MNO. This may be done, for example, when the RP is not able to communicate with the OP on the smartcard directly. The MNO may have a remote management interface to the smartcard, and additional communication channels, as for example SMS, which allow the MNO to communicate with the device and/or the smartcard. The MNO may act as a negotiating bridge between the RP and the OP on the smartcard.

4.2.1 Architecture and Preferences 4.2.1.1 RP OP Communication Requirements

In one example embodiment, for the RP to get an assertion from the OP running on the trusted computing environment, such as a smartcard, the RP has to communicate with the OP. The RP may transport the user identifier to the OP and then after authentication, the OP may inform the RP of the outcome of the authentication.

The OpenID protocol uses two different types of communication during the protocol. Indirect communication is performed via HTTP redirect or HTML form submissions. The communication is indirect in the sense that the communication is passed through the user's browser. Indirect communication is used for authentication requests (from the RP, via the browser, to the OP) and authentication responses (from the OP, via the browser, to the RP). Direct communication is performed between RP and OP directly and is used to establish an association and to verify assertions directly with the OP.

Since the establishment of an association (and hence a shared secret) between the RP and the OP is not mandated, two protocol flows exist for the OpenID authentication.

The embodiments described herein may be implemented using either protocol flow for OpenID authentication.

4.2.1.1.1 Background for Association based Communication

Figure 6:
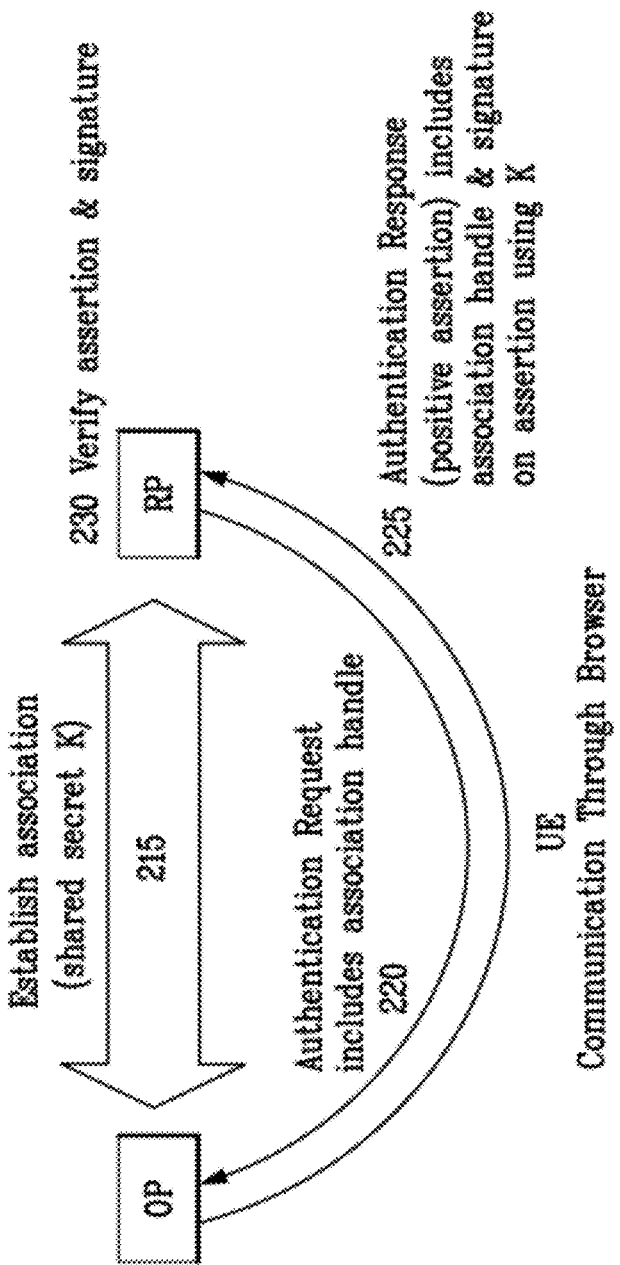
FIG. 6 illustrates the OpenID protocol flow for association based communication.

FIG. 6 illustrates the OpenID protocol flow for association based communication.

As shown in FIG. 6, the association between OP and RP in the OpenID protocol does not rely on a pre-shared secret between OP and RP. It is an initial step, performed by the RP after the user provided his OpenID identifier to the RP and wants to log in to the RP using OpenID. At 215, the RP connects to the OP (via HTTPS) and performs a Diffie-Hellmann Key Exchange to establish a (short-term, per-authentication-session) shared secret k with the OP. This shared secret is then later on used by the RP at 230 to verify the signature on the assertion message which originally comes from the OP but is received by the RP from the user's browser via indirect communication (browser redirect).

If an association (and hence a shared secret k) is established between the RP and the OP, the association handle is passed in the authentication request and response (via indirect communication) at 220. At 225, the authentication response from the OP contains the association handle and a signature on the assertion using the shared secret k. The RP can then autonomously verify the signature using k. The use of association handles allows both the OP and the RP to keep track of multiple simultaneous sessions.

4.2.1.1.2 Background for Stateless Signature Verification

Figure 7:
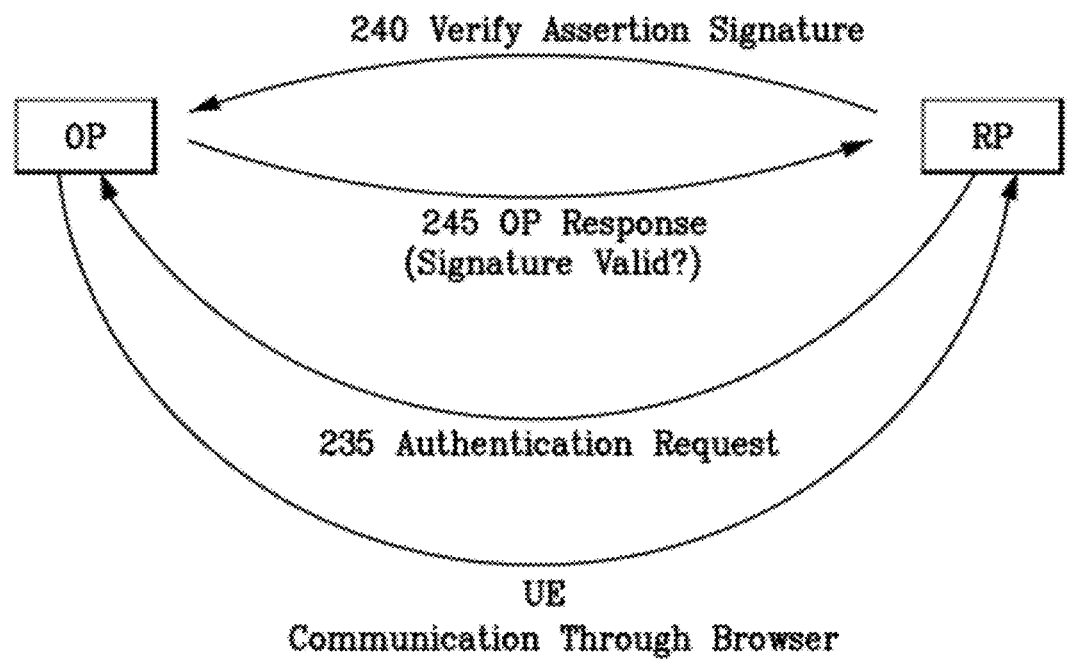
FIG. 7 illustrates the OpenID protocol flow for stateless signature verification.

FIG. 7 illustrates the OpenID protocol flow for stateless signature verification.

As shown in FIG. 7, if no association is established between the RP and the OP, the RP must verify the signature in the received authentication at response at 235 in a direct message to the OP at 240. At 245, the OP then has to issue a statement to the RP, which contains an 'is_valid'-field set to 'yes' if the assertion is a valid one and has indeed been issued by the OP.

While authentication requests and responses are passed through the user's browser by HTTP redirects, and hence do not require any direct communication channel between RP and OP in any scenario, there must be a way for the RP to verify the signature on the received assertion. If the original protocol must remain standards-compliant, the RP must at least be able to contact the OP once after receiving the assertion for signature verification. The establishment of an association will then not be necessary.

4.2.1.2 Embodiments for Discovery of OP on Local Device for Authentication

When using OpenID protocols, the RP does not necessarily need to discover the OP when performing indirect communication.

In one example embodiment, the browser being used to access the RP will get a redirect pointing to the local OP on the smartcard. The RP may not even need to know the address of the OP, since the channel between the browser and the RP is used. The redirect however may need to point the browser to an address. This address may be given as a device-local IP-address (similar to 127.0.0.1, referring to the local host) which would be recognized by the browser that then engages local authentication.

In another embodiment, a special identifier may be used that is translated by the browser for the purpose of being redirected to the local OP and pursuing user authentication. Such an identifier may, for example, be in the form sc:// openid/identifier which tells the browser to engage in an authentication session with the OP on the smartcard for the identifier. The authentication request may be transformed in the right communication format for the trusted computing environment, such as a smartcard. The authentication may then take place between the user and the UICC via an appropriate interface, depending on the UICCs capabilities. For example, authentication may occur using a PIN code, a biometric verification, or the like. The authentication may indicate that a user has given consent to the authentication otherwise. This may be done, for example, to prevent attacks that may be possible where the smartcard is used by an attacker or unauthorized user to authenticate without the user's knowledge.

With the coupling of the authentication to user interaction, the user may be aware of the transaction taking place. Depending on the smartcards capabilities it may be good to show the actual transaction details, i.e. which site is acting as the RP, the return to URL at the RP and which identity is to be used. If the OP on the smartcard supports multiple OpenID identities, the OP may even present the user with a choice of identities to use with this RP. After local authentication to the OP (e.g. using a PIN code), the browser is redirected to the RP, including the positive assertion from the OP.

In an example embodiment, the assertion may be verified by the RP and therefore a direct communication between the RP and the OP is required, either via an association or a direct signature verification as described in the previous section. Methods for assertion verification are implementation specific and are further described below in section 4.2.2.1.

4.2.1.3 Embodiments for MNO Asserted Identities

In an example embodiment, the local OP on the trusted computing environment, such as a smartcard, is used for local user authentication. The MNO may be the entity, which provides the necessary assertion to the RP, after receiving a triggering message from the local OP on the smartcard, stating that the user authenticated successfully. This embodiment is further described as a Split-OP scenario in section 4.2.2.1.2.

4.2.2 Implementation Options and Variants for Embodiments

This section is intended to discuss implementation options and variants for embodiments that may be combined with the more general concepts disclosed herein.

4.2.2.1 Embodiments for RP-OP Communication for Assertion Verification 4.2.2.1.1 Embodiments for Integration of BONDI In one example embodiment, a direct communication channel between the RP and OP may be used at least for the verification of the assertion signature. Such a direct channel may be provided, for example, by tunneling the traffic through the user's browser between OP and RP. This concept may require the browser to perform an additional redirect inside the current session.

In another embodiment, the browser may act as the single point of contact for the RP for a second process that may be used to establish a communication channel between RP and OP. Since the specified communication protocol between RP and OP is HTTP or HTTPS, the browser may be capable of transporting all traffic.

To facilitate the browser communication with the trusted computing environment, such as a smartcard, the OMTP BONDI API may be used. The BONDI API may allow the browser to use JavaScript in order to communicate with the smartcard and hence the OP. By using BONDI, the redirects may even be reduced. The RP includes an appropriate JavaScript call in the webpage that the RP sends to the browser. This JavaScript call invokes the BONDI API and may allow access to the smartcard. The result of the call may then be wrapped by the same JavaScript in a response message to the RP (e.g. in an HTTP POST message). Depending on when the RP uses the BONDI calls, the RP may either establish an association when the RP uses the smartcard call in the Authentication request redirect page or it could use the page which is shown after the RP receives the OP assertion, which would enable the RP to perform the direct verification without an association.

Figure 8:
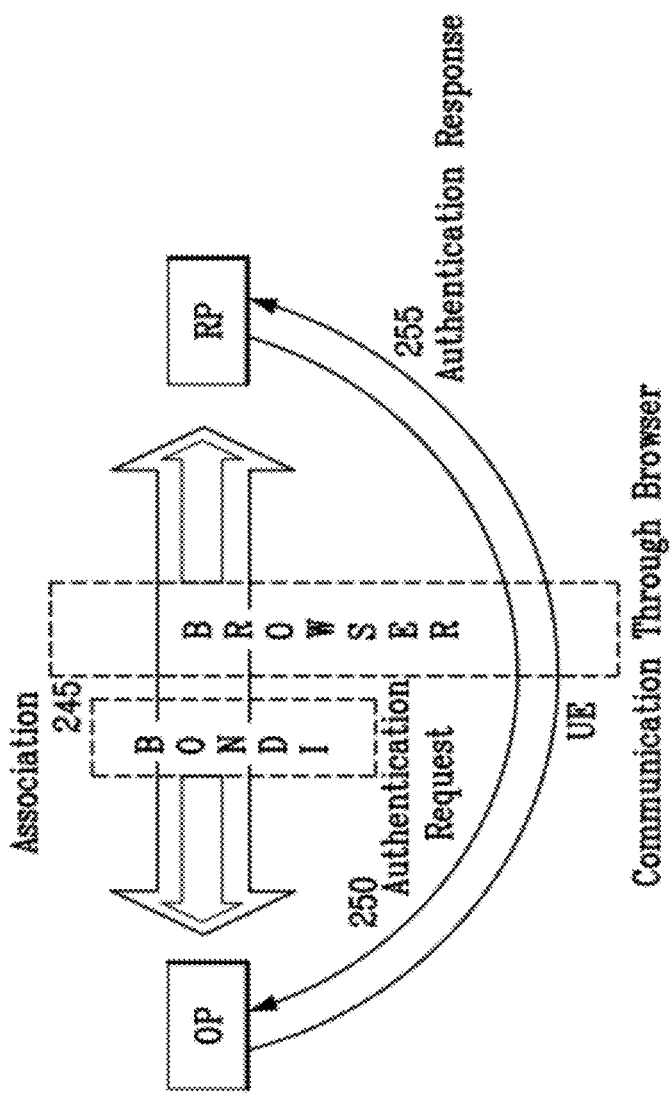
FIG. 8 illustrates an example embodiment for the integration of BONDI with association based OpenID.

FIG. 8 illustrates an example embodiment for the integration of BONDI with association based OpenID. As shown in FIG. 8, at 245 an association is established between the OP and the RP using BONDI. BONDI may allow the browser to communicate with the trusted computing environment, such as a smartcard, and/or the OP that may be within the trusted computing environment. At 250, an authentication request is received at the OP from the RP. At 255, an authentication response is communicated back to the RP.

Figure 9:
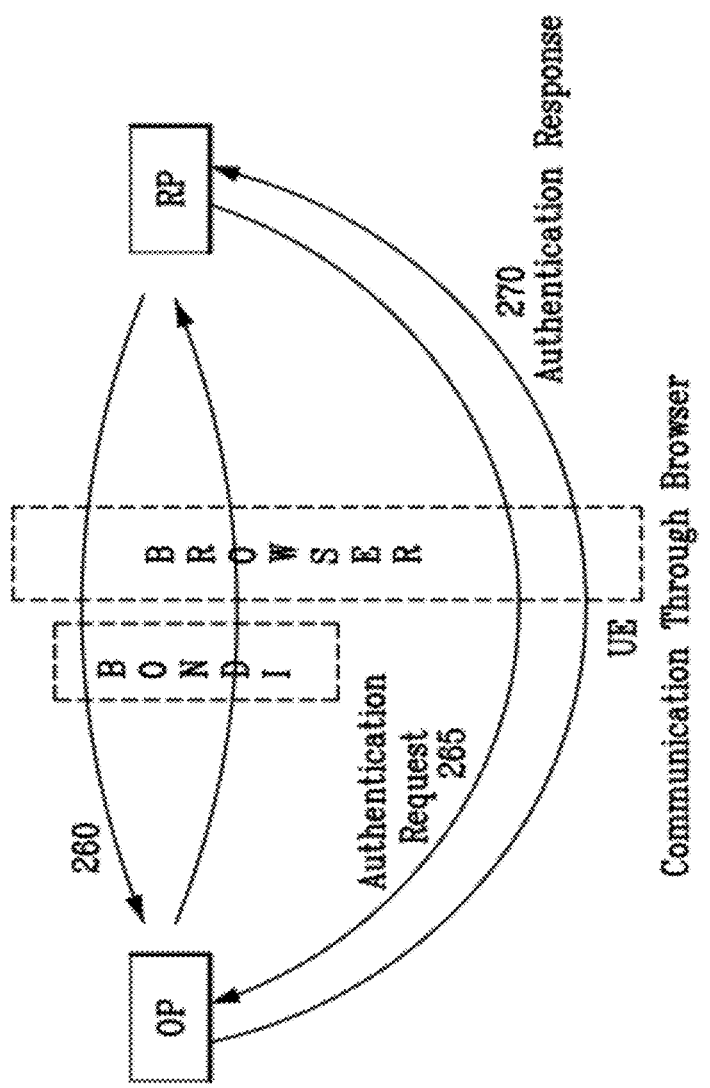
FIG. 9 illustrates an example embodiment for the integration of BONDI with stateless signature verification.

FIG. 9 illustrates an example embodiment for the integration of BONDI with stateless (no association) signature verification. As shown in FIG. 9, at 260 the OP and the RP communicate via BONDI and the browser. The RP transmits an authentication request at 265 to the OP. The OP transmits an authentication response at 270 to the RP.

4.2.2.1.2 Embodiments for Split OP

In one example embodiment, the RP may verify the received assertion through the use of a Split-OP. In a Split-OP, the OP functionality may be divided between the MNO and the local OP. While the local OP may be responsible for user authentication, the MNO may communicate with the RP to verify the signature from the smartcard OP. This may be either done with an association, which is set up between the RP and MNO or via stateless signature verification.

Figure 10:
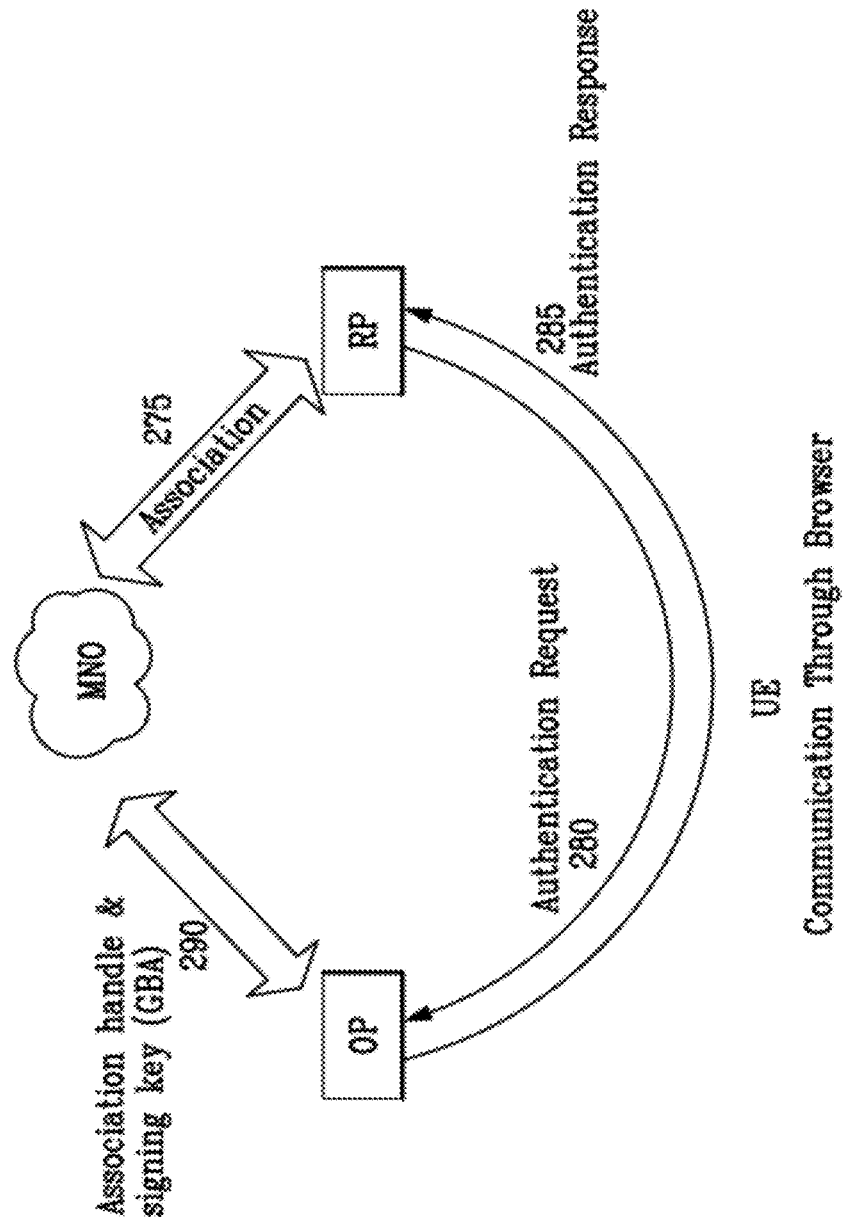
FIG. 10 illustrates an example embodiment for enabling a Split-OP.

FIG. 10 illustrates an example embodiment for enabling a Split-OP. As shown in FIG. 10 an association may be set up between the RP and MNO at 275. The RP may establish a shared secret with the MNO, which may then be used by the OP in the signing process of the assertion message. The assertion message may also have to include the association handle for the RP to identify the right shared secret if the RP has multiple simultaneous connections with different users. The shared secret may allow the RP to verify the assertion signature without having to communicate with the OP. This association may be performed before the first redirect of the UE's browser from the RP is performed.

At 280, the OP may transmit an authentication request to the RP. At 285, the RP may transmit an authentication response to the OP. At 290, the OP may establish an association handle and a signing key with the MNO. The association handle and the signing key may be established using GBA.

In the case that no association is established between the RP and the MNO, the RP may still need to be able to verify the received signature by contacting an entity at the MNO. This entity may be required to issue a statement about the validity of the signature. In one example embodiment, an option would be to check if the OP really belongs to the OP issued by the MNO. Such a check may require the OP to include a unique identifier in the authentication assertion message to the RP which is then forwarded to the MNO. It may even be possible to use the OP address (IMEI/IMSI) as such an identifier. If the OP is registered as a valid OP with the MNO, the MNO would return a message to the RP with the 'is_valid' field set to yes, such that the RP accepts the assertion message (assertion verification). The split OP scenario may allow the MNO to retain control over the OpenID process in a way that offloads the burden for all authentication to the local OP on the smartcard, while the MNO still has the option to revoke identities by replying with 'is_valid' set to no. The signature verification may be performed as the last step of the protocol, before the user is logged in to the RP.

Figure 11:
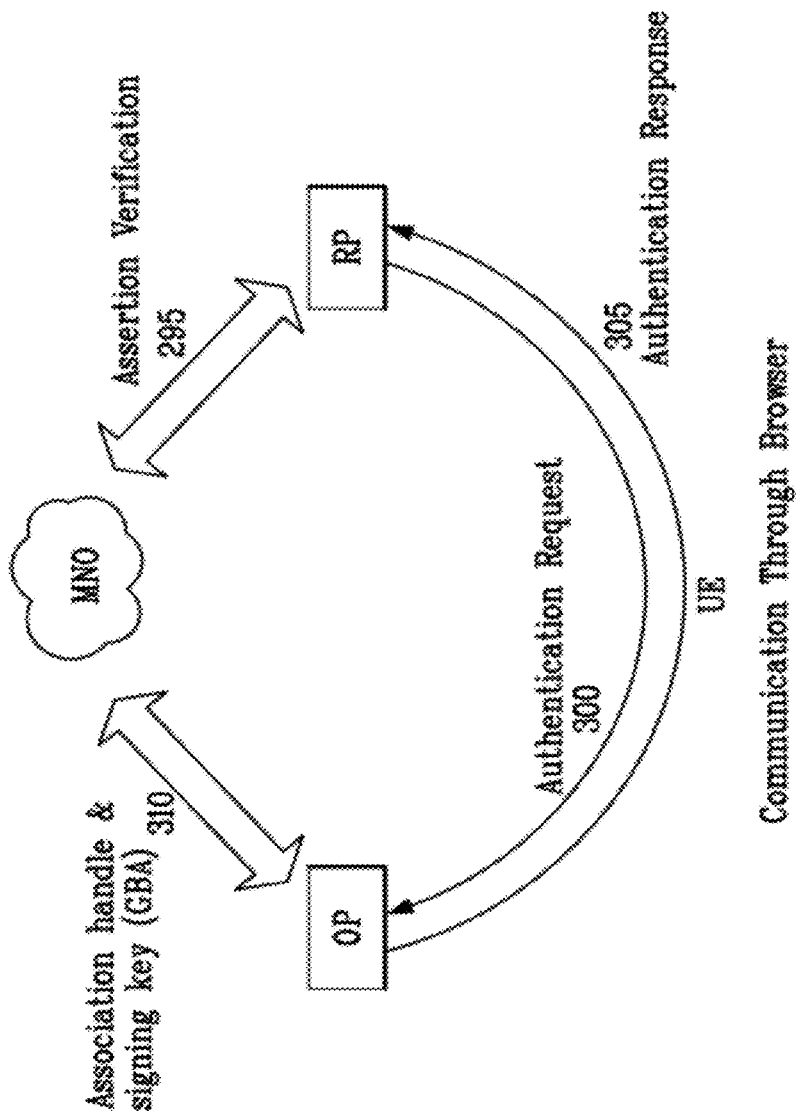
FIG. 11 illustrates another example embodiment for enabling a Split-OP.

FIG. 11 illustrates an example of a stateless (no association) embodiment for enabling a Split-OP. At 295, assertion verification may occur between the MNO and the RP. At 300, the RP may transmit an authentication request to the OP. At 305, the OP may transmit an authentication response to the RP. At 310, an association handle and a signing key may be established between the OP and the MNO. The association handle and the signing key may be established using GBA.

In another example embodiment, for the MNO to communicate with the OP on the smartcard it may also be explored if standard OTA management procedures, using encrypted SMS as bearer, can be used. Commands that are included in the SMS may be decrypted by the SIM card and executed as defined in 3GPP TS 11.11.

In another example embodiment, the Bearer Independent Protocol (BIP) may be used with Card Application Toolkit Transport Protocol (CAT_TP). BIP allows the opening of a data channel from the handset to the OTA server and to the (U)SIM card, resulting in an end to end data channel. Compared to SMS, where one SMS has the size of 140 Bytes, a data package for BIP contains 1472 Bytes. BIP can use the UEs GPRS connection for faster connection. BIP is standardized in 3GPP TS 31.111, CAT TP in the ETSI TS 102 124.

4.2.2.2 Embodiments for use of 3GPP GBA for OP on a Smartcard

In one example embodiment, GBA may be used to incorporate UICC/H(e)NB based OPs as described throughout the present application. For example, the GBA protocol may be used and established by many MNOs.

4.2.2.2.1 Introduction to the GBA

The 3GPP GBA protocol specification (3GPP TS 33.220) is a technology to enable user authentication, using the user's valid identity on the Home Location Register (HLR) or Home Subscriber Server (HSS). GBA Authentication takes place by having a network component challenge the SIMcard in the UE and verify that the answer is similar to the one predicted by the HLR/HSS. GBA is a representative of a shared key authentication method.

The Bootstrapping Server Function (BSF), a MNO network entity acts as a mediator between two endpoints and enables them to establish a shared secret (which can be limited in lifetime).

Figure 12:
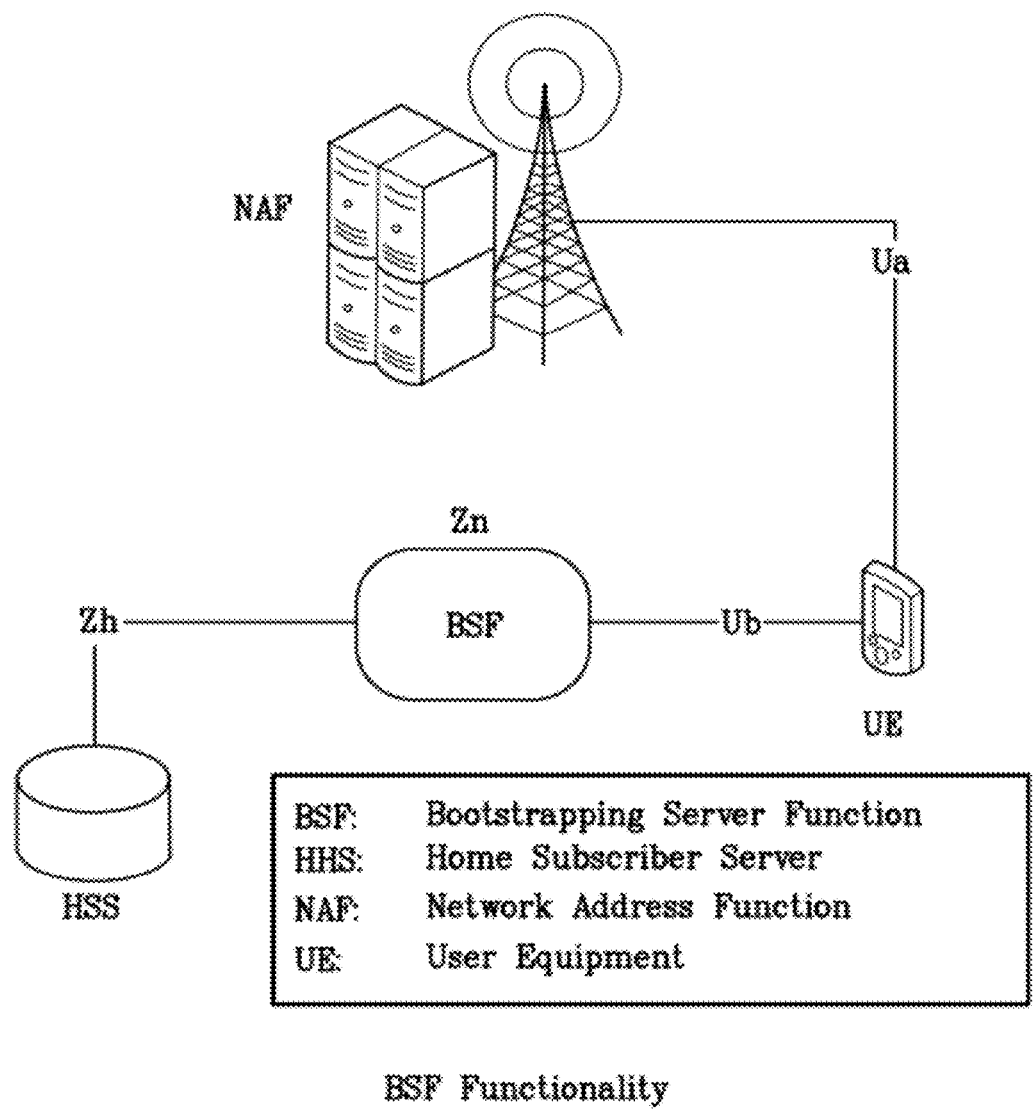
FIG. 12 illustrates BSF functionality for use in GBA architecture.

The following diagrams are included as a reference and shall give an overview of the GBA architecture and its elements:

FIG. 12 illustrates BSF functionality for use in GBA architecture.

Figure 13:
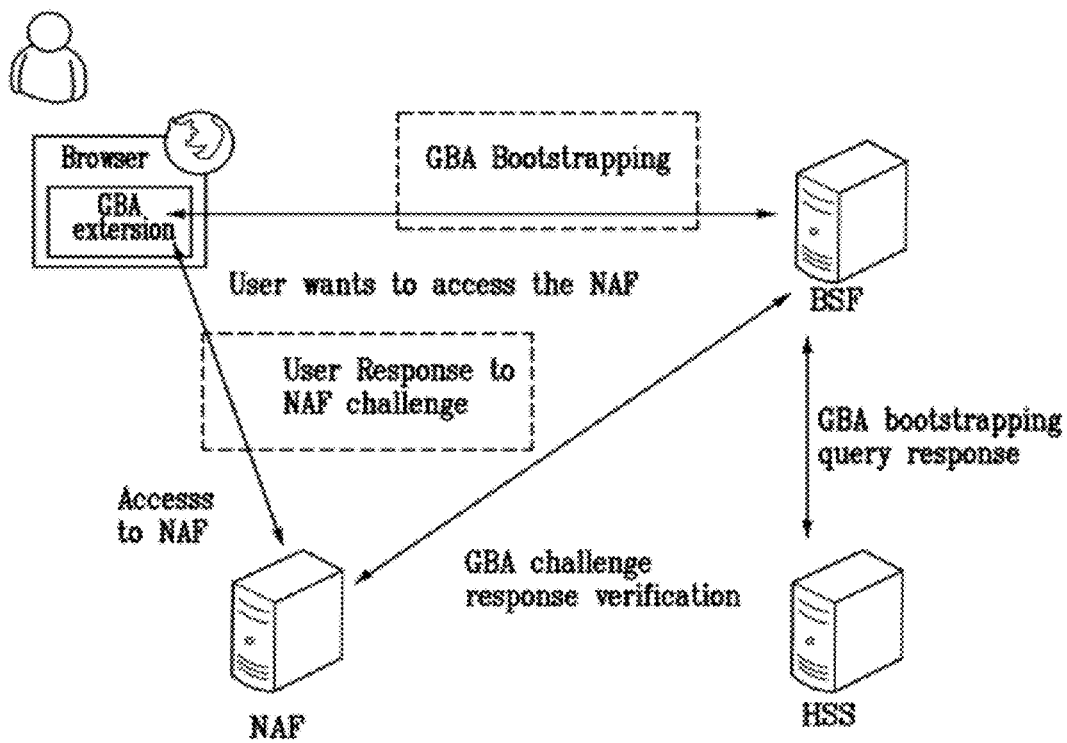
FIG. 13 illustrates GBA an architecture overview.

FIG. 13 illustrates GBA an architecture overview.

Figure 14:
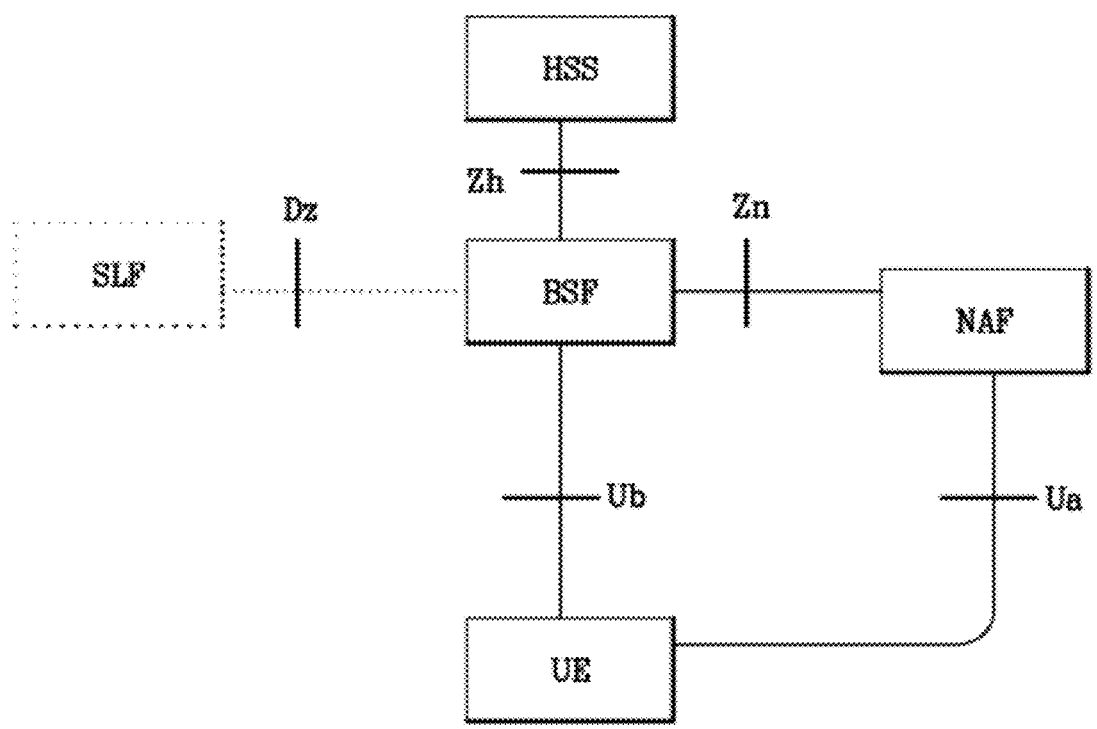
FIG. 14 illustrates a GBA reference module from 3GPP TS 33.220.

FIG. 14 illustrates a GBA reference module from 3GPP TS 33.220.

Figure 15:
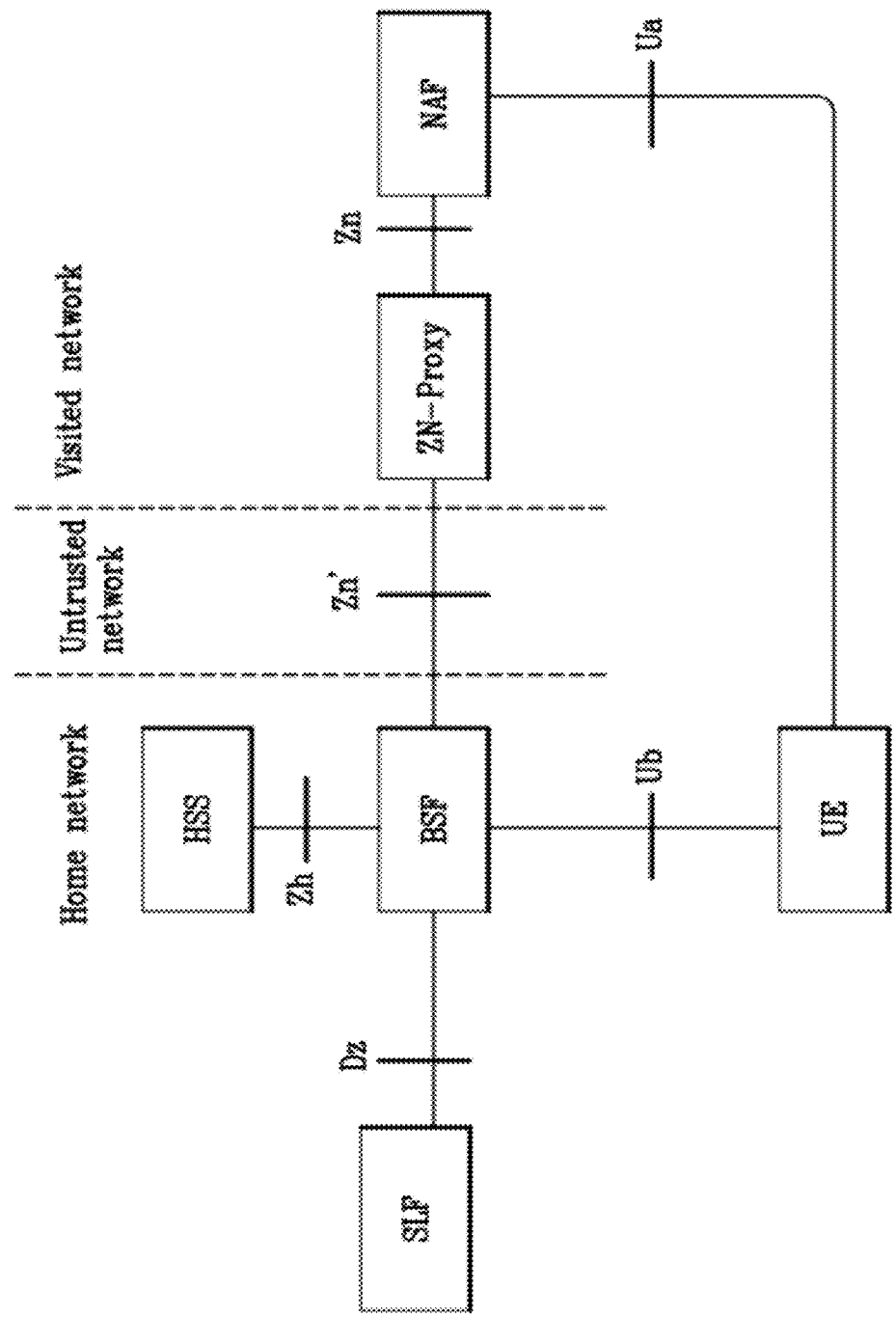
FIG. 15 illustrates a GBA reference module for visited network NAFs from 3GPP TS 33.220.

FIG. 15 illustrates a GBA reference module for visited network NAFs from 3GPP TS 33.220.

4.2.2.2.2 Prior Art in Integration of GBA and SSO

GBA can be used to exploit the 3GPP authentication and key agreement process to produce application specific credentials in the context of SSO. One example of such use is given in 3GPP TR 33.980, which describes an inter-working scenario between GBA and the Liberty Alliance SSO protocol. Another example would be in 3GPP TR 33.924 which describes an interworking scenario between GBA and the OpenID protocol. The 3GPP TR uses GBA keys to perform user authentication between a co-located NAF/OP as identity provider and the UE/user's UICC. In the remainder of this section, by way of example, we focus on inter-working between GBA and OpenID.

The UE uses the BSF of the MNOs HSS to create these application layer credentials over the Ub interface. These are then shared with the OP/NAF via the Zn interface. The UE client can then communicate directly with the Service Provider using these credentials.

Figure 16:
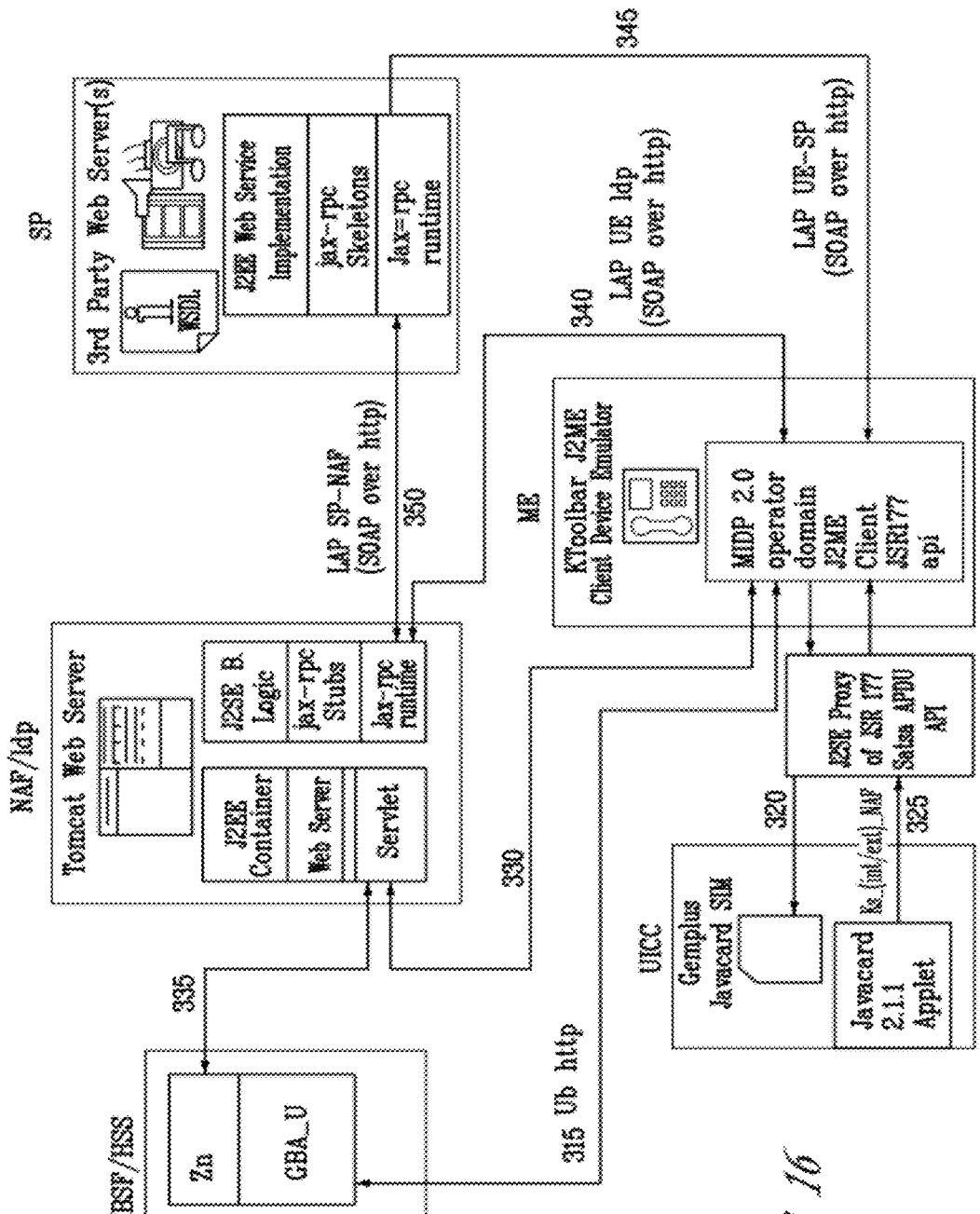
FIG. 16 illustrates an Architecture Scheme for Liberty/GBA.

FIG. 16 illustrates an Architecture Scheme for Liberty/GBA as shown in "A Web Services Shopping Mall for Mobile Users" written my MacDonald et. al. As shown in FIG. 16, GBA may be integrated with Liberty Alliance Protocol to provide a shopping mall that implements a Liberty IdP. Through the Liberty IdP, the shopping mall provides identities for users which they can use at shopping services. The IdP uses the GBA protocol as authentication mechanism.

FIG. 16 illustrates the following steps:

315 Once registered, the User Agent of the (UE) performs GBA U with (BSF) over Ub.

320. The User Agent applet within the UICC is provided with Ub parameters.

325. The UICC component of the User Agent calculates the Ks and provides the UE with the service layer credentials (K s (int/ext) NAF). The K s always remains in the UICC.

330. The User Agent makes contact with the (NAF/IdP) to obtain a "Shopping Mall" identity

335. Service credentials appropriate to the User Agent are communicated via Zn to the (NAF/IdP)

340. An authentication token for the "Shopping Mall" is provided to the User Agent from the (NAF/IdP)

345. (UE) communicates with (SP) using service credentials and requests a service

350. (SP) confirms validity of (UE)'s service credentials.

4.2.2.2.3 Embodiments on the Use of GBA and OpenID

In one example embodiment, GBA may be used to establishing a shared secret between the UICC and the NAF. The NAF may be co-located with other services (e.g. IdP) and may not have to be located inside the MNO network. The NAF may require a connection to the BSF (inside the MNO's network). The connection between the UICC inside the UE and NAF may be, for example, via SOAP over HTTP or HTTPS. In other embodiments, which are further discussed below, UICC based OP which may be used for communications between the OP and the MNO may use the GBA protocol.

4.2.2.2.3.1 MNO as (Direct) Trust Provider for the OP

In one example embodiment, the MNO may be directly involved in the RP-OP communication in the sense that the MNO may be used to establish trust between RP and OP.

The following embodiments may be integrated with the embodiments previously discussed in section 4.5.2.2.1.

Embodiments for Direct Connection Between RP and MNO

Figure 17:
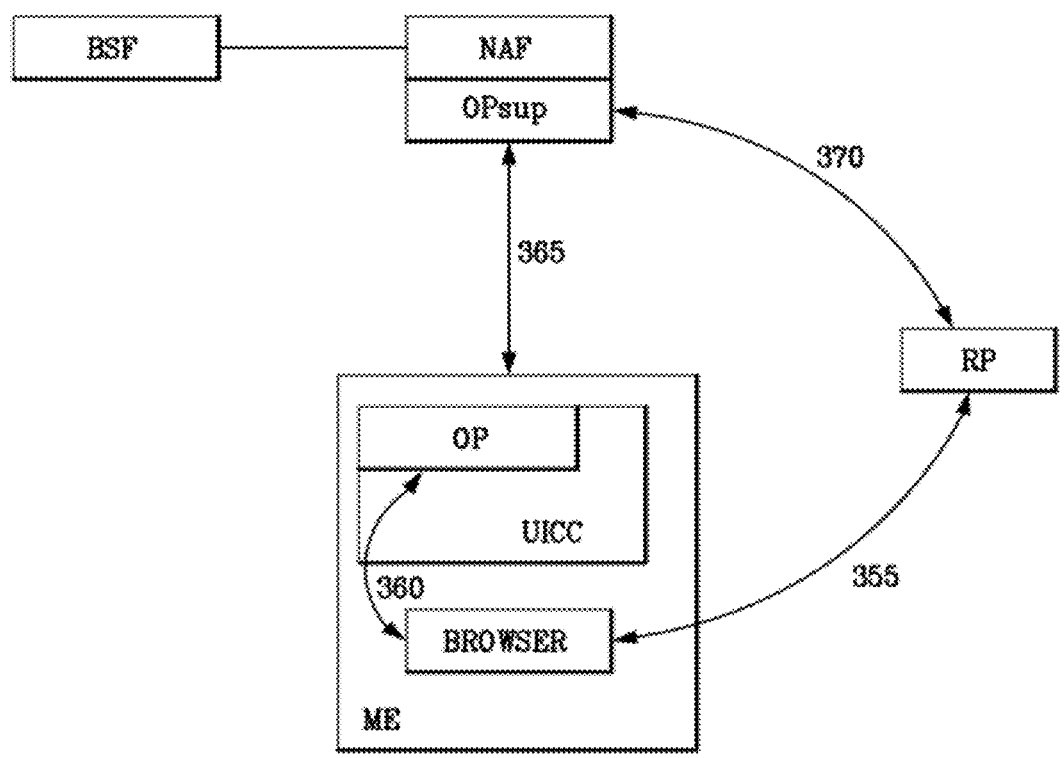
FIG. 17 illustrates an example embodiment for the use of GBA for MNO-backed identity assertions.

FIG. 17 illustrates an example embodiment for the use of GBA for MNO-backed identity assertions.

As shown in FIG. 17, the RP may connect to a network entity of the MNO to establish an association at 370. This MNO entity may act as an assertion support for the UICC-based OP; this entity may be referred to as OPsup. The OPsup may have an integrated NAF functionality and may be realized as an MNO network internal (but reachable) or external (but operated or certified by the MNO) entity. The OPsup and the OP on the UICC may perform the necessary bootstrapping processes to establish a shared secret using GAA/GBA at 365. The user's browser may be redirected from the RP to the local OP at 355. Communication may occur between the browser and OP may occur at 360.

The user may authenticate to the local (UICC) OP. After local authentication at 360 (e.g. using a PIN) the OP may send a message containing the session identifier (or an additional nonce passed by the RP in the initial redirect) signed with the RP specific, and optionally session-specific key, Ks_NAF_RP, derived from the Ks_NAF to the OPsup at 365. If a secure connection between OPsup and RP is already established at 370, the OPsup may forward this message to the RP, since the established channel already provides authenticity of source and integrity protection for the message. However, the OPsup may sign the message with a public key, and hence provide integrity protection and authenticity independently from the communication channel. The RP may be equipped with a RP specific, and optionally session-specific key, Ks_NAF_RP, derived from the Ks_NAF to verify the OP signature. The Ks_NAF_RP may then be passed to the RP via the OPsup. In another embodiment, the KS_NAF may be used directly for signature creation and verification.

Embodiments for Indirect Communication through OP

In one example embodiment, indirect communication may be used to transfer a nonce from the RP to the OP which then forwards it to the MNO. The MNO signs the nonce which may be included in the assertion which is passed back from the OP to the RP after successful local authentication. Since the MNO signs the nonce, to provide an assurance to the RP that the OP is running on an MNO-issued UICC.

Embodiments for Combined Method

In one example embodiment, a shared secret which is established between RP and MNO via direct communication (e.g. an HTTPS connection) may be used. The RP may then expect the OP to include this secret in the assertion message upon completed authentication.

In another example embodiment, GBA may be used. Because the GBA protocol does not allow establishing an arbitrary shared secret (e.g. the RP's secret) between NAF and UICC, an indirection may be used here (e.g. a co-located OPsup entity). The RP sends a session identifier to the OPsup, which may established a shared secret with the UICC using GBA. The OPsup then signs the session identifier using the same secret as established with the UICC (and hence the OP on the UICC) and may send the signed session identifier back to the RP. The RP may keep this signed session identifier as a reference. The RP includes the session identifier in the redirect message which may allow the OP to sign it using the GBA secret. The OP may then include the signed session identifier in the assertion message to the RP. The RP may then compare the signed message from the OP and from the OPsup. If they match, the RP has a proof that the OP belongs to a subscriber of the MNO of the OPsup. This embodiment may represent a closed loop process, with signature matching solidifying message protection and establishing OpenID authentication.

4.2.2.2.3.2 Embodiments for the Use of GBA when OP Function is Split Between MNO and OP on Smart Card (Split OP)

Figure 18:
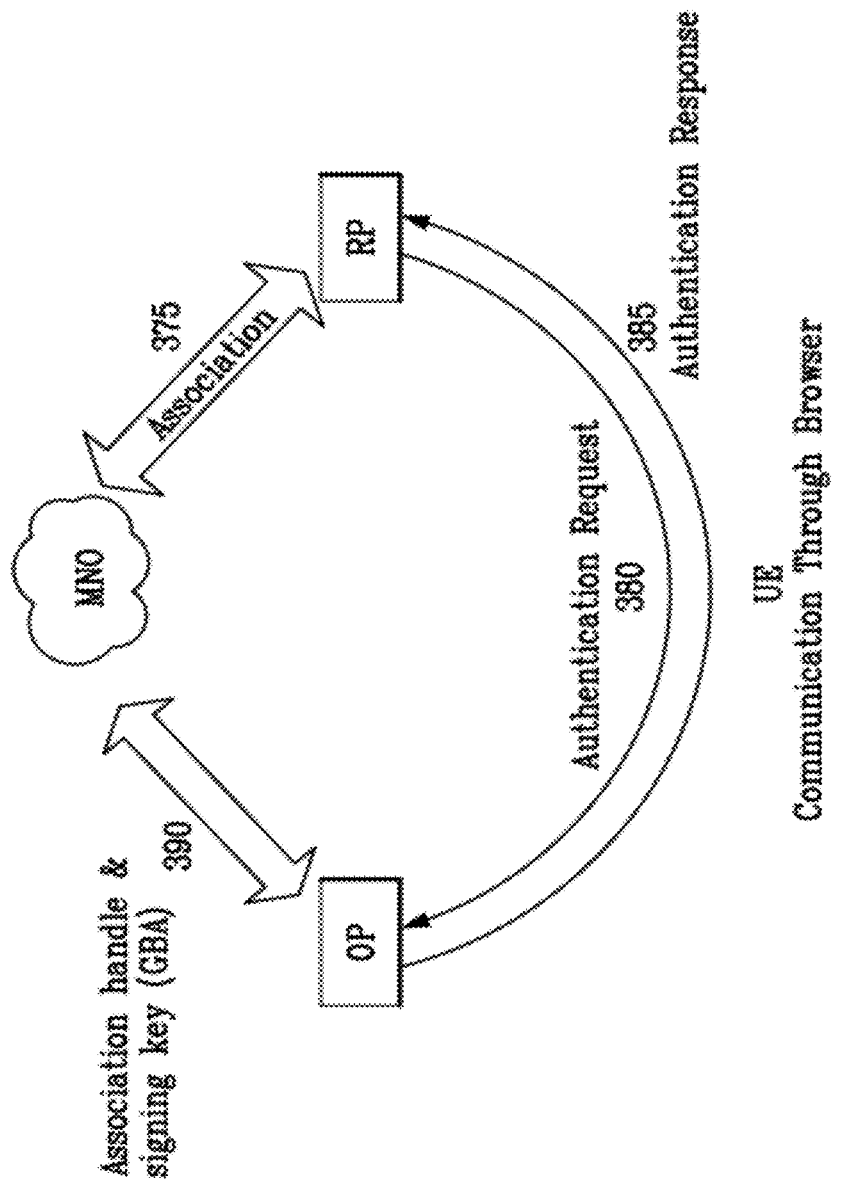
FIG. 18 illustrates another example embodiment for enabling a Split-OP.

FIG. 18 illustrates an example embodiment for enabling a Split-OP. As shown in FIG. 18 an association may be set up between the RP and MNO at 375. The RP may establish a shared secret with the MNO, which may then be used by the OP in the signing process of the assertion message. The assertion message may also have to include the association handle for the RP to identify the right shared secret if the RP has multiple simultaneous connections with different users. The shared secret may allow the RP to verify the assertion signature without having to communicate with the OP. This association may be performed before the first redirect of the UE's browser from the RP is performed.

At 380, the OP may transmit an authentication request to the RP. At 385, the RP may transmit an authentication response to the OP. At 390, the OP may establish an association handle and a signing key with the MNO. The association handle and the signing key may be established using GBA.

In one example embodiment, the OP functionality may be divided between MNO and local OP. If an association between RP and MNO is used, the RP may establish a shared secret with the MNO, which may then be used by the OP in the signing process of the assertion message. The assertion message may also include the association handle for the RP to identify the right shared secret if the RP has multiple simultaneous connections with different users. The shared secret may allow the RP to verify the assertion signature without having to communicate with the OP. With the assumption that GBA has taken place the shared key between the MNO and the RP may be passed to the OP protected by the Ks_NAF. Thus the OP may sign the assertion message using the shared key established via association.

The RP may establish the association with the MNO which then performs a GBA procedure which generates a shared secret between MNO and OP. The MNO may implement a NAF function at a server which is reachable for the RP. The NAF may establish a shared secret with the OP on the UICC and the RP receives the shared secret from the NAF. The association handle (which is known to the NAF and RP) may also be sent from the MNO contact point (NAF) to the OP. The OP may then signs the assertion which is sent to the RP using the GBA shared secret, including the association handle. Since the RP may have received the same shared secret via the association link from the NAF, the RP can verify the OP signature. The use of association handles allows the OP and RP to handle multiple (simultaneous) sessions.

4.2.2.2.3.3 Use of GBA in Mobile OpenID in Split Terminal Case

In one example embodiment, GBA may be used in a split terminal configuration where the browser and the OP/UICC combination are resident in separate devices. It may be assumed that a split-terminal type configuration is employed but where the OP is a local entity to the user and where the user performs authentication locally with the OP as previously described.

Figure 19:
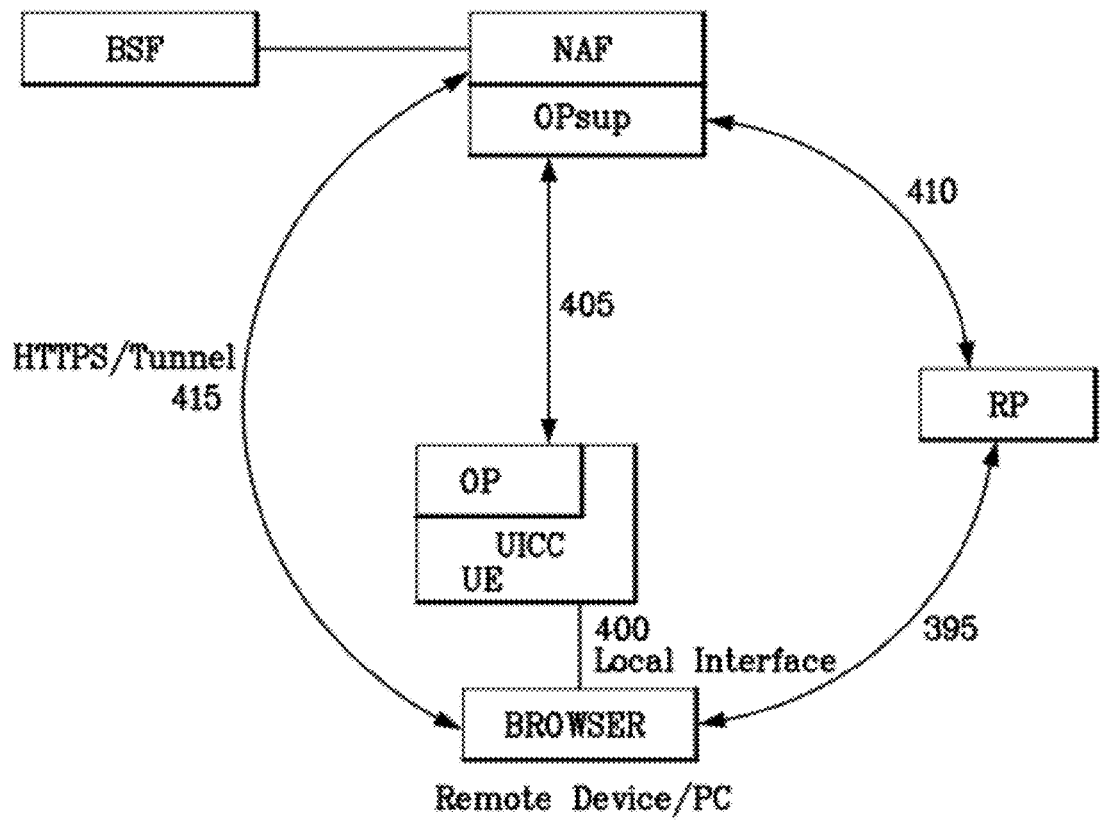
FIG. 19 illustrates example embodiment for enabling a Split terminal/local OpenId.

FIG. 19 illustrates example embodiment for enabling a Split terminal/local OpenId. As shown in FIG. 19, securing the channel between two devices may be accomplished using a blue tooth secure link, for example, or possibly via the procedure described in TS 33.259 whereby a shared secret key Ks_local_device is established, or the like. A key may be calculated internally in the UICC and may be passed to the browser via a secure tunnel. The establishment of the shared secret may be supported by GBA. The shared secret key may be derived from the GBA generated key Ks_(ext/int)_NAF.

In one example embodiment, when employing 33.259 the secure tunnel connecting the NAF and the remote device may be established using HTTPS with certificate based mutual authentication. For example, the browser may be PC based with the tunnel operating in the environment of an internet/TCP connection. The security of the tunnel may be solidified via trust mechanisms. It may be assumed that the remote device containing the browser is TCG compliant as per the requirements in the Mobile Phone Spec (MPWG). The HTTPS tunnel establishment may be bound to the trust status of the browser device, through the attestations of the TPM in the device. Thus the integrity checking embedded in this protocol bounds Ks_local_device to the platform.

In another example embodiment, as part of the procedure the UICC hosting device may be requested by the remote device hosting the user's browser to send it a list of NAF_IDs. A MiTM could easily make such a request and receive the requested IDs. The certificate and mutual authentication aspects of securing the tunnel, together with the assumed trust features in place, would ensure that no MiTM attack has taken place within the split terminal configuration or, if such an attack has occurred, it would be detected. Once this setup is complete the Ks_local_device key may be securely sent to the remote device via the tunnel; the remote device (browser) may subsequently send key generation request message (integrity protected) to initiate the computation of Ks_local_device on the UICC hosting device.

An identity assertion protocol for the split terminal type configuration is described herein. It may be assumed that GBA has already taken place along with the procedure establishing the shared secret key Ks_local_device between the remote platform (browser—PC) and the device containing the UICC/OP (UE). As shown in FIG. 19, the channels identified at 405 (connecting UE and NAF/OPsup) and 400 (connecting UE and PC) may be secure. In another example embodiment, the MNO may serve to support the identity assertion of the UICC based OP apply here In another example embodiment:
The user provides its OP identifier (URL) to the RP (at 395) using the OpenID login form
The user is redirected by the RP to its OP—the redirect message contains a nonce or session identifier
The RP and the MNO establish and security association (e.g. HTTPS connection—at 410)
The RP also sends the session identifier to the OPsup—this message is protected by the aforementioned security association (at 410)
The user authenticates using a PIN (or password) entered through the browser
This information is conveyed from the PC to the UICC/OP over 400 in a message also containing the session identifier obtained from the RP—as described above this message is protected with Ks_local_device
The OPsup signs the session identifier using the GBA key Ks_(ext/int)_NAF and send it back to the RP which keeps this signature as a reference (410)
The OP now signs the session identifier sent to it from the browser, also using the GBA key Ks_(ext/int)_NAF, and includes this signature in the assertion message which is then sent to the RP (395)
The RP compares the two signatures, one from OPsup (410) and the other from the OP (395); if they match the RP concludes that the OP belongs to a subscriber of the MNO of the OPsup 4.3 Embodiments for Efficient Protocol for OP on a Smartcard Web Server This section is intended to visualize the benefits provided by the OP on SCWS, especially in regards to embodiments that provide efficient improvements, which are further described within the present application. One of the benefits of the proposed embodiments, such as embodiments that implement the OpenID protocol, that authentication traffic is local and does not put a burden on the air interface network or the network services other that required for existing HTTP message flows. Discovery and association traffic is not via the air interface network and takes place over the fixed line public internet between the Operator OP and RP.

4.3.1 Standard OpenID

Figure 20:
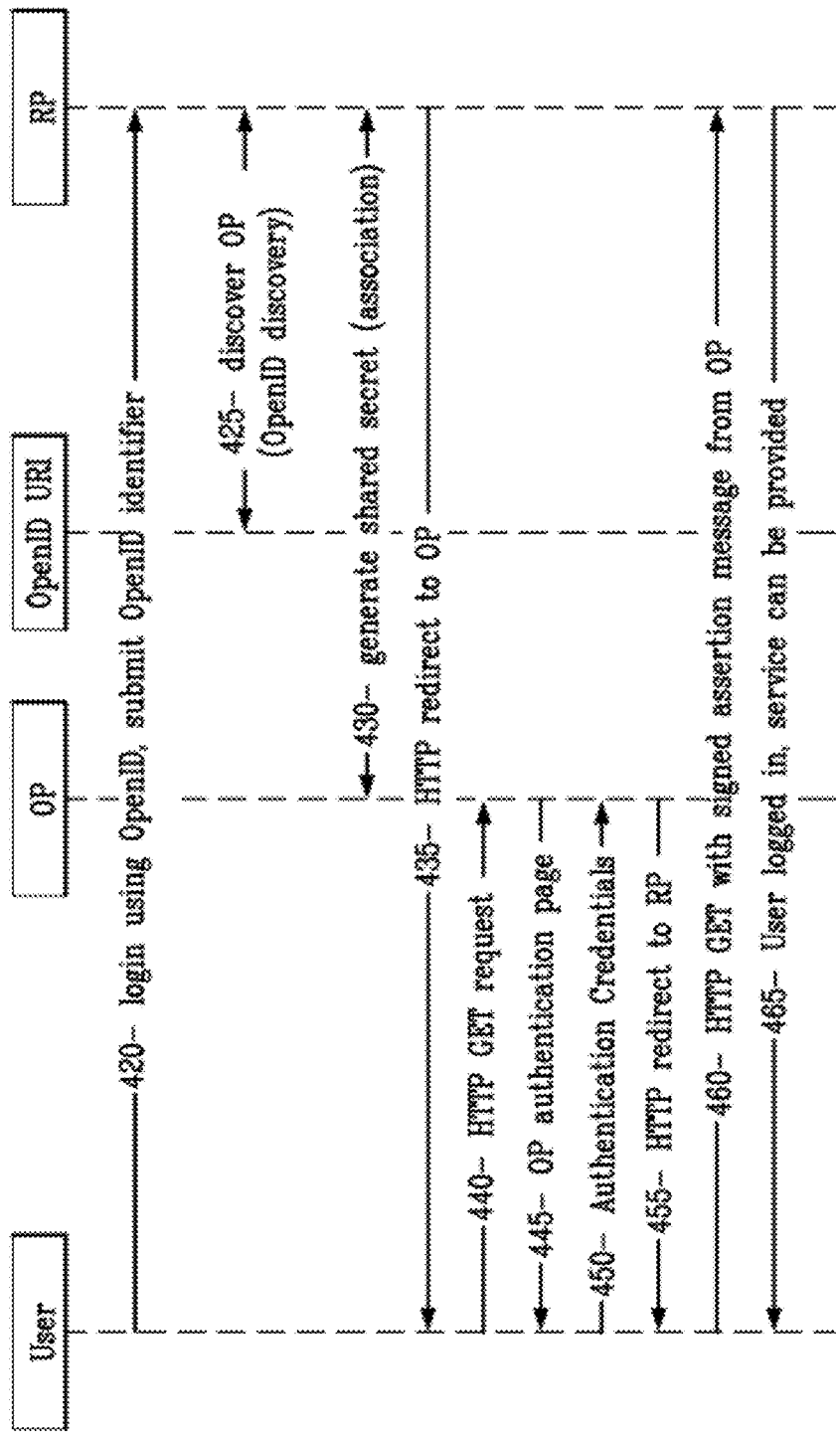
FIG. 20 illustrates the standard OpenID protocol.

FIG. 20 illustrates the standard OpenID protocol. For this protocol there is no local traffic and the only traffic that is offloaded from the air network is the discovery process and the association establishment between RP and OP. Since the OP is a web service, all communication between User/Browser/Device and OP is over the air interface. For example, the signals 420, 435, 440, 445, 450, 455, 460, and 465 occur over the air communication, which is carried out over the MNO/air network, in general as data traffic (e.g. HTTP, IP based communication). This represents loading on the MNO network. Additionally, the signals 425 and 430 are traffic which happens over fixed line internet, and can use existing infrastructure.

4.3.2 OpenID/GBA

Figure 21:
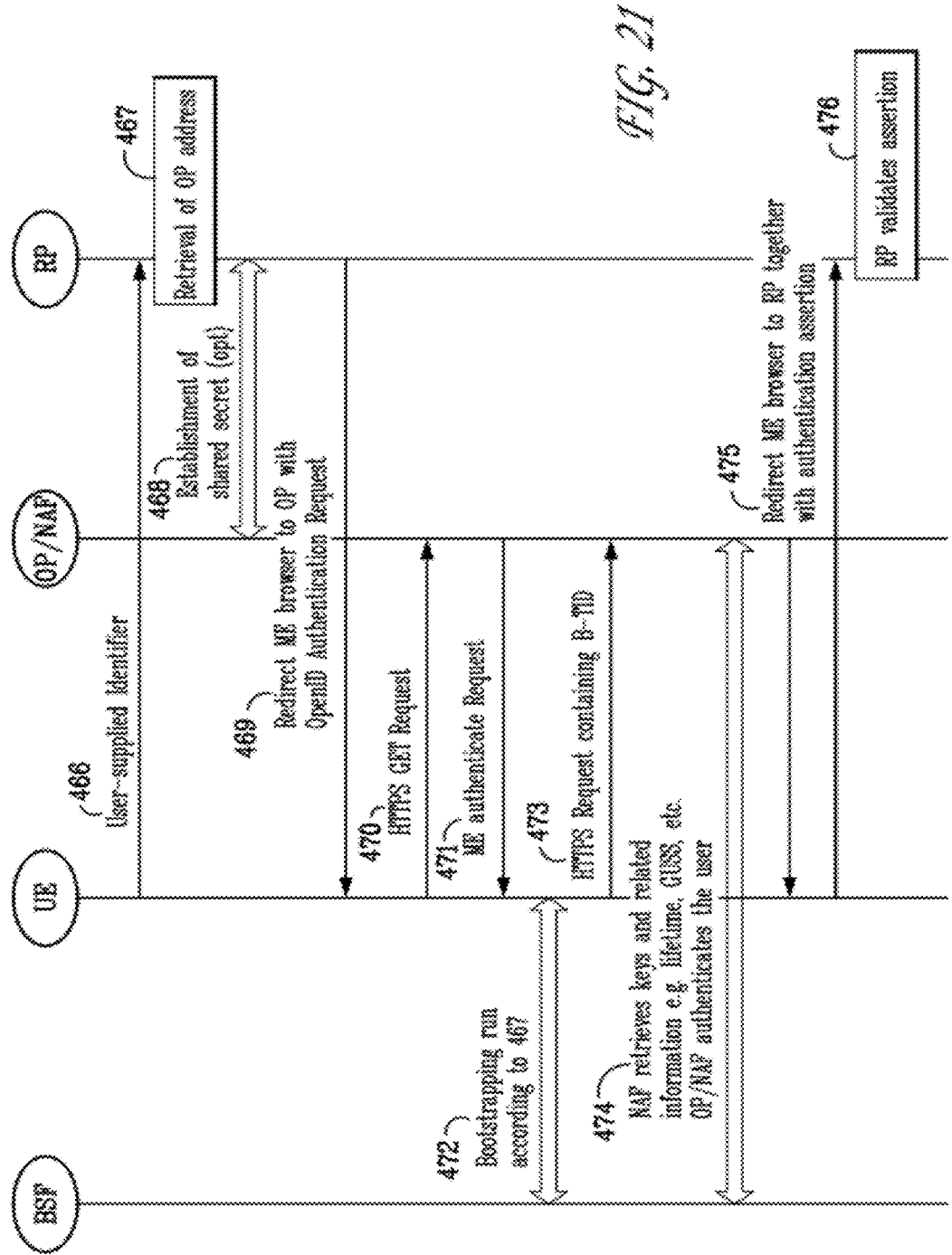
FIG. 21 illustrates traffic flows for OpenID/GBA from the 3GPP TR 33.924 v9.1.0.

FIG. 21 illustrates traffic flows for OpenID/GBA from the 3GPP TR 33.924 v9.1.0. For this protocol definition all communication takes place over the air network, despite the association steps between RP and MNO. However, compared to a web based OP, the traffic is even increased in OpenID/GBA, since 472 and 474 for authentication are needed, which puts a burden on the air data network as well as on the back-end services needed for GBA authentication, namely the BSF and NAF subsystems. So here we see an increase in air network traffic and an increase in load on network entities.

4.3.3 Embodiments for Protocol Improvements

Figure 22:
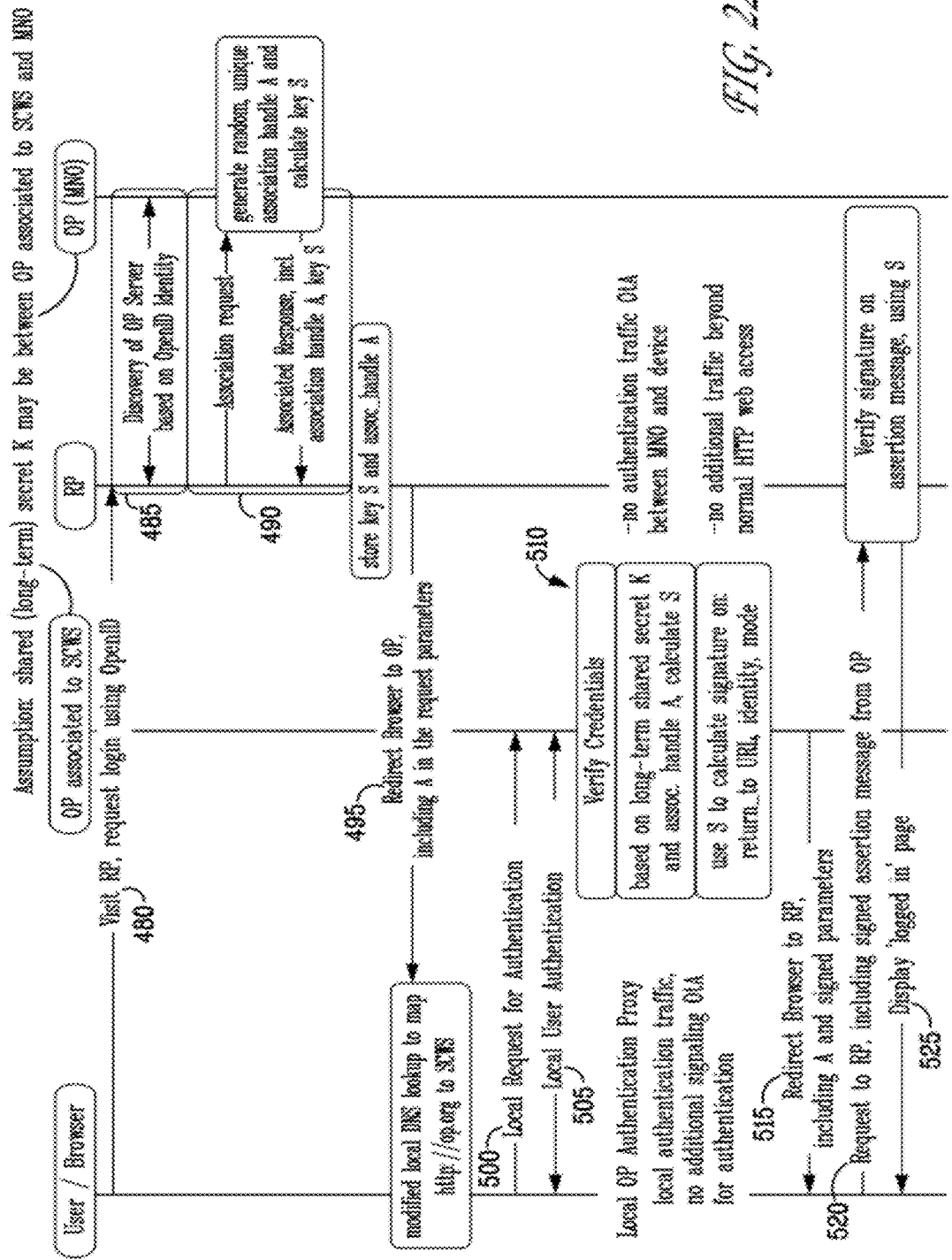
FIG. 22 illustrates an example embodiment of a protocol flow for reducing over the air traffic.

FIG. 22 illustrates an example embodiment of a protocol flow for reducing over the air traffic. For example, the efficient protocol may be used for OpenID on a SCWS. In this embodiment, it may be assumed that a long-term share key exists between the OP associated to the SCWS and the MNO.

As shown in FIG. 22, over the air traffic may be offloaded to the local device such that there is a reduction to the air interface network traffic. This may be done, for example, to allow authentication traffic to become local such that authentication traffic minimizes the burden on the air interface network or the network services. Additionally, discovery and/or association traffic may not occur via the air interface network and may take place over the fixed line public internet.

At 480, a user may interface with a user interface, such as a browser, may visit an RP, and may request login using OpenID. At 485, the RP and the OP (MNO) may perform discovery of an OP server based on an OpenID identity. At 490, the RP may transmit an association request to the OP. The OP may generate a random unique association handle A and may calculate a key S. The OP may transmit the association response to the RP. The association response may include association handle A and key S. The RP may store key S and association handle A.

At 495, the RP may transmit a redirect to the browser. The redirect may redirect the browser to the OP and may include the association handle A in the request parameters. The OP may be associated to the SCWS. The browser may receive the redirect and may perform a modified local DNS lookup to map to the SCWS. At 500 the browser may transmit a local request for authentication to the OP. At 505, authentication may occur locally. For example, at 510, the OP may verify credentials based on a long-term shared secret key K and an association handle A. Additionally, the OP may calculate the key S and may use the key S to calculate a signature. The signature may be used to sign an assertion message and/or sign parameters, such as the return_to URL, the identity, and/or the mode.

At 515, the OP may transmit a redirect to the browser that may redirect the browser to the RP. The redirect may include the association handle A and the signed parameters. At 520, the browser may transmit a request to the RP that may include the signed assertion message from the OP. The RP may verify the signature on the assertion message using the key S. The RP may then enable the browser to display the logged in page and may provide access to a service to the browser at 525.

4.4 Embodiments for OP Implementation on a Smartcard Web Server

There are available and standardized methods for the user equipment (UE) to communicate with the SIM card, e.g. the 3GPP TS 11.14 specification defines the SIM Application Toolkit (SAT) interface, which can be used by SIM applications, but does not define how the commands can be accessed in a unified way over various SIM card types from different SIM vendors. In one example embodiment, using the SIM Application Toolkit, the SIM card may get temporary control over the UE (proactive). Compared to the case where the UE sends a request to the SIM card and the SIM responds, the UE may fetch a SAT command from the SIM. The SIM card is issuing a SAT command towards the UE; the UE is reacting accordingly and sends the SIM a response back, if the command was executed successfully or not.

4.4.1 OP on a Smartcard Web Server

The Smartcard Web Server (SCWS) is a web server which runs on the USIM card and acts like a traditional web server. It is seen as the advancement of the SIM Toolkit, and in current application scenarios used to display phonebooks, additional MNO services, etc. via a HTML interface using the local UE browser. The SCWS uses the standard HTTP protocol to deliver its content to the browser, but unlike traditional web servers, the SCWS can use two different bearers: BIP (on top of T=0 smartcard protocol) or a full TCP/IP stack (implemented on the card) on top of the USB interface.

The UE is responsible for the routing of the traffic to and from the SCWS USIM, acting as a gateway that connects the (U)SIM to the MNO and the Internet. If the BIP interface is used, the router in the ME redirects certain HTTP requests from the UE browser to the local SCWS. HTTP requests on a defined TCP port are sent to the SCWS on the (U)SIM, and the HTML page in the response is generated by the SCWS. HTTP requests not using the TCP port dedicated to BIP are directed to a server on the Internet. If the USB protocol is used in combination with a full TCP/IP stack on the (U)SIM, the UE has the same IP gateway functionality as other computers connecting an intranet to the Internet. The ME gateway also depends on the IP protocol version used, i.e. IPv4 or IPv6. In comparison to BIP, the full TCP/IP stack also offers the possibility to route requests from the (U)SIM to the Internet.

Figure 23:
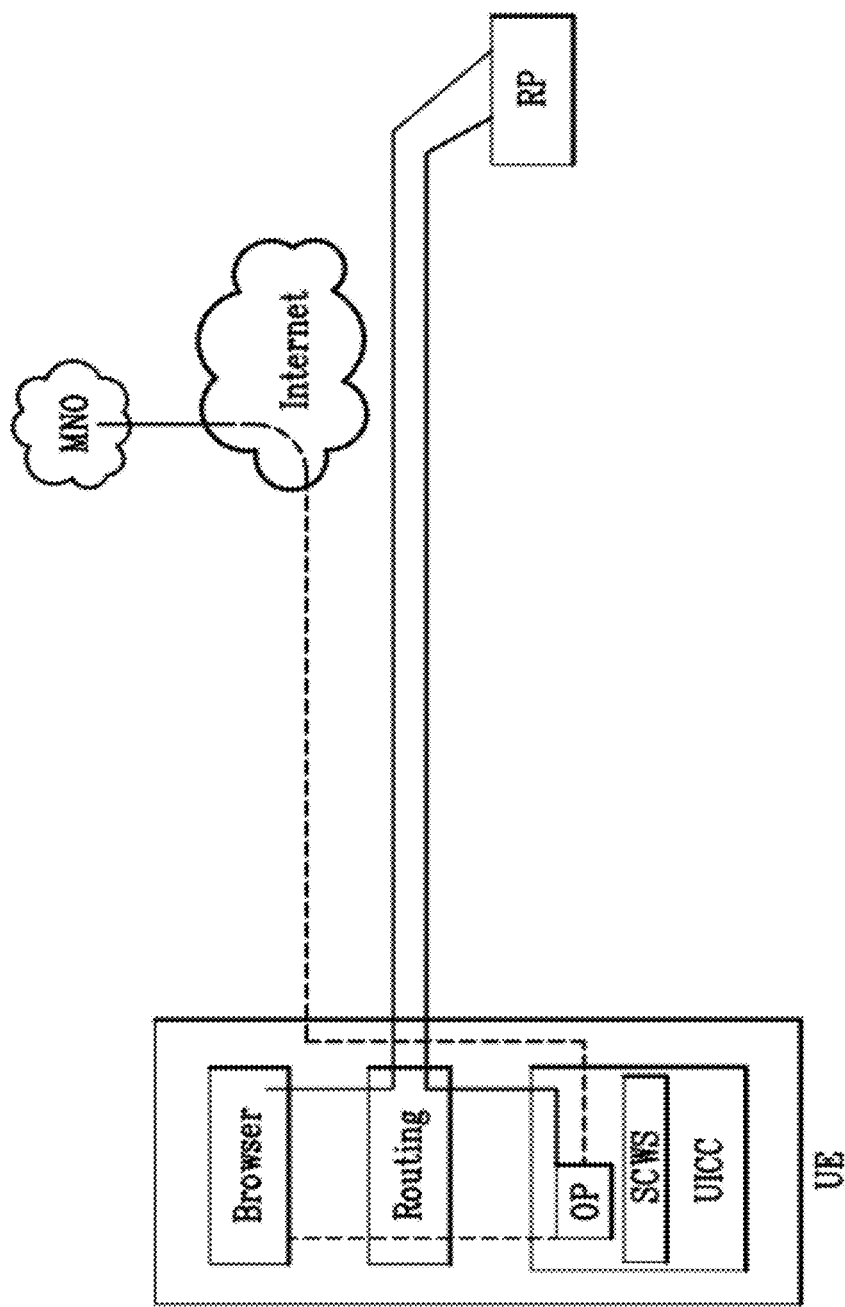
FIG. 23 illustrates an example embodiment for the internal routing for OP on SCWS.

FIG. 23 illustrates an example embodiment for the internal routing for OP on SCWS. As shown in FIG. 23, the SCWS may be used as a basis for the OP, and the UE routing capabilities may be modified to react on a given external port and forward communication to the OP on the SCWS. This may be done, for example, to create direct communication without tunnel through the browser. The traffic may still go through the same device but may be redirected in different ways.

The routing functionality (RF) in the UE may enable multiple communication paths. When the user first visits a RP site using the browser, the RF may redirect the request over the available outbound TCP/IP interface (e.g. 3G network connectivity) to the RP. The RP now knows the IP address of the Browser, since they established a common session over this connection. The RP may use the same address as in the user/browser session to contact the OP. The RP may use another (predefined) port on the device than in the HTTP session with the browser. The RF recognizes this port as the one which should be routed to the OP on the SCWS. The RF may redirect the message directly to the OP, which may allow the RP to establish an association with the OP. The RP may also issue the redirect to the browser to perform OpenID authentication. The Browser may be redirected to the OP on the SCWS. The RF may recognize the call from the browser as one which may be routed to the local SCWS. The OP may perform local user authentication (which may be via a secure UI, could be provided by SCWS, as part of the UICCs capabilities to take control over the device, typically by requiring the user to provide a PIN code).

After authentication, the OP may redirect the browser with the positive assertion to the RP. Since the RP and OP may have established an association, the RP is able to verify the assertion autonomously. It may also possible to implement the direct verification scenario of OpenID, if no association can be created. In this case, the RP may contact the UE on the predefined port after receiving the positive assertion, with the RF routing the request to the OP, which may answer the verification request.

In one example embodiment, access to the OP may be restricted on the local device. For example, only the local browser may be allowed to obtain assertions on the identity. This may prevent attackers from retrieving identity assertions from foreign devices. The RF may also couple the routing of inbound traffic to the OP to a previous browser request. For example, routing may become active for the single RP the browser communicated with and for a limited period of time.

The RF may also be used by the MNO to perform management tasks on the SCWS and OP respectively.

4.4.1.1.1 General Requirements

The following are General Requirements that are set forth by the OpenID specifications:

(R-1) In OpenID, the RP can decide to operate either in stateless or association based communication mode. Since no assumptions on the RP can be made, both options must be supported by the OP implementation.

(R-2) In stateless mode, no shared secret is established between OP and RP, the OP is contacted directly by the RP after the RP received the assertion message from the OP via the browser. The RP then establishes a direct HTTP(S) connection to the OP requesting the OP to verify the signature on the assertion message.

The OpenID specifications allow two different types of (symmetric) signature schemes: HMAC-SHA1-160 bit key length and HMAC-SHA256-256 bit key length. The symmetric key can be exchanged between OP and RP in an association establishment, if associations are used by the RP. The exchange of the secret is protected using either Diffie-Hellman key exchange and then encrypting the shared secret with the DH-key-value or if no Diffie-Hellman is used, the connection must be protected from eavesdroppers by transport layer security. All signatures issued by the OP on assertion messages are symmetric signatures using one of the mentioned algorithms. Smartcard terminology, e.g. Global Platform uses the terms cryptogram or more general 'Data Authentication Pattern (DAP)' to describe this cryptographic signature scheme.

(R-3) In association based OpenID, the RP and OP establish a shared secret, identified by an association handle. The RP includes this association handle in the initial redirect message that redirects the browser to the OP. The OP can then use the association handle to find the shared secret for this RP, and then use this secret to sign the assertion message. Upon receipt of this message, the RP can autonomously verify the received signature.

(R-4) Both communication options described in (R-1), (R-2), (R-3) need at least one direct connection from the RP to an entity E1 that can be reached via public internet, which is in the case of normal OpenID the OP server.

(R-5) The entity E1 from (R-4), must be able to establish a shared secret between the OP server and the RP in association based mode. In stateless mode, this secret must be known to the OP to sign the message and to this reachable entity E1 which will then be contacted by the RP to verify the OP signature (R-6) Signatures in OpenID are normally HMAC-SHA1 based, the OP and verifying parties must be able to sign data and verify signatures using the appropriate algorithms.

(R-7) The MNO must provide a network entity E2 which provides the OP discovery which can be, according to the OpenID standards, via HTML or XRDS discovery. The entity E2 must be running at the DNS address which is part of the OpenID identifier, e.g. if the identifier is http://openid.mno.com/id, then the MNO must run web service E2 at http://openid.mno.com, i.e. the MNO must be in possession of the domain and a server to operate as discovery service. Discovery service is via public internet and can be lightweight. Entity E2 can be co-located with entity E1 from (R-4), in a common physical entity providing both functions. E2 can be separate from E1, in which case, the discovery process provides an entry point for options for roaming devices using OpenID.

(R-8) The (DNS) address of E2 from (R-7) should not change, in order to provide users with a consistent identifier.

(R-9) The OP must be reachable by the user's browser, at least via HTTP.

(R-10) The same connection as in (R-9) could use HTTPS instead of HTTP.

(R-11) Optional: The OP must be able to generate and display an HTML page used as authentication page. This is optional, since the actual authentication is not specified. If no authentication page is used, the OP should at least inform the user that his OpenID identifier is used, to prevent hidden usage of the identity. However, not displaying the authentication page could be useful to provide a more consistent SSO feeling for the user, e.g. the user only once authenticates to the OP on SCWS per day, and then all subsequent authentications will take place automatically (R-12) Optional: if an authentication page is used, and the authentication page receives data from the user, e.g. username and password, the OP must be able to accept this data, process and verify it and act accordingly.

(R-13) Optional: if an authentication page is used, the authentication page could use the information received by the RP to display additional information to the user, in an easy-to-understand way, e.g. by displaying the name of the RP and the identifier that is going to be used in text or as graphic icons or a combination of both.

(R-14) Optional: if an authentication page is used, the authentication page could include a (visual) secret which is used as an indicator to the user, that he is communicating with the legitimate OP.

4.4.1.1.2 Embodiments for an Implementation Using SCWS in OpenID

The previous section discusses general requirements set by the OpenID standard. In this section, we describe embodiments for implementing a local OP using a SCWS within the OpenID requirements discussed above.

In an example embodiment, the SCWS may not be directly reachable from the public internet, i.e. the RP cannot contact the OP on SCWS directly. Given requirements (R-1), (R-2), (R-3), an indirection may be used. For example, the MNO may provide a web service which is reachable via public internet and is able to share a secret with the OP associated to the SCWS (see section on Split-OP in this document). This web service may also share this secret with the RP, and hence a shared secret between RP and the OP associated to the SCWS can be established. In another embodiment, an RF may route requests to the OP on SCWS.

Communication to the SCWS may be from the MNO via HTTP(S) via the remote management interface, such as a remote update of SCWS and associated applets, and from the handset's browser via a local HTTP(S). The local connection interface may be used for OpenID communications. Additionally, the local connection may serve as a general HTTP(S) interface that may be used to communicate with the SCWS and the OP.

ETSI SCP defined access to the smartcard via TCP/IP(9), which may not be restricted to local access only. For example, the restricted access to the SCWS from external entities may not be a technical problem; rather, it may be a limitation in the device internal routing functionality, according to the current standard specifications for SCWS. Direct HTTP access to the SCWS may be implemented in future releases of the SCWS. Such access may not be meant as administration access. For example, for OpenID operations the RP may have to access a web-page (dynamic applet implementing the OP server logic), served by the SCWS.

4.4.1.2 Embodiments for Handling Additional and Derived Requirements for OP-Associated-To-SCWS Implementation The following embodiments may invoke additional requirements when the OP is implemented on the UICC and associated to the SCWS:

(RSCWS-1) In an example embodiment, the MNO has to implement a supporting OP server functionality (OPSF) which is able to generate, share and distribute secrets for the OpenID protocol with the local OP associated to SCWS and optionally the RP.

The supporting OP functionality may have to act as a negotiating trusted party between the RP and the local OP entity on the UE for the shared secret used in the signatures on OpenID assertions. This supporting functionality may provide an HTTP(S) interface for the RP to initiate the association process (if associations are used) or to validate the signature from the Local OP upon request from the RP. Hence it may be reachable via public internet and additionally this functionality must be able to communicate with the Local OP to exchange the secret. This communication to the local OP may at least have to happen once per RP that the user wants to visit. In one example embodiment, the local OP is managed and maintained by the MNO. The MNO may communicate with the local OP/SCWS to update shared secrets, the OMA SCWS standards may be sufficient. In another example embodiment, where a non-MNO, remote OpenID identity provider service manages and communicates with the local OP on the smartcard, Global Platform standards could be used.

Normally a new (symmetric) secret may be established for each RP between the OP and RP. Since it is difficult to restrict the RPs that the user will visit using OpenID logins, it is very difficult to pre-provision these shared secrets for all RPs that the user wants to visit in the future. If the secret is generated each time for each RP in the UICC (e.g. by deriving it from a seed value), this secret may then be shared with the RP, see the protocol flows in the later sections where we discuss this option.

(RSCWS-2) In another example embodiment, the MNO operated network entity from (RSCWS-1) can use different channels and communication methods to establish the secrets in the OP associated to SCWS and to distribute them to the RP. Communication from the MNO to the RP is limited to HTTP based communication by the OpenID protocol. Communication from the MNO to the OP associated to SCWS could use secured SMS-PP or could be bootstrapped by e.g.

GBA and/or could use a secure communication protocol such as, HTTP(S) SCWS remote management interface.

(RSCWS-3) In another example embodiment, the Local OP associated to the SCWS must have access to secrets that are shared between the MNO entity from (RSCWS-1) and the smartcard. These secrets are not network specific keys but are only used for the OpenID protocol; they can be revoked, if needed and re-established via OTA measures. The secrets are symmetric keys, which are used by the OP to sign the HTTP parameters sent from the RP.

If the OP owns the Local OP, it may not be necessary for the MNO to distribute these secrets, as the OP can establish the keys to his Local OP (subject to confirmation by GP and/or OMA). The MNO may need secrets for the remote admin of the SCWS, though, so it is possible for him to establish the keys for the Local OP via that route.

(RSCWS-4) In another example embodiment, the protection of the secrets from (RSCWS-3) should be such that they cannot be read from other applications on the handset, and that all algorithms acting on them run in a secure environment provided by the smartcard such that the secrets are not exposed outside of that application's space in the smartcard environment.

If the Local OP is a Global Platform application, that the key may be stored by the Local OP's Security Domain, which performs crypto operations for the Local OP.

(RSCWS-5) In another example embodiment, the Local OP associated to the SCWS could store secrets and association handles for future use by the OP, such that additional OTA traffic from the MNO to the OP can be reduced if RPs are visited again.

(RSCWS-6) In another example embodiment, the Local OP associated to the SCWS could use additional security features in the authentication page which is shown to the user, such as a secret image securely stored in the smartcard, which can only be shown by the legitimate Local OP.

(RSCWS-7) In another example embodiment, the OP associated to the SCWS has to implement some application logic, that goes beyond processing HTTP requests and displaying HTML pages, especially for signing the parameters coming from the RP.

(RSCWS-8) In another example embodiment, if an implementation option is used, where secrets are generated by the OP associated to the SCWS, the application logic from (RSCWS-7) must be able to generate symmetric secrets and communicate them securely to an entity in the MNO network.

(RSCWS-9) In another example embodiment, the application logic from (RSCWS-7) and (RSCWS-8) could be implemented in java applets or servlets, which are dynamically called by the SCWS to perform the necessary operations and then return control to the SCWS. The applets/servlets should run in a secure environment in the UICC.

(RSCWS-10) In another example embodiment, the SCWS could provide a dynamic web page for authentication which displays information that was retrieved from the MNO, e.g. advertising banners, based on the user profile which can be generated by tracking the user's OpenID identity use across RPs. The MNO could offer RPs 'webspace' for marketing/ad purpose on the SCWS. This brings another value to the OP on the SCWS.

(RSCWS-11) In another example embodiment, if the SCWS proves to be too limited in concrete scenarios, another option would be to implement the application logic based on JavaCard applications which imitate the functionality of the SCWS: The application accepts the incoming HTTP request, provides the user with an authentication interface (e.g. PIN input), calculates the signature, generates the HTTP response and responds back to the browser. It can be explored, if in this scenario the BONDI framework can help in the indirect communication part between the browser and the smartcard application replacing the SCWS.

4.4.1.3 Naming Conventions

The following naming conventions for the entities apply:

OP associated to SCWS: The local OpenID identity provider, which issues signed assertion messages and sends them through the user's browser to the RP. The smartcard hosting the SCWS and hence the OP is assumed to have a relationship with the MNO, and hence with all MNO associated entities.

RP: the relying party which can be any website that offers users a login using OpenID. The RP is completely independent from all other entities, hence no additional requirements can be put on RP and no changes to the OpenID protocol flow for the RP may arise. The OP has to support whichever communication mode (stateless or association based) the RP chooses to use. If the MNO decides that users should not use certain RPs, the MNO cannot deny access to these sites by denying OpenID access for these RPs, since the user could still use another identity. The MNO can only limit access to RPs using additional means, which block access to bandwidth consuming sites in general.

OP-Agg: The OP-Agg implements entity E2 from (R-7) and provides the discovery service for the RPs.

OPSF: The OP Service Function (OPSF) implements the supporting OP functionality which is able to generate, share and distribute secrets for the OpenID protocol with the OP associated to SCWS and optionally the RP from (RSCWS-1). The OPSF and the OP associated to SCWS are acting from the perspective of the RP as if they were a single entity. The OPSF is able to verify signatures issued by the OP associated to SCWS and is directly reachable for the RP via public internet. The browser on the device is redirected to the OP associated to SCWS by modifying the local DNS resolving cache on the device such that the address of the OPSF maps to the local OP associated to the SCWS.

Browser: Shown in the protocol flow diagrams to make the routing and messaging function to and from OP associated to SCWS explicit. Otherwise it is only a frontend to display and receive user authentication.

4.4.1.4 Embodiments for Implementing OP on SCWS/UICC

This section explores embodiments derived from the general concepts described above while attempting to stay compliant to the standard OpenID authentication protocol. Two embodiments of stateless and association based mode protocols are discussed below; the second embodiment employs a cryptographic assumption, involving shared keys between the OP card function and a server function on the network side, to consolidate the authentication process.

4.4.1.4.1 Protocol Flow Descriptions

The following sections describe example embodiments of protocol flows for the implementation of the OP associated to SCWS. In one example embodiment, as stated above in (R-1), both scenarios (stateless and association based) may be covered. A protocol flow figure and description of the call flow of the embodiments are provided below The general OpenID protocol is illustrated with respect to FIG. 3.

Multiple options are shown in FIGS. 24-27 and explained in the corresponding descriptions.

4.4.1.4.2 Protocol Flow for RPs Using Stateless Mode

FIG. 24 illustrates an example embodiment of a protocol flow for enabling an RP to use a stateless mode to perform OpenID authentication. For example, the RP may use a stateless mode to perform OpenID user authentication. As shown in FIG. 24

530: The user may visit the RP website and enters his OpenID identifier. For example, http://op.org/identity.

535: The browser may send the HTTP message containing the OpenID identifier to the RP website

540: The RP may use OpenID 'simple' discovery, HTTP/HTML based and contacts the OP-Agg via public internet to retrieve the identity page for the OpenID identifier. For example, HTTP GET http://op.org/identity.

545: The OP-agg may receive the request and respond with a HTML page containing the internet address of the OPSF, e.g. by including the following:

<link rel="openid.server" href=http://op.org/
        server.cgi>

The OPSF may act like a standard OpenID Identity Provider web service towards the RP, i.e. the OPSF may be able to verify the signature (issued by the Local OP) on the assertion message upon request from the RP. The OPSF may be reachable via public internet and is may be assumed to have a DNS name, such as op.org, reachable via http://op.org. Since the outside world may not know the IP address of the smartcard, this indirection OP-agg and OPSF is used for the communication.

The address of the OPSF may be different from the address of the OP-agg.

a. Option 1: This item is not required but presents an option. If this option is not used here, Option 2 at 570 may be in the later phase of the protocol.

i. The OP-agg informs the OPSF of the request from the RP, by sending the RP identifier and the OpenID user identifier to the OPSF ii. The OPSF can try to lookup the secret for this RP and OpenID identity in a local database iii. If no secret is found, the OPSF generates a new secret and association handle and sends both to the OP associated to SCWS, which in turn stores them.

iv. If a secret is found, the OPSF will use it later for signature verification. It is assumed, that if a secret is found in the local database by the OPSF, the OP associated to SCWS already received this secret and association handle in a previous protocol run with this RP and hence was able to store and reuse it.

The secret used by OPSF to verify the signature may be the same as the one used by the OP associated to the SCWS to generate the signature. Freshness of the signature may be ensured by the RP nonce inserted in the next step, and which is required to be part of the signature. The OpenID specifications remain tacit about the freshness of the signing secret itself. It is the responsibility of the OP to assure the secret's cryptographic strength, maintain its secrecy, and ensure its freshness, when this is required. The OPSF or the OP associated to the SCWS may enforce a limited lifetime, or usage count for the signing secret for that purpose. More on the options for secret sharing are described in Section 4.4.1.4.3.1.

550: The RP may receive the address of the OPSF and create a nonce and a session identifier, e.g. nonce=123123, session=User. The RP may compile the return_to parameter which tells the OP to which URL the browser should be redirected after user authentication. The RP may issue a HTTP redirect, redirecting the browser to the OP server address that may include the following parameters:
  openid.mode=checked_setup,
  openid.identity=http://op.org/identity,
  openid.return_to=http://rp.org/
return.cgi?session=User&nonce=123123

555: The browser may receive the redirect and opens a connection to the URL specified by the RP in the redirect message

560: With a modified local DNS lookup table, that may map to the URL of the OPSF to the SCWS local IP address, e.g. by using a hosts file with entry http://op.org==127.0.0.1, the browser nay be redirected to the local OP associated to SCWS and issues a HTTP request including the parameters from 550.

A modified local DNS lookup table may be used on the device which lets the device think that the URL http://op.org is at the local IP address of the SCWS. Hence the browser may open a connection to the SCWS/Local OP instead of connecting to the OPSF (which is reachable via public internet at the URL http://op.org).

565: The following may be performed to ensure that authentication traffic is kept local, these steps are not required or specified by the OpenID protocol specifications:

a. The OP may be associated to SCWS displays a local authentication page b. The user may enter his authentication credentials, e.g. username and password c. The OP may be associated to SCWS verifies the credentials

570: If option 1 at 545 was used, the OP associated to SCWS may have a secret and association handle which is shared between OP associated to SCWS and OPSF, either newly retrieved from OPSF or retrieved from a local storage of secrets and association handles.

a. Option 2, if option 1 has not been used at 545:
  i. The OP associated to SCWS may generate a new secret and association handle
  ii. The OP associated to SCWS may send this secret and association handle to the OPSF, via the SCWS.
  iii. The OPSF may receive this secret and store it securely for future access The goal may be, for example, to share the secret between OPSF and Local OP, hence, if the Local OP generates the secret, it may be communicated to the OPSF after generation.

A toolkit-enabled Local OP may use CAT to proactively communicate with the handset, bypassing the SCWS. The message could be formatted as per standard OTA (e.g. for sending to OPSF via the SMS-PP bearer). But this may require the OPSF to communicate with the card via the MNO's OTA system. Alternatively, the BIP gateway may extract the payload of the toolkit message and the handset may send it to OPSF using TCP/IP. But this may still require messages to go via the MNO's OTA server. The BIP may be used where the card does not have an IP address and does not support TCP/IP.

575: The OP associated to SCWS calculates a signature on the parameters: return_to, identity and mode.

580: The OP associated to SCWS sends a HTTP redirect message to the browser, including the parameters received from the RP in step 550, additionally including the following:
  a list of the signed parameters in the openid.signed parameter,
  the association handle in the openid.assoc_handle parameter and the signature (base64 encoded) in the openid.sig parameter.

This message is used to redirect the browser to the return_to URL at the RP.

585: The browser redirects the user to the return_to URL at the RP.

590: The RP receives the signed assertion message and engages in a verification procedure with the OPSF in a direct communication via public internet, HTTP(S) based.

595: The RP issues a HTTP POST message containing the received parameters from the OP associated to SCWS in 580.

600: The OPSF uses the shared key to verify the signature on the received data

605: The OPSF returns is_valid:true if the signature verification succeeded.

610: For the RP, the user is now identified as http://op.org/identity

615: The browser displays the HTML page of the RP

620: The user is logged in at the RP as http://op.org/identity 4.4.1.4.3 Additional Embodiments for Stateless Mode 4.4.1.4.3.1 Sharing the Secret The stateless mode of OpenID is characterized by the process that the RP receives a signed statement from the OP but is by itself not able to verify this signature, since the RP does not know the secret that was used for signing. In stateless mode, the RP contacts the OP again, to verify this signature. Since the signature issuing OP (associated to the SCWS) and the signature checking OP (OPSF) are seen as the same entity from the perspective of the RP, they must be able to share a secret. Several options apply for this.

4.4.1.4.3.1.1 Option 1: OPSF Manages Secrets

This section outlines some of the embodiments that utilize option 1 as described in the above with respect to FIG. 24 at 454. The OP-agg may inform the OPSF as soon as a discovery run has taken place. The OPSF may then create a secret and association handle and sends both to the OP associated to SCWS. If the OPSF is part of the MNO, the SCWS remote admin process may be used. If the OPSF is not part of the MNO, Global Platform methods allow the OPSF to send the keys to the Local OP on the card, assuming the handset supports that. In Option 1 it may be possible to implement a central secret/association handle database and management at the OPSF, which stores a mapping of OpenID identifiers, RPs to association handles and secrets in a database. As soon as the OPSF gets informed, the OPSF may perform a lookup for the identifier and RP and if no secret is found, the OPSF may generate a new secret and association handle and send it to the OP on SCWS. This example embodiment assumes that the OP on SCWS is able to store secrets and association handles for RPs and that the OP on SCWS uses the same secret for signing that the OPSF will then use for signature verification. Then this procedure will be executed once per RP.

4.4.1.4.3.1.2 Option 2: OP on SCWS Generates New Secret

This section outlines some of the embodiments that utilize option 2 as described in the above with respect to FIG. 24 at. The OP associated to SCWS may generate a new association handle and secret as soon as it receives the parameters from the RP. The OP associated to SCWS may use the secret to sign the parameters and then sends this secret and association handle to the OPSF. The OPSF may decide to store this secret and association handle for future use, if the OP on SCWS is able to store this secret, too. Then this procedure may only be executed once per RP. This assumes that there is already a persistent secret which may allow the Local OP to encrypt the new secret so that it can only be decrypted by the OPSF. This encryption allows the Local OP to send the new secret to the OPSF without the need for Transport Layer Security.

4.4.1.4.3.1.3 Option 3: Derived Secret from Common Seed

In one example embodiment, if the OP associated to SCWS and the OPSF share a common seed, which may be established upfront and independent from the secret(s) used with the different RPs, then another variant may be used. Assume that OP on SCWS and OPSF share a common seed value S. By applying a cryptographic function to S and a piece of information P that both of them receive during the communication, which uniquely identifies the current OpenID run, both may become in possession of the same secret. The shared secret may, for example, be calculated by applying a hash-function to the concatenation of S and P, such as by calculating the shared secret as k=SHA1(S|P). Taking a look at the information P that both the OP associated to SCWS and OPSF receive, different candidates may be considered, such as the RPs IP address and the OpenID identifier, the whole parameter set as received from the RP, a subset of the parameters, any combination of these, or the like.

Such derived secrets may also be pre-generated following a common pattern, as in a key derivation function, where secrets and association handles are pre-generated and may be used when needed.

4.4.1.4.3.1.4 Further Options

Further options may apply, which may result in a comparable state, for example, where OP and OPSF share the same secret.

4.4.1.4.3.2 Authentication Options

Since actual user authentication is not specified in the OpenID specifications, different options apply.

4.4.1.4.3.2.1 Embodiments for the Integration of Concepts from Trusted OpenID

In one example embodiment, the device may be to generate measurements for the software, e.g. by using a TPM. These measurements may then be transferred to the OP associated to SCWS during the authentication session. The Local OP may have reference values which are used to compare the measurements to and only if the reported measurements correspond to these known good reference values the authentication can succeed.

4.4.1.4.3.2.2 Unlocking the OpenID Secret Using the Authentication Credentials

In one example embodiment the user and OPSF may share a common secret, such as a PIN code. The PIN code may be used to calculate a secret each time the user enters the credentials, similar to the embodiment described in 4.4.1.4.3.1.3. Such a PIN may be shared by an out-of-band enrollment process.

4.4.1.4.3.2.3 Binding User Authentication to Device and Network Authentication

If the smartcard (and the SCWS) support biometric user authentication, the OpenID authentication may be bound to biometric identifiers provided by the user. Since the OP is local (on the smartcard), it may have direct access to the biometric reference data and no biometric data may be exposed to the MNO or another internet entity.

In one example embodiment a communications device may be connected to a network. The device may hold credentials, which may be stored securely on the device or a smart card such as a UICC and which are used to enable authentication of the device to the network. In order to provide secure access to the device and the network services that may be accessed only by the user, a biometric scanner may be included on the device to provide a full three-factor authentication mechanism which combines a biometric with something the user knows, such as a pin or password, and something which the user has, such as a security token generator fob.

In combination with the previously described embodiments for device authentication, user authentication may also be incorporated in the authentication procedures. After the user authenticates him/herself to the device using a combination of these authentication mechanisms, then the device may check if the user authentication is correct, i.e., authenticates the user first, and then, if the results check, combine the checked user-authentication information (e.g. the user's credential used in the user-authentication in raw form, in hashed or otherwise compressed forms) to the device credential it holds within itself, and then send the combined, bound credential information to the network.

The network, upon receipt of the combined credential, may then assess whether the device is being used by a legitimate user, and the device itself is legitimate.

If the device is incapable of checking the authenticity of the user by itself, it may send the combined credential information, without allowing the user to do anything else, to the network first, and allow the user to access its other functions only after the network assesses the combined credentials and communicates back that the user is authenticated. Then, the device may allow the user to access its other functions.

This approach may provide the most stringent security, but the number of factors used in authentication may be relaxed based upon security policies enforced.

Authentication Mechanisms

The authentication scenarios which may be incorporated into the embodiments include:

1. The user provides all three forms of authentication information to the device, which authenticates the user to the device and upon successful authentication, provides access to the device functionality and data held on the device. The device then authenticates to the network in the normal way to provide the user with the network based services available on the device.

2. The user provides all three forms of authentication information to the device, which then authenticates the user to the device with some or all of the information and upon successful authentication either passes on some or all of the authentication information together with credential information held on the device to the network for additional authentication with the network. Upon successful authentication between the device and network, the user is allowed access to the device functionality and data held on the device as well as network based services.

3. A variation of (2) above is that the biometric information or a securely derived unique information element, such as a fuzzy hash of the biometric information, may be sent to the network for network level authentication of the user without requiring the user biometric information to be used for local authentication to the device.

4. Another variation of (2) or (3) is that the user will be allowed limited access to device functions and data until the network authenticates the user (along with the device) and the device gets an indication of that assessment back from the network. In this mode, the user will be allowed to access or use some pre-designated 'safely quarantined' functions and those functions only, until the network's authentication of the user and device credentials is complete and sent back to the device with appropriate authorizations.

Variations of the above mechanisms distributing the user authentication function between the device and network or wholly on one entity are also possible. Also binding of user authentication to device authentication may also provide strong authentication of the user and/or device.

Although many types of biometrics may be incorporated, an example embodiment may utilize a biometric scan, such as a fingerprint scanner or retina scanner. By incorporating the biometric scan as a natural extension of the user interface, the biometric scan may be incorporated into a security functionality in such a way as to provide dynamic, transparent user authentication upon trigger events either upon the user performing a function or accessing a particular service either local to the device or over the communications network. For example, the fingerprint scanner may be incorporated into a soft key so that the stroke of a finger triggers a soft-key action such as for example, "send" to make a call while simultaneously authenticating the user. Alternatively, the user may be constantly authenticated to the device on a continuous basis by merging the user's physical touch to the device either on a display surface, device body or touch keys, with an unobtrusive authentication.

4.4.1.4.4 Protocol Flow for RPs Using Association Based Mode

FIG. 25 illustrates an example embodiment of a protocol flow for enabling an RP to use association based mode to perform OpenID user authentication. The association may take place after the user first contacts the RP and uses his OpenID identifier with that RP. If an association is established, it may be reused which further decreases the communication effort. However, it may not be possible for the OP to mandate the operational mode of the RP, it may be up to the RP to decide upon one of the two communication models.

The association establishes a persistent secret between RP and OP which may be used by the OP to sign the assertion messages and may be used by the RP to verify the OP signature. The OP may decide on the validity period of the shared secret. The RP and OP use the association handle as identifier for the secret. The RP includes the association handle in the first request message to the OP, and the OP may then use the corresponding secret depending on the association handle. If the OP decides that the association has expired, the OP will inform the RP in the response message. In principle, this may allow the OP to reject any association request. As long as RPs are able to support stateless mode too, this may be used to force RPs to fall back into the stateless communication mode. An OP may for example reject an association request if the requested signature mode (HMAC-SHA1 or HMAC-SHA256) from the RP may not be supported by the OP.

Opposed to the stateless communication mode, where a new secret is established between RP and OP every time the user logs in to the RP, the association is established once per identity and RP. If an association between OP and RP is already established it may be re-used by the RP and OP.

The RP may establish the association as soon as the address of the OPSF is known, i.e. after the discovery phase, and must complete the association before proceeding with the protocol, i.e. before including the association handle in the redirect message.

As shown in FIG. 25

625: The user may visit the RP website to log in using OpenID; he may enter his OpenID identifier, e.g. http://op.org/identity 630: The may browser send the HTTP message containing the OpenID identifier to the RP website 635: The RP may use OpenID 'simple' discovery, HTTP/HTML based and contacts the OP-agg via public internet to retrieve the identity page for the OpenID identifier, e.g. HTTP GET http://op.org/identity

640: The OP-agg may recieve the request and respond with a HTML page containing the address of the OPSF, e.g. by including the following:

```
<link rel="openid.server" href=http://op.org/
    server.cgi>
```

The address of the OPSF may be different from the address of the OP-agg.

645: The RP may use a HTTP POST call to the OPSF with parameters:
openid.mode=associate,
openid.assoc_type=HMAC-SHA1,
openid.session_type=blank,
openid.dh_*='Diffie-Hellman Parameters'

650: The OPSF may generate a shared secret and an association handle for the RP

655: The OPSF may response to the RP with a HTTP POST containing the association handle and the secret (encrypted if Diffie-Hellman was used) in a key=value formatted document. This association may be established once per RP and OpenID identity. OpenID security best practices advise use to HTTPS authentication since Diffie-Hellman may be attacked by a MITM attack.

660: The RP may create a session nonce and a session identifier, e.g.
nonce=123123,
session=User

665: The RP may the secret and association handle as received from the OPSF

670: The RP may include the association handle in the redirect message

675: The RP may send a HTTP REDIRECT message to the browser, including the parameters: openid.mode=checked_setup,
openid.identity=http://op.org/identity,
op enid.return_to=http://rp.org/return.cgi?session=User&nonce=123123,
openid.assoc_handle='association handle'

680: The browser may receive the redirect message and opens a connection to the URL specified by the RP in the redirect message

685: With a modified local DNS lookup table, which maps the URL of the OPSF to the SCWS local IP address, e.g. by using a hosts file with entry http://op.org==127.0.0.1, the browser may be redirected to the local OP associated to SCWS and issues a HTTP request including the parameters from 675.

A modified local DNS lookup table may be used on the device which lets the device think that the URL http://op.org is at the local IP address of the SCWS. Hence the browser may open a connection to the SCWS/Local OP instead of connecting to the OPSF (which is reachable via public internet at the URL http://op.org).

690: The following are not specified by the OpenID protocol specifications:
a. The OP associated to SCWS may display a local authentication page
b. The user may enter his authentication credentials, e.g. username and password
c. The OP associated to SCWS may verify the credentials

695: The OP associated to SCWS may need to use the secret which is already shared between the OPSF and the RP to sign the return message, several options can apply:
a. Option 1:
i. The secret may be already present, e.g. pre-shared, pre-equipped by OPSF b. Option 2:
i. The OPSF may send the association handle and the secret to the OP associated to SCWS, e.g. via secure SMS, or bootstrapped by GBA and/or using secure communications protocols such as the SCWS HTTPS remote management interface
ii. The OP associated to SCWS may store the secret and association handle c. Option 3:
i. the OP associated to SCWS may request the secret from the OPSF, by using the association handle as received from the RP. The protocol for this message may run via SMS, other options are possible, where feasibility is ffs.
ii. The OPSF may perform a lookup for the secret based on the association handle
iii. The OPSF may send the secret and association handle to the OP associated to SCWS, e.g. via secured SMS-PP, or bootstrapped by e.g. GBA and/or using secure communications protocols such the SCWS HTTPS remote management interface.

700: The OP associated to SCWS may use the secret to calculate the signature on the return_to URL, identity and mode parameters.

705: The OP associated to SCWS may include the signature in the HTTP redirect as additional parameter

710: The OP associated to SCWS may send a HTTP redirect message to the browser, including the following parameters:
openid.mode=id_res,
openid.return_to=http://rp.org/return.cgi?session=User&nonce=123123,
openid.identity=http://op.org/identity,
openid.signed=mode, identity, return_to,
openid.assoc_handle='association handle',
openid.sig='base64 encoded signature'

715: The browser may redirect the user to the return_to URL at the RP, without any further user involvement.

720: The RP may receive the signed assertion message

725: The RP may verify the signature using the previously established shared secret

730: For the RP, the user may be identified as http://op.org/identity

735: The browser may display the HTML page of the RP

740: The user may be logged in at the RP as http://op.org/identity

Additional Embodiments for Association Based Mode

Additional embodiments may be based on the embodiments that use the additional embodiments to the stateless protocol in section 4.4.1.4.3.

4.4.2 Embodiments for Improvements of the OP on SCWS
4.4.2.1 General Method of the Improvements In the example embodiment of section 4.4.1, the local OP, which may be associated to SCWS, and the OPSF may be required to establish a shared secret at least once per RP which is used for the assertion signatures and their verification. However, additional methods may apply, where the protocol is further improved by using additional cryptographic means which allow to establish only one (long-time) shared secret between OPSF and local OP, and then derive the secrets used for the signature using cryptographic functions. Furthermore, an integration of the exchange of this secret between OPSF and local OP may be performed inside the protocol messages.

4.4.2.2 Background Technical Information for the Improvements

The following section provides more technical background for possible implementations and embodiments.

The SCWS may communicate securely, using IP-based or traditional UICC methods, with the handset and indirectly with parties in the external world; the party who owns the UICC applications can download them to the UICC and manage them remotely.

Concerning the resource usage on a UICC, it may be noted that a UICC which is capable of supporting Global Platform, SCWS and the consequent IP stack will most probably also support large memory and USB. Such a UICC may have a sufficiently powerful processor and the o/s will take care of resource management.

At 575 in FIG. 24 (stateless mode) and at 695 in FIG. 25 (association mode) the OP associated to SCWS may store and use secrets. The may be done, for example, to keep a signing key in protected storage which it never leaves, and where it is only used by a crypto algorithm in the card itself. This may be some key that can be shared securely with another (trusted) party (like the MNO) and which may be guaranteed to never leave the smart card. For an application-specific signing key in a downloaded applet, we have four issues me may consider: (1) how the key gets onto the UICC and into the applet, (2) how the security of the key is maintained, (3) who can use the key and (4) how the key can be updated.

In one example embodiment (an answer to issue (1)), keys specific to the OP-on-UICC may be loaded as part of the applet's executable load file and may reside in specified keyfiles in that applet. The application download may not use the SCWS administrative update process. However, the SCWS may invoke smart card applications (implying any application, not just SCWS web pages). This means that the Local OP may be an applet operating under the Global Platform framework. It may be advantageous for such a complex applet (it's more than just SCWS HTML pages) to use the Global Platform applet loading process.

In another example embodiment (an answer to issue (2)), the secrets belonging to any loaded application are protected by the UICC's O/S. We may rely on the O/S to enforce that. The memory in which the UICC's loaded applications run is protected by the O/S.

In another example embodiment, (an answer to issue (3)), the (private) signing key may be used by the Local OP e.g. to sign (or decrypt/encrypt) some data. Any external entity which is able to communicate to the Local OP on the UICC via SCWS may provide data for the applet to sign or decrypt, but such communications to SCWS may have to go via the terminal's browser as redirects. In the case of shared symmetric keys, it may be up to the owner of the key, e.g. the OP, to distribute such keys to TTPs such as MNOs, so that they may use them in interactions with the UICC.

If keyfiles are used to store keys in the OP associated to SCWS, standardized applet updating processes may be used to update the keyfiles. If the SCWS admin update process is used, that may be done by the owner of the SCWS update process (assumed to be the MNO). Using on-card key generation as an alternative may also be possible.

SCWS provides for either BIP/CAT communications and for TCP/IP/HTPP over USB. In the latter case, TLS (PSK or PKI-based) may be used between the device and the SCWS.

In another example embodiment, the OP Server application may be loaded onto the UICC as a JavaCard applet and subsequently managed in the manner specified in the GlobalPlatoform Card Specification, Version 2.2, March 2006. The applet may be located under the Card Issuer's (CI's) Security Domain (SD) or under an Application Provider's (AP's) SD, even though both domains would, in effect, would be owned by the same party, i.e. MNO/CI. Alternatively, the OP application may be a firmware or native application.

OMA may provide a secure process for the SCWS's content and settings to be updated by a remote server application using mutually-authenticated HTTPS to the SCWS. This may be done, for example, for use by the MNO as Card Issuer and so is devised around traditional OTA for transport. This feature is not intended to be used to download applications which are associated with the SCWS, but it can be used (only by the MNO) to update such applications.

SCWS may use traditional Toolkit and OTA technology (of which SMS-PP is the ubiquitous default). Thus, for the case where the UICC does not have its own IP address, SCWS describes the use of CAT/BIP for the UICC/ME connection for browsing web pages on the SCWS from a client and to transfer and manage web pages on the SCWS from an Administrative Entity. Likewise, SCWS may also support concatenated SMS-PP for messages from the remote administrator. However, for the case where the UICC has its own address, SCWS may also supports direct TCP/IP connection on top of the UICC's High-Speed (i.e. USB) Interface for browsing web pages on the SCWS from a client and to transfer and manage web pages on the SCWS from an Administrative Entity through a direct TLS connection on top of a direct TCP/IP connection.

4.4.2.3 Introduction to Improved OP on SCWS

The following embodiments describe improved variants of the OP on SCWS concept. OP on SCWS may be an improvement over OpenID/GBA. For example, the embodiments may provide the following advantages:

OP on SCWS may improve over OpenID/GBA by making the authentication local to the device and thus significantly reducing communication cost.

Further improvements on OP on SCWS may occur by communicating the authentication secrets between OP and a network side entity inside standard OpenID message fields. This may further reduce communication overhead, and may relax the relation between the OP on SCWS and network entities (OPSF), which may enable migration of OpenIDs between networks.

Additionally, the following embodiments may enable OP on SCWS to pose major advantages for network operators, such as:

No authentication traffic over the mobile network

All authentication traffic is on the public Internet

All application data traffic is on the mobile network

4.4.2.4 Improvements Made by Local OP

In example embodiment, local authentication may be performed towards the OP associated to the SCWS to reduce traffic in a significant way. This may be done, for example, to enable authentication traffic to be local so as to reduce the burden on the network itself. In one example embodiment, a shared secret may be established between the network OPSF entity and the OP associated to the SCWS for every RP the user visits. Several mechanisms for the establishment of such a secret are described herein. For example, in one example embodiment, if associations are used by the RPs, they may store the secret used for signature verification and may re-use it when the user visits them the next time. In another example embodiment, if the RP uses the stateless mode, the RP may not save the secret. The OP may create a secret and may shares it securely with the OPSF. The OP associated to the SCWS may store this secret and may reuse it when the user visits the same RP the next time, and the OPSF may store the same secret such that the OPSF may use it directly for signature verification in the stateless mode.

In another example embodiment, it may be assumed that secrets, once shared between OPSF and OP associated to SCWS may be re-used to a certain extent. For example, if a total of 5 secrets for the OP may be stored on the smartcard, the secrets may be re-used each time the user visits a RP. This may be done, for example, to drastically reduce the network traffic compared to OpenID/GBA, specified in 3GPP TR 33.924. For example, daily traffic may be reduced by a half, and if multiple days are considered, the reduction increases even more since secrets can be re-used.

The secrets referred to may be different than the ones used in OpenID/GBA, the secrets shared between OPSF and OP associated to SCWS are the OpenID secrets used to sign the assertion message. As in standard OpenID protocol procedures, these secrets may be shared with RPs and can be established as longer-lived secrets, e.g. lasting longer than a single log-in session, basically enabling this re-use.

4.4.2.5 Further Improvement

In one example embodiment of the protocol flow for implementing the OP on SCWS, the MNO operated OPSF network entity may engage in an additional communication with the OP associated to the SCWS on the device. This communication may be needed since both entities must be equipped with the same symmetric key for each RP to sign the assertion message, or to verify it respectively.

A further improvement to the embodiments may be to drastically reduce the additional communication between device and network, and package the necessary information for the establishment of the secret directly into the protocol fields of the OpenID messages. These messages are sent as HTTP messages over public internet, may put additional burden on the air network infrastructure of the MNO. This may be done, for example, to ensure authentication traffic is local, between browser and UICC/SCWS in the device, which may prevent no network usage. This may enable a reduction of general traffic since the communication is offloaded from the (air) network to the internal communication inside the device.

Another improvement to the embodiments may be given by ensuring that no additional signaling traffic between MNO and UICC/device for the authentication has to be performed. For example, there may not be a GBA run for every authentication or no sending of SMS/MMS or control messages between the network and the device over the air. All necessary information may be carried directly inside the HTTP messages, which may be partly over the internet via air network (device to RP) and partly over fixed line public internet (RP to MNO). But this traffic may be 1) triggered by the user who wants to log in using OpenID, 2) charged to the user via the existing data plan, 3) less than in web-based OpenID and less than in OpenID/GBA.

4.4.2.4 Technical Details of the Protocol Improvements 4.4.2.4.1 Naming Conventions The same naming conventions as described above are repeated here for reference:

OP associated to SCWS: The OpenID identity provider, which issues signed assertion messages and sends them through the user's browser to the RP. The smartcard hosting the SCWS and hence the OP is assumed to have a relationship with the MNO, and hence with all MNO associated entities.

RP: the relying party which can be any website that offers users a login using OpenID. The RP is completely independent from all other entities, hence no additional requirements can be put on RP and no changes to the OpenID protocol flow for the RP may arise. The OP has to support whichever communication mode (stateless or association based) the RP chooses to use. If the MNO decides that users should not use certain RPs, the MNO cannot deny access to these sites by denying OpenID access for these RPs, since the user could still use another identity. The MNO can only limit access to RPs using additional means, which block access to bandwidth consuming sites in general.

OP-Agg: The OP-Agg implements a network entity which provides the discovery service for the RPs, according to the OpenID standards.

OPSF: The OP Service Function (OPSF) implements the supporting OP functionality which is able to generate, share and distribute secrets for the OpenID protocol with the OP associated to SCWS and optionally the RP. The OPSF and the OP associated to SCWS are acting from the perspective of the RP as if they were a single entity. The OPSF is able to verify signatures issued by the OP associated to SCWS and is directly reachable for the RP via public internet. The browser on the device is redirected to the OP associated to SCWS by modifying the local DNS resolving cache on the device such that the address of the OPSF maps to the local OP associated to the SCWS.

The requirement for this entity OPSF and its necessary functionality was described in the previous document 'OP on SCWS specification draft' precisely as above.

Browser: Shown in the protocol flow diagrams to make the routing and messaging function to and from OP associated to SCWS explicit. Otherwise it is only a frontend to display and receive user authentication.

4.4.2.4.2 Possible Assumptions for Embodiment

The OP associated to SCWS and the OPSF function may have established a long-term secret K which is protected by the smartcard security features and only accessible to the OP associated to the SCWS. Establishment of this secret may, for example, be via a single GBA run or using another key derivation function which allows deriving this key from e.g. an AKA key or any other method resulting in a shared secret between MNO and the OP associated to SCWS which can be protected by the UICC security features. Additionally, the establishment of the secret may occur using any methods known in the art.

The smartcard may also provide cryptographic functionalities (algorithms and calculations) to calculate new secrets derived from K. Specific properties of this function may be derived from the description and the security requirements. The same, or a similar function may also be known to the OPSF, which may allow the OPSF to derive keys from K.

Both entities may be able to generate random values of sufficient length for the cryptographic operations.

4.4.2.4.3 Protocol Flow Descriptions

The following sections describe example embodiments of protocol flows for an implementation of the OP associated to SCWS.

4.4.2.4.3.1 Example Embodiment for Protocol Flow for RPs Using Stateless Mode

If the RP uses stateless mode to perform OpenID user authentication, the embodiment depicted in FIG. 26 may apply.

4.4.2.4.3.1.1 Description for Stateless Mode

FIG. 26 illustrates an example embodiment of a protocol flow for improved stateless mode.

745: The user may visit the RP website and in order to log in using OpenID, he enters his OpenID identifier, e.g. http://op.org/identity

750: The browser may send the HTTP message containing the OpenID identifier to the RP website

755: The RP may use OpenID 'simple' discovery, HTTP/HTML based and contacts the OP-Agg via public internet to retrieve the identity page for the OpenID identifier, e.g. HTTP GET http://op.org/identity

760: The OP-agg may receive the request and may respond with a HTML page containing the internet address of the OPSF. For example, the OP-agg may response by including the following:

<link rel="openid.server" href=http://op.org/
       server.cgi>

The OPSF may act like a standard OpenID Identity Provider web service towards the RP. For example, the OPSF is able to verify the signature (issued by the Local OP) on the assertion message upon request from the RP. As per the requirements, the OPSF must be reachable via public internet and is hence assumed to have a DNS name, as for example op.org, reachable via http://op.org. Since the outside world cannot know the IP address of the smartcard, this indirection OP-agg and OPSF may be used for the communication.

The address of the OPSF may be different from the address of the OP-agg.

765: The RP may receive the address of the OPSF and creates a nonce and a session identifier, e.g. nonce=123123, session=User. The RP may compile the return_to parameter which tells the OP to which URL the browser should be redirected after user authentication. The RP may issue a HTTP redirect, redirecting the browser to the OP server address including the following parameters:
    openid.mode=checkid_setup,
    openid.identity=http://op.org/identity,
    openid.return_to=http://rp.org/
return.cgi?session=User&nonce=123123

770: The browser may receive the redirect and may open a connection to the URL specified by the RP in the redirect message

775: With a modified local DNS lookup table, which maps the URL of the OPSF to the SCWS local IP address, e.g. by using a hosts file with entry http://op.org==127.0.0.1, the browser may be redirected to the local OP associated to SCWS and issues a HTTP request including the parameters at 765.

A modified local DNS lookup table may be on the device which lets the device think that the URL http://op.org is at the local IP address of the SCWS. The browser may open a connection to the SCWS/Local OP instead of connecting to the OPSF (which is reachable via public internet at the URL http://op.org).

780: The following may be performed to ensure that authentication traffic is kept local, these steps are not required or specified by the OpenID protocol specifications:
    a. The OP may be associated to SCWS displays a local authentication page
    b. The user may enter his authentication credentials, e.g. username and password
    c. The OP associated to SCWS may verify the credentials

785: The OP associated to SCWS may create a unique and random association handle A. Using a function f, the signing secret for the assertion message may be calculated with $S=f(A,K)$, where f should be one-way such that knowledge of A does not reveal any knowledge about K. In one example embodiment, f may not reveal any knowledge about K even if S and A are revealed, i.e. given S and A it should be computationally infeasible to calculate $K=g(S, K)$ for a function g.

Since A may be revealed to the RP as part of the parameters in the redirect message, it may be assumed that the RP will not gain knowledge of S in the stateless mode of the OpenID protocol run. The association handle A may be included in the redirect message. Additionally it may be assumed that, that given a signed message m signed using S may not reveal any information about K to the verifier of the signature (since symmetric key signatures are used, the verifier of a signature will always need to be in possession of S in order to verify a signature, hence we do not require that the signature does not reveal S).

The association handle may be specified to be a string 255 characters or less in length and may consist only of ASCII characters in the range 33-126 inclusive (printable non-whitespace characters).

The secret used by OPSF to verify the signature may be the same as the one used by the OP associated to the SCWS to generate the signature. Freshness of the signature may be ensured by the RP nonce inserted in the next step, and which is required to be part of the signature. The OpenID specifications remain tacit about the freshness of the signing secret itself It may be the responsibility of the OP to assure the secret's cryptographic strength, maintain its secrecy, and ensure its freshness, when this is required. The OPSF or the OP associated to the SCWS may enforce a limited lifetime, or usage count for the signing secret for that purpose.

A toolkit-enabled Local OP may use CAT to proactively communicate with the handset, bypassing the SCWS. The message may be formatted as per standard OTA (e.g. for sending to OPSF via the SMS-PP bearer). This may require the OPSF to communicate with the card via the MNO's OTA system. In another example embodiment, the BIP gateway may extract the payload of the toolkit message and the handset could send it to OPSF using TCP/IP. This may require messages to go via the MNO's OTA server. Additionally, SCWS says that BIP is to be used only where the card does not have an IP address and does not support TCP/IP. So, sending via SCWS using TCP/IP may be what is expected.

d. Further options may apply, which may have to result in a shared secret between OP associated to SCWS and OPSF. Feasibility of such methods is ffs.

790: The OP associated to SCWS may calculate a signature on the parameters: return_to, identity and mode.

795: The OP associated to SCWS may send a HTTP redirect message to the browser, including the parameters received from the RP at 765. Additionally, the following may be included:
    a list of the signed parameters in the openid.signed parameter
    the association handle A in the openid.assoc_handle parameter
    the signature (base64 encoded) in the openid.sig parameter.

This message may be used to redirect the browser to the return_to URL at the RP.

800: The browser may redirect the user to the return_to URL at the RP.

805: The RP may receive the signed assertion message and engages in a verification procedure with the OPSF in a direct communication via public internet, HTTP(S) based.

810: The RP may issue a HTTP POST message containing the received parameters from the OP associated to SCWS at 795. The HTTP Post message may include the association handle A as generated by the OP associated to SCWS.

815: The OPSF may extract A from the parameter list and may use the same function f as the OP associated to SCWS with the same input, i.e. OPSF calculates $f(A,K)=S$ and uses S as the shared key to verify the signature on the received data from the OP associated to SCWS.

820: The OPSF may return is_valid:true if the signature verification succeeded.

825: For the RP, the user may now be identified as http://op.org/identity

830: The browser may display the HTML page of the RP

Figure 27B:
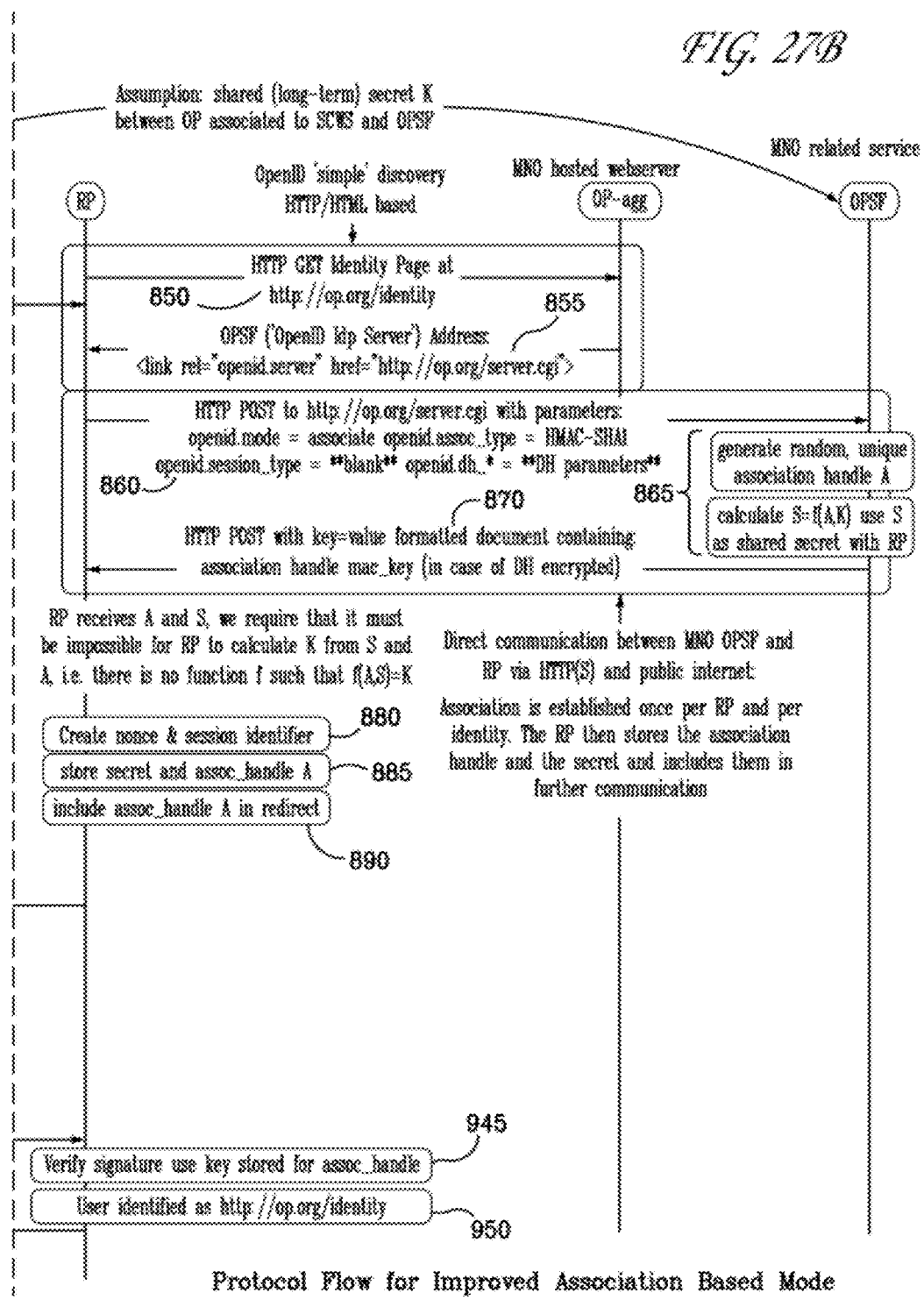
FIG. 27 illustrates an example embodiment of a protocol flow for improved association-based mode.

835: The user may be logged in at the RP as http://op.org/identity 4.4.2.4.3.2 Protocol Flow for RPs Using Association Based Mode FIG. 27 illustrates an example embodiment of a protocol flow for improved association-based mode. This may be done, for example, when the RP uses association based mode to perform OpenID user authentication. The association may take place after the user first contacts the RP and uses his OpenID identifier with that RP. If an association is established, it may be reused to further decrease the communication effort. However, it is may not be possible for the OP to mandate the operational mode of the RP, it is up to the RP to decide upon one of the two communication models.

The association may establish a persistent secret between RP and OP which may be used by the OP to sign the assertion messages and may be used by the RP to verify the OP signature. The OP may decide on the validity period of the shared secret. The RP and OP may use the association handle as identifier for the secret. The RP may include the association handle in the first request message to the OP, and the OP may then use the corresponding secret depending on the association handle. If the OP decides that the association has expired, the OP may inform the RP in the response message. This may allow the OP to reject any association request. As long as RPs are able to support stateless mode too, this may be used to force RPs to fall back into the stateless communication mode. An OP may, for example, reject an association request if the requested signature mode (HMAC-SHA1 or HMAC-SHA256) from the RP is not supported by the OP.

As opposed to the stateless communication mode, where a new secret is established between RP and OP every time the user logs in to the RP, the association may be established once per identity and RP. For example, not all the items shown in FIG. 27 may be performed when the user logs in. If an association between OP and RP is already established it may be re-used by the RP and OP.

The RP may establish the association as soon as the address of the OPSF is known, i.e. after the discovery phase, and may complete the association before proceeding with the protocol, i.e. before including the association handle in the redirect message.

As shown in FIG. 27:

840: The user may visit the RP website and in order to log in using OpenID, he may enter his OpenID identifier, e.g. http://op.org/identity 845: The browser may send the HTTP message containing the OpenID identifier to the RP website.

850: The RP may use OpenID 'simple' discovery, HTTP/HTML based and may contact the OP-agg via public internet to retrieve the identity page for the OpenID identifier, e.g. HTTP GET http://op.org/identity.

855: The OP-agg may receive the request and may respond with a HTML page containing the address of the OPSF, e.g. by including the following:

<link rel="openid.server" href=http://op.org/server.cgi>

The address of the OPSF may be different from the address of the OP-agg.

860: The RP may use a HTTP POST call to the OPSF with parameters:

openid.mode=associate,
openid.assoc_type=HMAC_SHA1,
openid.session_type=blank,
openid.dh_*='Diffie-Hellman Parameters'

865: The OPSF may generate a random, unique association handle A for the RP. Additionally, the OPSF may uses a function f and calculates $S=f(A, K)$. S may then be used as the association (mid-term) shared secret between RP and OPSF. The RP later on may use S to verify the signature on the assertion message coming from the OP associated to SCWS. In one example embodiment, since A and S may both be shared with the RP at 870, it may be assumed that f is a function which remains one-way even if A and S are known, such that K cannot be computed given S and A. The function f itself may not be required to be secret.

870: The OPSF may respond to the RP with a HTTP POST containing the association handle A and the secret S (encrypted if Diffie-Hellman was used) in a key=value formatted document. This association may be established once per RP and OpenID identity. This may be performed through the use of HTTPS authentication.

880: The RP may create a session nonce and a session identifier, e.g.

nonce=123123,
session=User

885: The RP may store the secret S and association handle A as received from the OPSF.

890: The RP may include the association handle A in the redirect message.

895: The RP may send a HTTP REDIRECT message to the browser. The HTTP REDIRECT message may include the parameters:

openid.mode=checkid_setup,
openid.identity=http://op.org/identity,
openid.return_to =http://rp.org/return.cgi?session=User&nonce=123123,
openid.assoc_handle=A 900: The browser may receive the redirect message and may open a connection to the URL specified by the RP in the redirect message With a modified local DNS lookup table, which maps the URL of the OPSF to the SCWS local IP address, e.g. by using a hosts file with entry http://op.org==127.0.0.1, the browser may be redirected to the local OP associated to SCWS and may issue a HTTP request including the parameters from 885.

A modified local DNS lookup table may be on the device which may let the device think that the URL http://op.org is at the local IP address of the SCWS.

905: The browser may open a connection to the SCWS/Local OP instead of connecting to the OPSF (which is reachable via public internet at the URL http://op.org).

910: The following may be performed to ensure that authentication traffic is kept local, these steps are not required or specified by the OpenID protocol specifications:

a. The OP associated to SCWS displays a local authentication page b. The user enters his authentication credentials, e.g. username and password c. The OP associated to SCWS verifies the credentials 915: The OP associated to SCWS may need to use the secret S that may be shared between the OPSF and the RP to sign the return message. The parameter A may be extracted from the received HTTP request and the function f is applied such that $S=f(A,K)$.

920: The OP associated to SCWS may use the secret S to calculate the signature on the return_to URL, identity and mode parameters. We may require the function f to be such that given a signed message m, signed using S, may not reveal any information about K to the verifier of the signature on m.

925: The OP associated to SCWS may include the signature in the HTTP redirect as additional parameter.

930: The OP associated to SCWS may send a HTTP redirect message to the browser that may include the following parameters:
openid.mode=id_res,
openid.return_to=http://rp.org/
return.cgi?session=User&nonce=123123,
openid.identity=http://op.org/identity,
openid.signed=mode, identity, return_to,
openid.assoc_handle=A,
openid.sig='base64 encoded signature calculated using S'

935: The browser may redirect the user to the return_to URL at the RP, without any further user involvement.

940: The RP may receive the signed assertion message.

945: The RP may verify the signature using the established shared secret S.

950: For the RP, the user may now be identified as http://op.org/identity.

955: The browser may display the HTML page of the RP.

960: The user may be logged in at the RP as http://op.org/identity.

Additional Embodiments for Association Based Mode

Additional embodiments are disclosed below that are related to the stateless protocol embodiments described in section 4.4.1.4.3.

4.4.2.5 Comparison Between the Improved OP on SWCS with Existing OpenID/GBA In OpenID/GBA, the user authenticates using the GBA protocol, i.e. for every OpenID login attempt at any RP, a GBA run with the OP/NAF over the air interface is triggered, producing load on both, the network entity (OP/NAF) and the network itself by increased traffic. Assume, that given a customer base of 10,000 users, every user logs in to 10 different RPs each day. Under OpenID/GBA, this results in a total of 100,000 GBA authentication runs per day; if each GBA run (challenge+response) only consumes 1-5 kbytes, this is a total of 1-4, 8 GBs per day additional authentication traffic.

4.4.2.6 Security Discussion

The following section provides background of cryptographic tools that may be used in example embodiments for the stateless and association based mode OP on SCWS protocols. Such aspects as the hashing algorithms that may be used are discussed.

4.4.2.6.1 General

A function f may be used to establish a shared secret S between local OP and OPSF. OPSF and local OP may have a common shared long-term secret K which may be used as one input to f, and K may never be revealed to another party in the protocol. The secret S, however, may be revealed to the RP in the association based mode, since the RP may verify the signature on the assertion message. Since sharing secrets may have security implications, it may be necessary to discuss the options a RP has with knowledge of S.

This may also apply to the standard OpenID protocol. Assuming that the RP is malicious, the knowledge of S may not allow the RP to log in the user at another RP, since another RP would establish another shared secret S' with the OP and hence recognize signatures made using S as invalid. Hence revealing the secret S to the RP may not be a security issue. It may, however, be a security issue to reveal S to the browser (or the user). In this case an attacker may initiate the OpenID protocol with the victim's OpenID identifier. Given that the attacker may retrieve the shared secret S, shared between RP and OP, the attacker could use S to sign an assertion message without performing an actual authentication towards the OP. Hence the attacker could log in using the victim's identifier without authenticating at the victim's OP. As seen from this scenario, the shared secret S between RP and OP may not be revealed to the browser, but it may be okay to expose S to the RP.

In the case of a malicious user and RP working together, the RP could send S to the browser and the user could log in to the RP without authentication at the OP. However, this may not be considered as an attack since the user may only able to log in to the single RP which per assumption of the scenario is already under his control (or at least cooperates with the user). Hence the user may log in even without performing an OpenID authentication protocol run at all.

4.4.2.6.2 Security Features of the Example Protocols

In some example embodiment, A may be revealed to the browser as well as a message signed using S in the redirect messages and it may be infeasible to calculate S given knowledge of A and a message signed using S. Moreover, given the same inputs, it may be infeasible to calculate K.

If it is required that given A and S (the most information that may be revealed to a single third party other than OP and OPSF), it is computational infeasible to derive K (i.e. it may be assumed that there is no function f-1, such that f-1(A,S)=K, which can be computed in time polynomial in the length of the input) then no RP may derive the long-term shared secret K between OPSF and OP associated to SCWS.

Hence it may be required that given a random input A and a shared secret K, f yields a new secret S such that S=f(A,K). Given A (and a message signed using S) it may be infeasible to calculate S. That may requires that f may yield the correct results if input K is correct and present.

Calculation off may be possible in polynomial time and preferably take place in protected areas of the smartcard.

S may be a valid input to the signature function used in OpenID. OpenID foresees the use of HMAC-SHA1 or HMAC-SHA256 as signature algorithms. Since the OPSF and OP associated to SCWS may agree beforehand on a specific signature algorithm, key lengths, and hence the output length of function f may be fixed. In one example embodiment, OPSF and OP may use two shared secrets K and K' such that K may be used to derive S for SHA1 based signatures and K' is used to derive S for SHA256 signatures.

4.4.2.6.3 Security Implementations

The embodiments described in this section are cryptographic operations which may fulfill the requirements pointed out in the previous section. In one example embodiment, secrets may be included directly inside the OpenID messages, which may result in a decrease in traffic needed for authentication. User authentication may be carried out locally (no MNO network involved), and the shared secret, between OPSF (MNO network) and the OP associated to SCWS (in the device), may be communicated securely inside the OpenID protocol messages without the need for further external and additional communication between the MNO network and the device.

4.4.2.6.3.1 HMAC

A HMAC is a keyed-hash message authentication code (MAC) to authenticate both the source of a message and its integrity without the use of any additional mechanisms.

HMACs have two functionally distinct parameters, a message input and a secret key known only to the message originator and intended receiver(s).

An HMAC function is used by the message sender to produce a value (the MAC) that is formed by condensing the secret key and the message input. The MAC is typically sent to the message receiver along with the message. The receiver computes the MAC on the received message using the same key and HMAC function as was used by the sender, and compares the result computed with the received MAC. If the two values match, the message has been correctly received, and the receiver is assured that the sender is a member of the community of users that share the key.

Given the properties of an HMAC, the use of an HMAC for function f may fulfill all relevant requirements described above.

The listing of relevant parameters for the HMAC:

B—block size of the input to the hash function, e.g. 160 bit for SHA1

H—Hash-function (e.g. SHA1)

ipad—inner pad, byte x'36' repeated B times

K—secret key shared between OP and OPSF

K0—key K after pre-processing to obtain a B byte key

L—block size of the output of the hash function, e.g. 160 bit for SHA1 opad—outer pad, the byte x'5c' repeated B times t—number of bytes of MAC text—cleartext to calculate the HMAC from, length of n bits, with $0<=n<2^B-8B$, will be A in our case $\|$—concatenation XOR—exclusive OR K should be equal or greater than L/2, i.e. for our case K should be greater than 80 bit if SHA1 is used, or 128 bit for SHA256.

$MAC(text)=HMAC(K, text)=H((K0\ XOR\ opad)\|H((K0\ XOR\ ipad)\|text))$

The nested execution of two hash functions to calculate the MAC may be needed to prevent attacks. With most hash functions, it is possible to append additional data to the message without knowing the key K and obtain another valid MAC. Using the other alternative, appending the key using $MAC=H(message\|key)$, allows an attacker who can find a collision in the (unkeyed) hash function to obtain a collision in the MAC. Using $MAC=H(key\|message\|key)$ is better, however various security papers have revealed vulnerabilities, even when two different keys are used.

Figure 28:
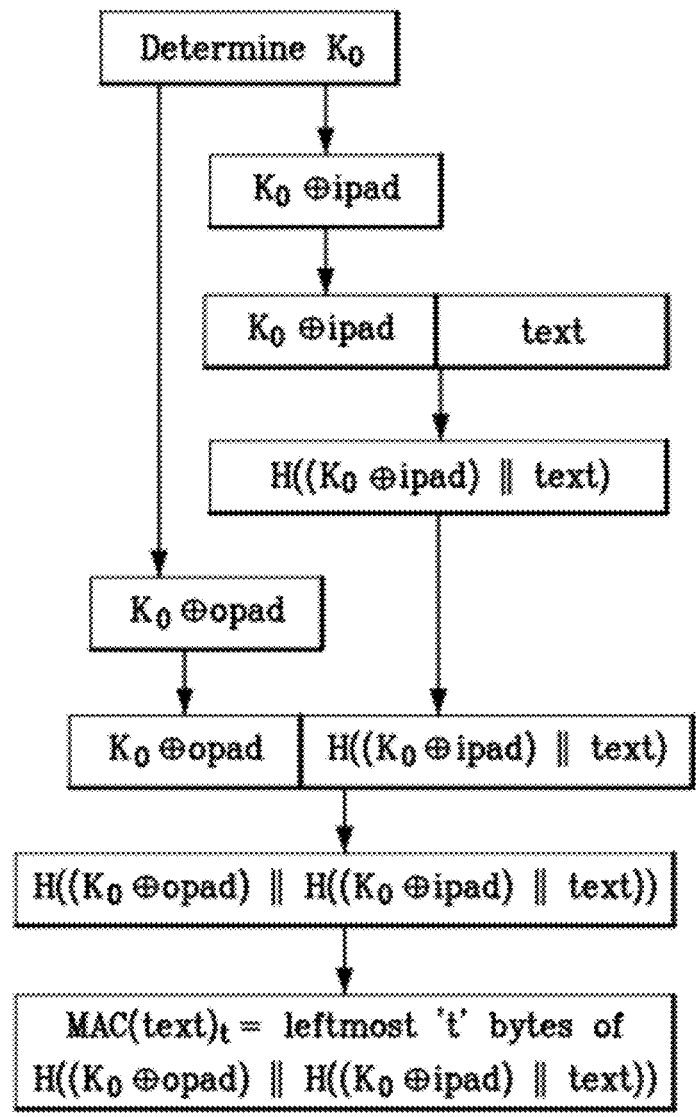
FIG. 28 illustrates The Keyed-Hash Message Authentication Code (HMAC) from NIST-FIPS PUB 198-1.

FIG. 28 illustrates The Keyed-Hash Message Authentication Code (HMAC) from NIST-FIPS PUB 198-1.

The current agreed version of HMAC is not exposed to these vulnerabilities because the outer hash function masks the intermediate result of the internal hash. The values of the paddings (ipad and opad) are not critical to the security of the algorithm, but were defined to have a large Hamming distance from each other and so the inner and outer keys will have fewer bits in common, i.e. the paddings are used to 'derive' two different keys from K0 to be used in the hash functions.

In one example embodiment, text=A as random input may be generated by the OP or OPSF respectively. A may be included in the redirect messages, and using K both may recalculate the HMAC using the aforementioned mechanism, and the HMAC result may be used as shared signing secret S for the OpenID assertion message.

4.4.2.6.3.2 Security Proof of the Improved OP on SCWS Protocols

What needs to be shown:

1. In the protocol an attacker is able to retrieve A and S (e.g. as RP in association mode), hence it must be shown, that it is impossible for him to retrieve K.

2. The browser/user retrieves even less than a RP, namely only A, and must not be able to calculate S from knowledge of A.

3. The browser/user must also not be able to calculate K from A. The proof for 3. can be derived, from 1, when modeling an attacker with knowledge of S and A, where the attacker does not use the given information on S.

Hence it must be shown that:

I. given S and A there should be no function f* such that $K=f^*(A,S)$, if $S=f(A,K)$ II. given only A there must be no function g such that $S=g(A)$, if $S=f(A,K)$ Both theorems find their proof in the description of HMAC (or NMAC) as presented by Bellare et. al. in (11), where they essentially show that HMAC is a pseudorandom function assuming that the underlying compression hash-function is pseudorandom and the hash function is weakly collision resistant. In (12) these assumptions are relaxed by showing that HMAC is a PRF under the sole assumption that the compression function is a PRF.

4.4.2.6.3.3 RSA

In one example embodiment, the RSA encryption scheme may be used to derive the OpenID signature secret S from the shared key K, by encrypting the randomly created, unique association handle with the private key which must be shared between OPSF and OP associated to SCWS. Let N=pq denote the modulus used in the RSA scheme, with p, q prime. Further, the keypair is denoted by e, d (private, public) and it is shared as the long-term secret K. The association handle A is then signed using the private part e to obtain the signature secret S, i.e. $S=A^e\ modN$. Given the security assumptions for RSA, it may be possible to calculate A from S if the public key d is known, but it may not possible to calculate e given A and S. Given only A, it is not possible to calculate S without knowledge of e.

4.4.2.6.4 Security Implementation Variants 4.4.2.6.4.1 Change of Long-Term Secret K In one example embodiment, described in section 4.4.2, although a long term secret K is used, this secret K may be changed, e.g. after a certain period of time, using key exchange methods between OPSF and OP associated to SCWS. Any key exchange method known in the may be used.

A change of K may be performed at OPSF and OP associated to SCWS may not prevent a successful OpenID protocol run.

In one example embodiment, if OPSF and OP have agreed upon a new long-term secret K' in the stateless mode, the OP may calculate the signing key S' using function f with the new key, i.e. $S'=f(A,K')$. S' may then be used to sign the assertion message and the OPSF may verify the signature on the assertion message by recalculating S' using the new long-term shared secret K'.

In another example embodiment, if a new secret long-term secret K' is established in the association based mode, the RP may still have the old secret S stored for the association. If the association is still valid and the RP does not engage in the association steps with the OPSF, the RP may directly use the old association handle A and may expect the assertion message from the OP to be signed using the already stored secret S. However, the OpenID specification allows the OP to include the parameter openid.invalidate_handle in the assertion message. If this parameter is used and set to the old association handle A, the RP may be forced to come back to the OP for signature verification as in the stateless scenario. This may allow the OP associated to SCWS to include this parameter, set to A in case of a new long-term shared secret K', and a new signature secret S'=f(A',K') using a newly created association handle A'. This may invalidate the handle at the RP and the RP may contact the OPSF for signature verification. The OPSF may already has K' due to the key exchange, and may hence calculate S'=f(A',K') and may verify the signature on the assertion message. If the RP, however, engages in a new association session with the OPSF, the OPSF may also invalidate the handle A and may establish a new pair A', S' with the RP using the new key K'.

4.4.2.6.4.2 Hash-Chain Commitment for K

In one example embodiment, the OPSF and OP associated to SCWS may want to change the long-term secret K on a regular basis. Based on the secret K, both entities may perform a hash-chain commitment, by applying a (cryptographically secure) hash function h to K in a subsequent manner, resulting in a chain: K0=h(K), K1=h(K0)=h(h(K)), ..., Kn=h(Kn−1)=hn(K). If the initial secret K may be established securely, the OP and OPSF may calculate this chain independently. The first shared secret used may then be Kn. Given the one-way property of the hash function used to build the hash chain, this value may not allow an attacker to directly calculate the following shared secret Kn−1. An attacker would have to reverse the hash-function in order to derive the next secret. The secrets are used by OPSF and local OP in the reverse order of the hash chain. To further improve security, the advancement to the next value in the hash chain, that is discarding of the current value and calculation of the next value by OPSF and local OP, may follow several policies, e.g., may be executed each month, each day, each session, etc.

4.4.2.6.5 Reuse of AKA AVs, and Secrets, Build Hash-Chains from AKA Credentials In an example embodiment, the OPSF may be co-located with a network function at the MNO which may allow the OPSF to retrieve AKA Authentication Vectors (AVs) from the HLR (Home Location Register) and an AuC (Authentication Center) of the MNO. The OPSF may retrieve the AVs and may select one of them to challenge the OP associated to SCWS. By the use of this AV, the OPSF and OP associated to SCWS may establish a shared secret CK, which may then be used as the long-term shared secret K for OpenID. In another example embodiment, instead of establishing a long-term secret, the OP and OPSF may establish a commitment to a hash-chain, whose values are to be used as shared secrets between OPSF and OP associated to SCWS. This may be a secure way to establish the long-term shared secret.

4.4.2.7 Highlighting the Benefits of the Improvement

This section is intended to visualize benefits that may be provided by the OP on SCWS, especially in this improved variant.

4.4.2.7.1 Standard OpenID

Figure 29:
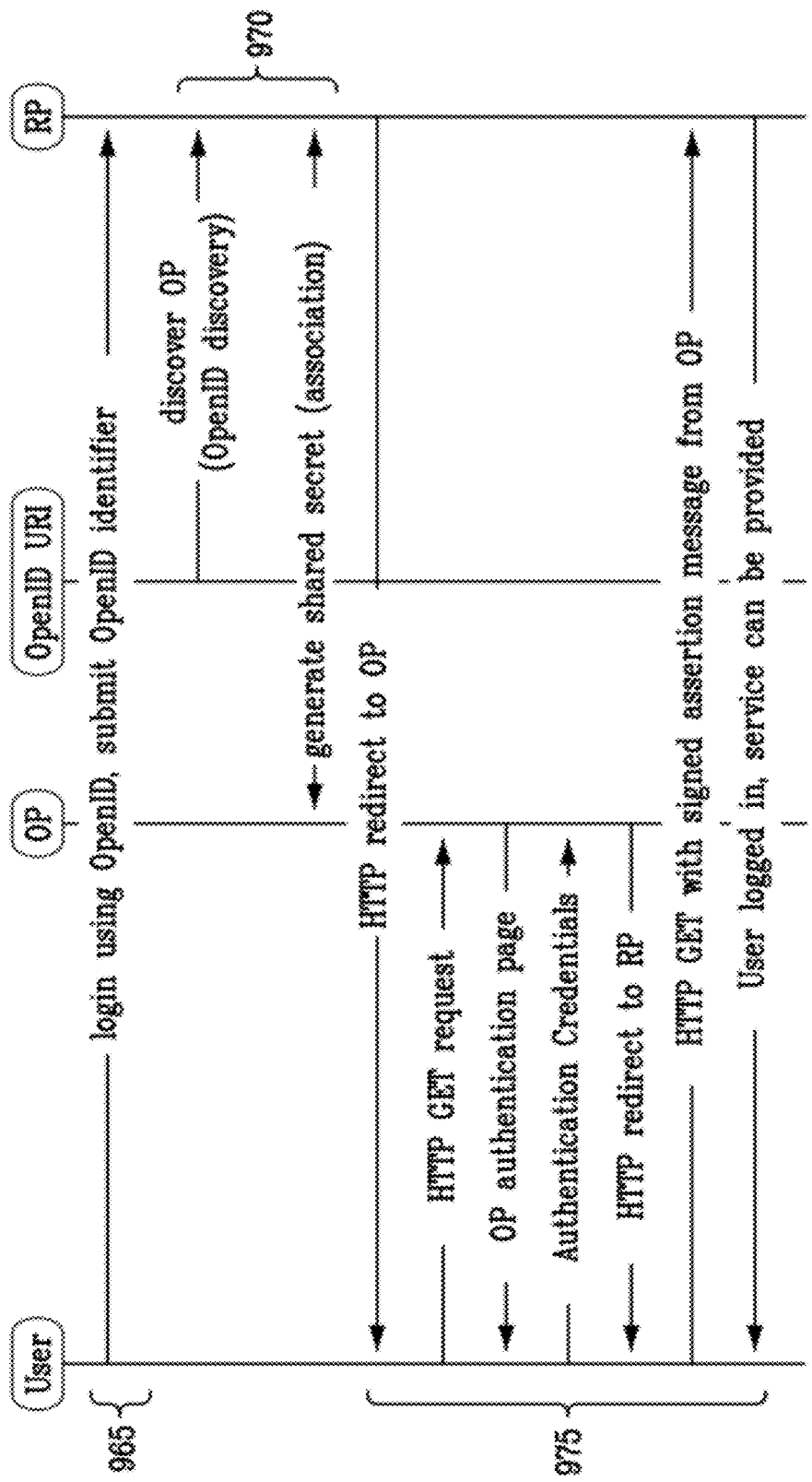
FIG. 29 illustrates the traffic flows for OpenID/GBA.

FIG. 29 illustrates the standard OpenID protocol flow. The standard OpenID protocol run is used to access a RP from a mobile device, using an existing, web-based OpenID OP server (e.g. such as myopenid.com).

As shown in FIG. 29, there is no local traffic and the only traffic that is offloaded from the air network is the discovery process and the association establishment between RP and OP. Since the OP is a web service, all communication between User/Browser/Device and OP is over the air interface.

At 965 and 975 over the air communication occurs, which is carried out over the MNO/air network, in general as data traffic (e.g. HTTP, IP based communication), representing load on the MNO network.

At 970, traffic which happens over fixed line internet, and can use existing infrastructure.

4.4.2.7.2 OpenID/GBA

Figure 30:
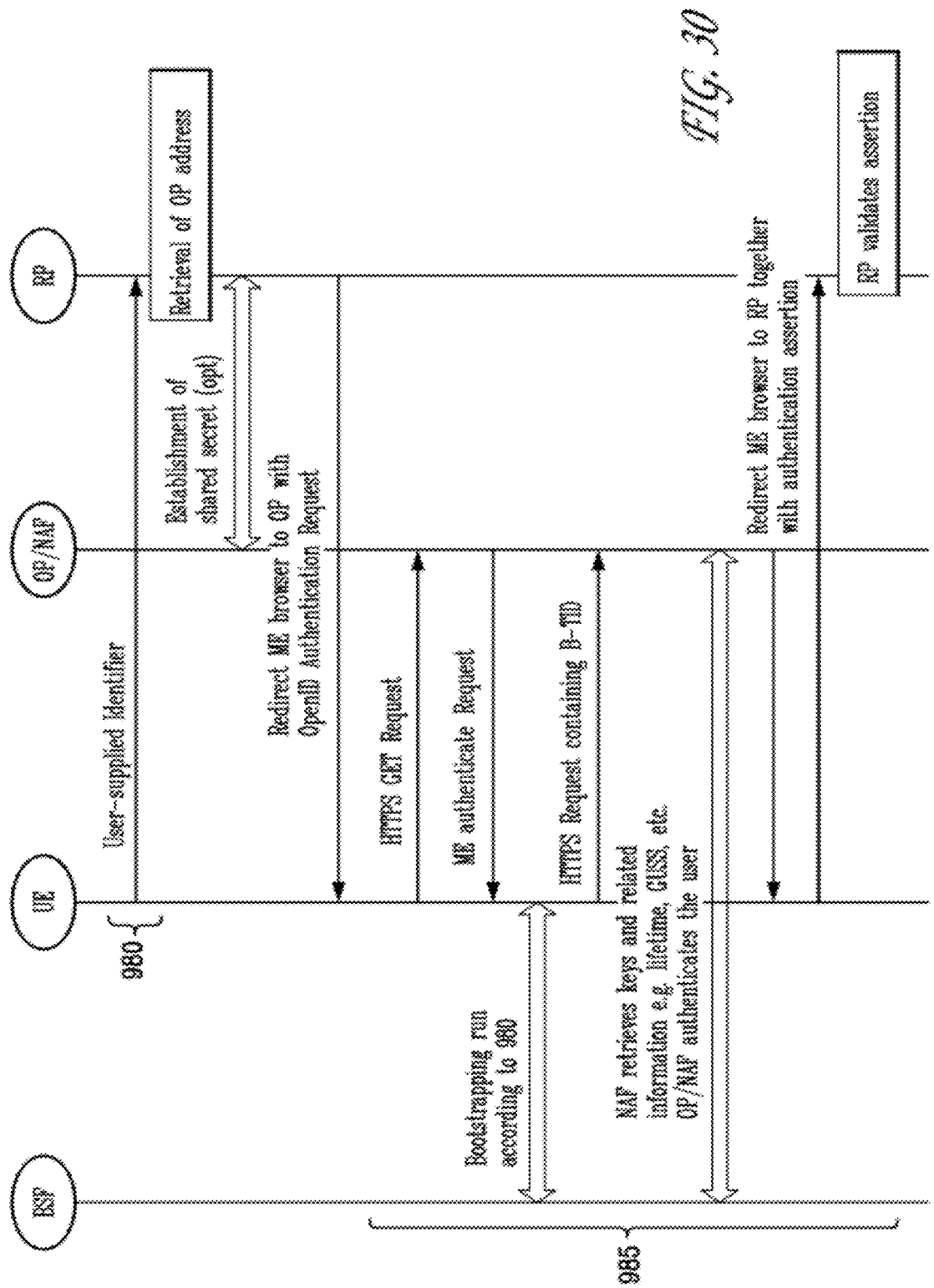
FIG. 30 illustrates another example embodiment of a protocol flow for an association based communication mode.

FIG. 30 illustrates the traffic flows for OpenID/GBA. This figure is derived from taken from FIG. 4-4 1.1 in from the 3GPP TR 33.924 v9.1.0, p. 13.

As shown in FIG. 30, all communication takes place over the air network, despite the association steps between RP and MNO. For example, the signals at 980 and 985 are over the air communication, which is carried out over the MNO/air network as data traffic and represent load on the MNO network. Compared to a web based OP, the traffic is even increased in OpenID/GBA, since additional steps for authentication are needed, which put a burden on the air data network as well as on the back-end services needed for GBA authentication, namely the BSF and NAF subsystems. Thus, there is an increase in air network traffic and an increase in load on network entities.

4.4.2.7.3 Simplified Association Based Communication

Figure 31:
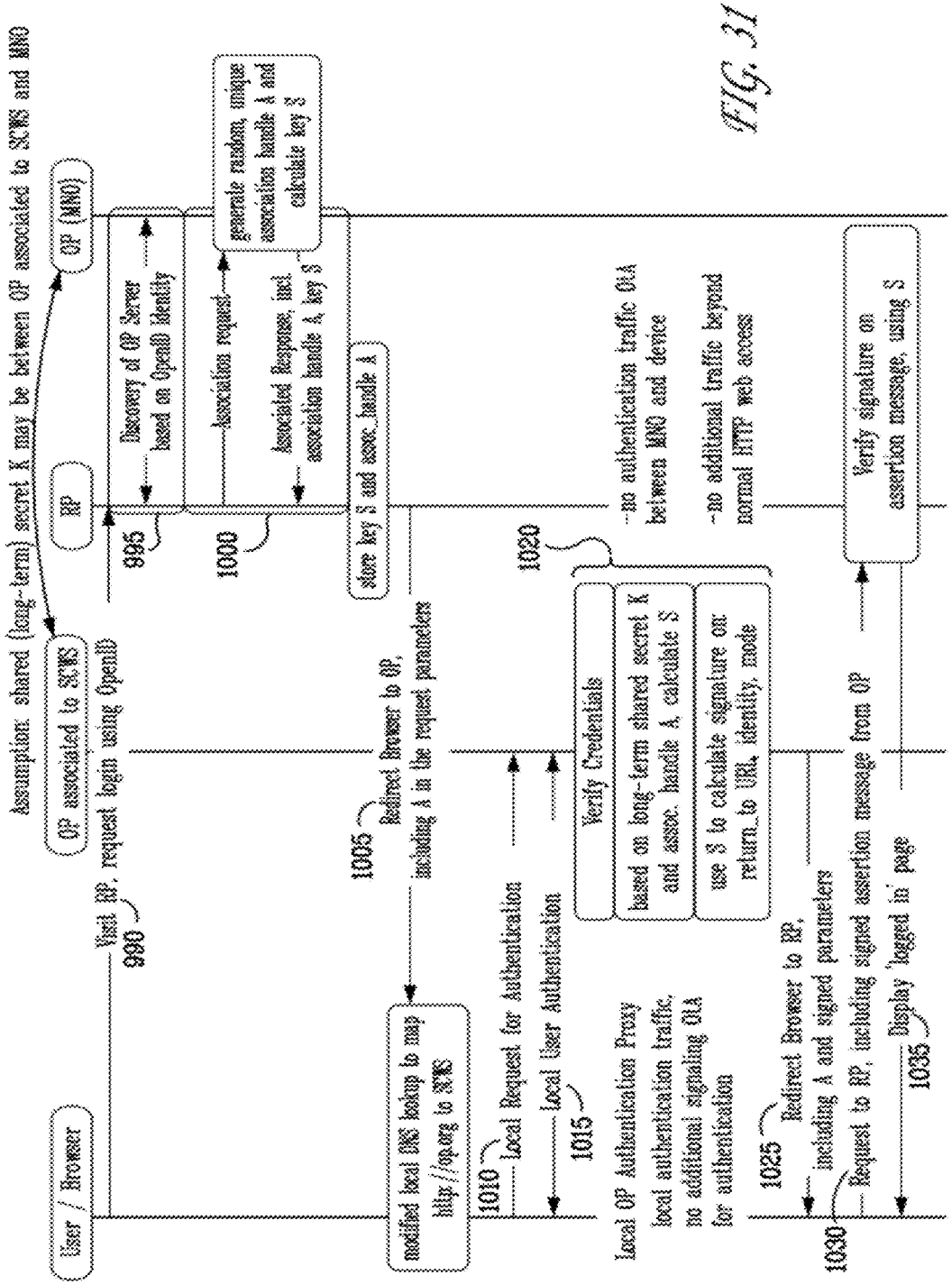
FIG. 31 illustrates another example embodiment of a protocol flow for an association based communication mode.

FIG. 31 illustrates an example embodiment of a protocol flow for an association based communication mode. As shown in FIG. 30, over the air traffic may be offloaded to the local device such that there is a reduction to the air interface network traffic. This may be done, for example, to allow authentication traffic to become local such that authentication traffic minimizes the burden on the air interface network or the network services. Additionally, discovery and/or association traffic may not occur via the air interface network and may take place over the fixed line public internet.

At 990, a user may interface with a user interface, such as a browser, may visit an RP, and may request login using OpenID. At 995, the RP and the OP (MNO) may perform discovery of a OP server based on a OpenID identity. At 1000, the RP may transmit an association request to the OP. The OP may generate a random unique association handle A and may calculate a key S. The OP may transmit the association response to the RP. The association response may include association handle A and key S. The RP may store key S and association handle A.

At 1005, the RP may transmit a redirect to the browser. The redirect may redirect the browser to the OP and may include the association handle A in the request parameters. The OP may be associated to the SCWS. The browser may receive the redirect and may perform a modified local DNS lookup to map to the SCWS. At 1010 the browser may transmit a local request for authentication to the OP. At 1015, authentication may occur locally. For example, at 1020, the OP may verify credentials based on a long-term shared secret key K and an association handle A. Additionally, the OP may calculate the key S and may use the key S to calculate a signature. The signature may be used to sign an assertion message and/or sign parameters, such as the return URL, the identity, and/or the mode.

At 1025, the OP may transmit a redirect to the browser that may instruct the browser to visit the RP. The redirect may include the association handle A and the signed parameters. At 1030, the browser may transmit a request to the RP that may include the signed assertion message from the OP. The RP may verify the signature on the assertion message using the key S. The RP may then enable the browser to display the logged in page and may provide access to a service to the browser at 1035.

In one example embodiment, it may be assumed that a long-term share key exists between the OP associated to the SCWS and the MNO. As shown in FIGS. 31, 1010, 1015, 1020, and 1025 represent local communications that may not present a load on MNO/air network. Additionally, these communications may occur with no traffic over other (fixed line, or non-MNO) networks, as these communications may take place inside the device.

990, 1005, 1030 and 1035 represent over the air communications, which may be carried out over the MNO/air network as data traffic (e.g. HTTP, IP based communication) and may represent load on the MNO network.

995 and 1000 represent traffic that may occur over a fixed line, such as fixed line internet, and may use existing infrastructure. This communication may not increase the load on the MNO/air interface network.

Figure 32B:
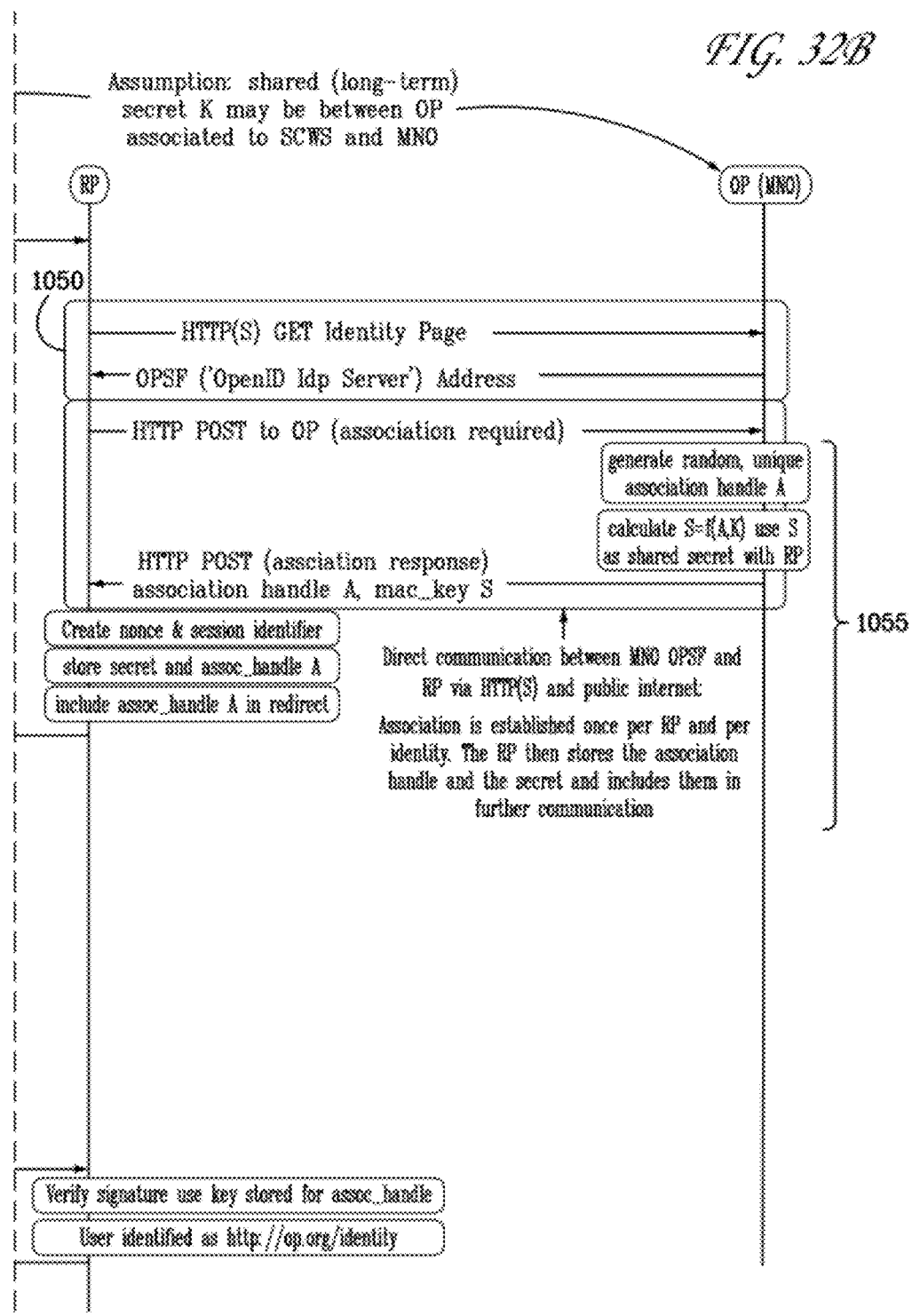
FIG. 32 illustrates another example embodiment of a protocol flow for an association based communication mode.

FIG. 32 illustrates another example embodiment of a protocol flow for an association based communication mode. As shown in FIG. 32, over the air traffic may be offloaded to the local device such that there is a reduction to the air interface network traffic. This may be done, for example, to allow authentication traffic to become local such that authentication traffic minimizes the burden on the air interface network or the network services. Additionally, discovery and/or association traffic may not occur via the air interface network and may take place over the fixed line public internet.

At 1040, a user may interface with a user interface, such as a browser, may visit an RP, and may request login using OpenID. At 1045, the browser may transmit an HTTP message that may contain an OpenID identity URL, to the RP. At 1050, the RP and the OP (MNO) may perform discovery of OP server based on an OpenID identity. For example, the RP may transmit a HTTP(S) GET identity page message to the OP, which may respond with an OpenID IDP Server Address.

At 1055, the RP may transmit an association request to the OP. For example, the RP may transmit a HTTP(S) POST to the OP. The OP may generate a random unique association handle A and may calculate a secret S. The OP may transmit the association response to the RP. For example, the OP may transmit HTTP(S) POST to the RP. The association response may include association handle A and secret S. The RP may store secret S and association handle A. The RP may create a nonce and a session identifier.

At 1060, the RP may transmit a redirect to the browser. For example, the RP may transmit HTTP REDIRECT to the browser. The redirect may redirect the browser to the OP and may include the association handle A in the request parameters. The OP may be associated to the SCWS. The browser may receive the redirect and may perform a modified local DNS lookup to map to the SCWS. At 1065 the browser may transmit a local request for authentication to the OP. For example, the browser may transmit HTTP GET http://op.org/server.cgi to the OP, which may include the parameters included in the redirect.

At 1070, authentication may occur locally. The browser may present the user with an authentication page that requests user authentication credentials. The user may enter authentication credentials, which may include a username and password. At 1075, the OP may verify credentials based on a long-term shared secret key K and an association handle A. Additionally, the OP may calculate the secret S and may use the S to calculate a signature. The signature may be used to sign an assertion message and/or sign parameters, such as the return URL, the identity, and/or the mode.

At 1080, the OP may transmit a redirect to the browser that may instruct the browser to visit the RP. For example, the OP may transmit HTTP REDIRECT to the RP. The redirect may include the association handle A and the signed parameters. At 1085, the browser may transmit a request to the RP that may include the signed assertion message from the OP and parameters provided by the OP. For example, the browser may transmit HTTP GET http://rp.org/return.cgi to the RP. The RP may verify the signature on the assertion message using the secret S. The RP may then enable the browser to display the logged in page and may provide access to a service to the browser at 1090. For example, the RP may instruct the browser to display the HTML page. At 1095, the browser notifies the user that the user is logged in at the RP.

In one example embodiment, it may be assumed that a long-term share key exists between the OP associated to the SCWS and the MNO.

As shown in FIG. 32, 1040, 1065, 1070, 1080, and 1095 represent local communications that may not present a load on MNO/air network. Additionally, these communications may occur with no traffic over other (fixed line, or non-MNO) networks, as these communications may take place inside the device.

1045, 1060, 1085, and 1090 represent over the air communications, which may be carried out over the MNO/air network as data traffic (e.g. HTTP, IP based communication) and may represent load on the MNO network.

1050 and 1055 represent traffic that may occur over a fixed line, such as fixed line internet, and may use existing infrastructure. This communication may not increase the load on the MNO/air interface network.

FIG. 33 illustrates another example embodiment of a protocol flow for an association based communication mode. As shown in FIG. 33, over the air traffic may be offloaded to the local device such that there is a reduction to the air interface network traffic. This may be done, for example, to allow authentication traffic to become local such that authentication traffic minimizes the burden on the air interface network or the network services. Additionally, discovery and/or association traffic may not occur via the air interface network and may take place over the fixed line public internet.

At 1100, a user may interface with a user interface, such as a browser, may visit an RP, and may request login using OpenID. At 1105, the browser may transmit an HTTP message that may contain an OpenID identity URL, to the RP. At 1110, the RP and the OP (MNO) may perform discovery of OP server based on a OpenID identity. For example, the RP may transmit a HTTP(S) GET identity page message to the OP, which may respond with an OpenID IDP Server Address.

At 1115, the RP may transmit an association request to the OP. For example, the RP may transmit a HTTP(S) POST to the OP. The OP may generate a random unique association handle A and may calculate a secret S. The OP may transmit the association response to the RP. For example, the OP may transmit HTTP(S) POST to the RP. The association response may include association handle A and secret S. The RP may store secret S and association handle A. The RP may create a nonce and a session identifier.

At 1120, the RP may transmit a redirect to the browser. For example, the RP may transmit HTTP REDIRECT to the browser. The redirect may redirect the browser to the OP and may include the association handle A in the request parameters. The OP may be associated to the SCWS. The browser may receive the redirect and may perform a modified local DNS lookup to map to the SCWS. At 1125 the browser may transmit a local request for authentication to the OP. For example, the browser may transmit HTTP GET http://op.org/server.cgi to the OP, which may include the parameters included in the redirect.

At 1130, authentication may occur locally. The browser may present the user with an authentication page that requests user authentication credentials. The user may enter authentication credentials, which may include a username and password. At 1135, the OP may verify credentials based on a long-term shared secret key K and an association handle A. Additionally, the OP may calculate the secret S and may use the S to calculate a signature. The signature may be used to sign an assertion message and/or sign parameters, such as the return URL, the identity, and/or the mode.

At 1140, the OP may transmit a redirect to the browser that may instruct the browser to visit the RP. For example, the OP may transmit HTTP REDIRECT to the RP. The redirect may include the association handle A and the signed parameters. At 1145, the browser may transmit a request to the RP that may include the signed assertion message from the OP and parameters provided by the OP. For example, the browser may transmit HTTP GET http://rp.org.return.cgi to the RP. The RP may verify the signature on the assertion message using the secret S. The RP may then enable the browser to display the logged in page and may provide access to a service to the browser at 1150. For example, the RP may instruct the browser to display the HTML page. At 1155, the browser notifies the user that the user is logged in at the RP.

In one example embodiment, it may be assumed that a long-term share key exists between the OP associated to the SCWS and the MNO. As shown in FIG. 3, 1100, 1125, 1130, 1140, and 1155 represent local communications that may not present a load on MNO/air network. Additionally, these communications may occur with no traffic over other (fixed line, or non-MNO) networks, as these communications may take place inside the device.

1105, 1120, 1145, and 1150 represent over the air communications, which may be carried out over the MNO/air network as data traffic (e.g. HTTP, IP based communication) and may represent load on the MNO network.

1110 and 1115 represent traffic that may occur over a fixed line, such as fixed line internet, and may use existing infrastructure. This communication may not increase the load on the MNO/air interface network.

Figure 34B:
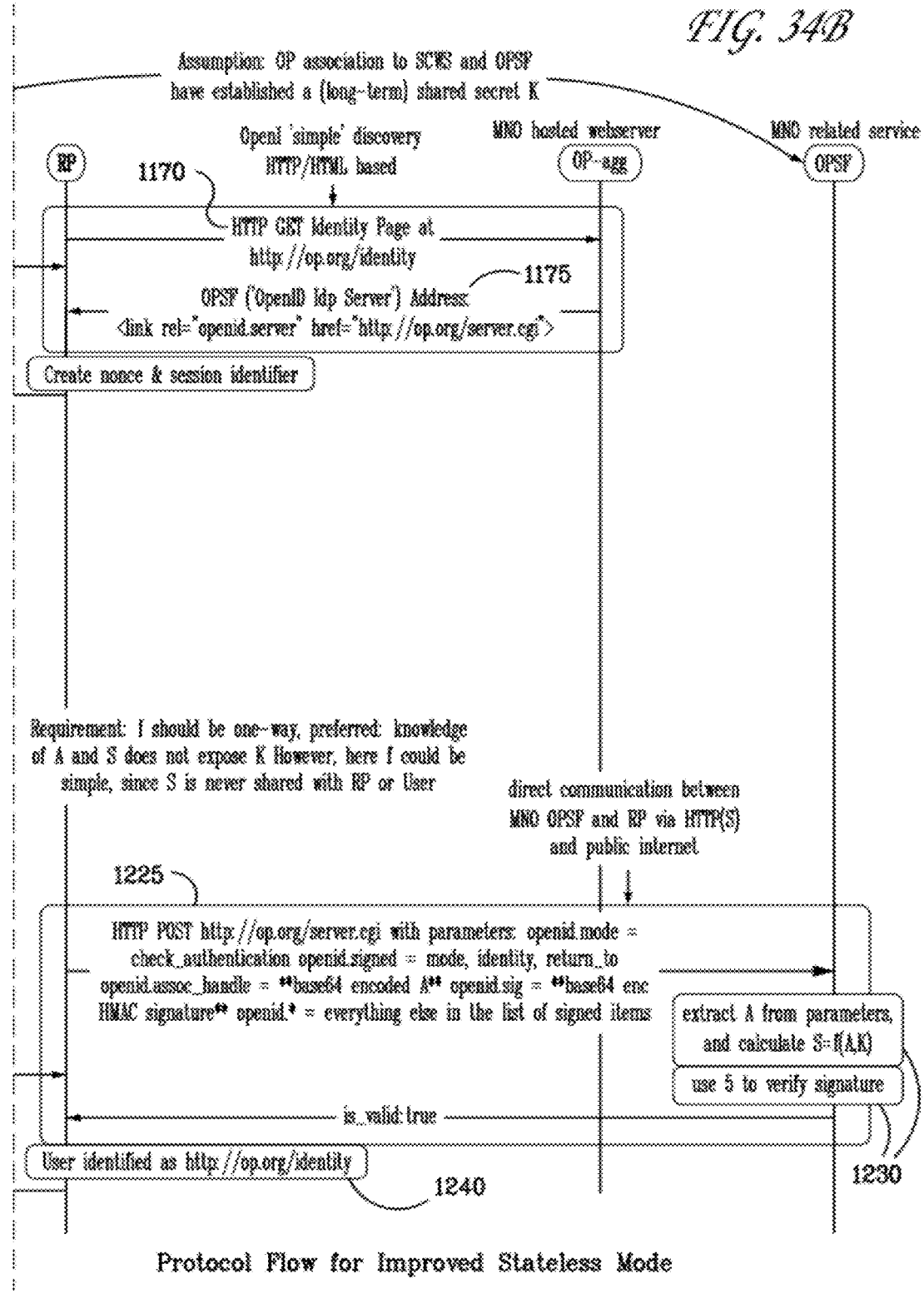
FIG. 34 illustrates an example embodiment of a protocol flow for a split terminal.

FIG. 34 illustrates another example embodiment of a protocol flow for a stateless mode.

1160: The user may visit the RP website and in order to log in using OpenID, he enters his OpenID identifier, e.g. http://op.org/identity

1165: The browser may send the HTTP message containing the OpenID identifier to the RP website

1170: The RP may use OpenID 'simple' discovery, HTTP/HTML based and contacts the OP-Agg via public internet to retrieve the identity page for the OpenID identifier, e.g. HTTP GET http://op.org/identity

1175: The OP-agg may receive the request and may respond with a HTML page containing the internet address of the OPSF. For example, the OP-agg may response by including the following:

<link rel="openid.server" href=http://op.org/server.cgi>

The OPSF may act like a standard OpenID Identity Provider web service towards the RP. For example, the OPSF is able to verify the signature (issued by the Local OP) on the assertion message upon request from the RP. As per the requirements, the OPSF must be reachable via public internet and is hence assumed to have a DNS name, as for example op.org, reachable via http://op.org. Since the outside world cannot know the IP address of the smartcard, this indirection OP-agg and OPSF may be used for the communication.

The address of the OPSF may be different from the address of the OP-agg.

1180: The RP may receive the address of the OPSF and creates a nonce and a session identifier, e.g. nonce=123123, session=User. The RP may compile the return_to parameter which tells the OP to which URL the browser should be redirected after user authentication. The RP may issue a HTTP redirect, redirecting the browser to the OP server address including the following parameters:
  openid.mode=checkid_setup,
  openid.identity=http://op.org/identity,
  openid.return_to=http://rp.org/
return.cgi?session=User&nonce=123123

1185: The browser may receive the redirect and may open a connection to the URL specified by the RP in the redirect message

1190: With a modified local DNS lookup table, which maps the URL of the OPSF to the SCWS local IP address, e.g. by using a hosts file with entry http://op.org=127.0.0.1, the browser may be redirected to the local OP associated to SCWS and issues a HTTP request including the parameters at 765.

A modified local DNS lookup table may be on the device which lets the device think that the URL http://op.org is at the local IP address of the SCWS. The browser may open a connection to the SCWS/Local OP instead of connecting to the OPSF (which is reachable via public internet at the URL http://op.org).

1195: The following may be performed to ensure that authentication traffic is kept local, these steps are not required or specified by the OpenID protocol specifications:
  a. The OP may be associated to SCWS displays a local authentication page
  b. The user may enter his authentication credentials, e.g. username and password
  c. The OP associated to SCWS may verify the credentials

1200: The OP associated to SCWS may create a unique and random association handle A. Using a function f, the signing secret for the assertion message may be calculated with $S=f(A,K)$, where f should be one-way such that knowledge of A does not reveal any knowledge about K. In one example embodiment, f may not reveal any knowledge about K even if S and A are revealed, i.e. given S and A it should be computational infeasible to calculate $K=g(S, K)$ for a function g.

Since A may be revealed to the RP as part of the parameters in the redirect message, it may be assumed that the RP will not gain knowledge of S in the stateless mode of the OpenID protocol run. The association handle A may be included in the redirect message. Additionally it may be assumed that, that given a signed message m signed using S may not reveal any information about K to the verifier of the signature (since symmetric key signatures are used, the verifier of a signature will always need to be in possession of S in order to verify a signature, hence we do not require that the signature does not reveal S).

In one example embodiment, the association handle may be specified to be a string 255 characters or less in length and may consist only of ASCII characters in the range 33-126 inclusive (printable non-whitespace characters).

The secret used by OPSF to verify the signature may be the same as the one used by the OP associated to the SCWS to generate the signature. Freshness of the signature may be ensured by the RP nonce inserted in the next step, and which is required to be part of the signature. The OpenID specifications remain tacit about the freshness of the signing secret itself. It may be the responsibility of the OP to assure the secret's cryptographic strength, maintain its secrecy, and ensure its freshness, when this is required. The OPSF or the OP associated to the SCWS may enforce a limited lifetime, or usage count for the signing secret for that purpose.

A toolkit-enabled Local OP may use CAT to proactively communicate with the handset, bypassing the SCWS. The message may be formatted as per standard OTA (e.g. for sending to OPSF via the SMS-PP bearer). This may require the OPSF to communicate with the card via the MNO's OTA system. In another example embodiment, the BIP gateway may extract the payload of the toolkit message and the handset could send it to OPSF using TCP/IP. This may require messages to go via the MNO's OTA server. Additionally, SCWS says that BIP is to be used only where the card does not have an IP address and does not support TCP/IP. So, sending via SCWS using TCP/IP may be what is expected.

d. Further options may apply, which may have to result in a shared secret between OP associated to SCWS and OPSF. Feasibility of such methods is ffs.

1205: The OP associated to SCWS may calculate a signature on the parameters: return_to, identity and mode.

1210: The OP associated to SCWS may send a HTTP redirect message to the browser, including the parameters received from the RP at 1180. Additionally, the following may be included:

a list of the signed parameters in the openid.signed parameter the association handle A in the openid.assoc_handle parameter the signature (base64 encoded) in the openid.sig parameter.

This message may be used to redirect the browser to the return_to URL at the RP at 1212.

1215: The browser may redirect the user to the return_to URL at the RP.

1220: The RP may receive the signed assertion message and engages in a verification procedure with the OPSF in a direct communication via public internet, HTTP(S) based.

1225: The RP may issue a HTTP POST message containing the received parameters from the OP associated to SCWS at 795. The HTTP Post message may include the association handle A as generated by the OP associated to SCWS.

1230: The OPSF may extract A from the parameter list and may use the same function f as the OP associated to SCWS with the same input, i.e. OPSF calculates f(A,K)=S and uses S as the shared key to verify the signature on the received data from the OP associated to SCWS.

1235: The OPSF may return is_valid:true if the signature verification succeeded.

1240: For the RP, the user may now be identified as http://op.org/identity

1245: The browser may display the HTML page of the RP

1250: The user may be logged in at the RP as http://op.org/identity

As shown in FIGS. 34, 1160, 1190, 1212, 1215, and 1250 represent local communications that may not present a load on MNO/air network. Additionally, these communications may occur with no traffic over other (fixed line, or non-MNO) networks, as these communications may take place inside the device.

1165, 1180, 1220, and 1245 represent over the air communications, which may be carried out over the MNO/air network as data traffic (e.g. HTTP, IP based communication) and may represent load on the MNO network.

1170, 1175, 1225, and 1235 represent traffic that may occur over a fixed line, such as fixed line internet, and may use existing infrastructure. This communication may not increase the load on the MNO/air interface network.

4.5 Scenarios and Applications

This section discusses additional embodiments of the methods and protocols described in the previous sections. For example, this section also extends the generalization by explicitly listing some of the different scenarios, extending the range of use-cases and scenarios.

The term smartcard (SC) may be used to describe any type of Integrated Circuit Card (ICC) that may provide secure operation facilities. The specific use in mobile devices, where the SC may be used to hold network authentication credentials (e.g. GSM/UMTS), may be referred to as UICC. The Smart Card Web server (SCWS) application, as defined by Open Mobile Alliance (OMA) is not limited to the use in UICCs and may be assumed to be available on any other smartcard. Hence, the embodiments described herein, such as embodiments for local user authentication using OpenID with the OP entity residing inside a secure element, may easily be extended to a general SC.

Additionally, any other secure environment which may provide similar interfaces and protected execution for security critical methods may be an implementation target for the embodiments described above.

4.5.1 Stakeholder Models 4.5.1.1 MNO Model

In one example embodiment, the MNO may act as a full identity provider. The MNO may hosts the OP-agg and OPSF discovery and association point entities as web services and may also provide the OP application to the UICC along with the user identity.

4.5.1.2 3rd Party OP and MNO

In one example embodiment, it may be assumed that that the user already has an existing OpenID identifier registered with a 3rd party OP, e.g. such as myopenid.com. This may be referred to as 3rd party OP as (3OP).

The MNO may no longer act as service provider towards the user, but may transport the data and allows the 3OP to install the OP application on the UICC and associate it with the SCWS application. The 3OP may have to establish a business relationship with the MNO. The MNO may also grant the 3OP remote administration rights for the OP application. The MNO may charge the 3OP for that service and generate revenue. Further details are described below with regard to using Global Platform (GP) compliant cards.

4.5.1.3 Non-MNO, Non-Mobile

One example embodiment may be used in a non-mobile scenario. For example, a general SC, such as an SC issued by a bank, may be used by an OpenID identity provider to install the OP application. This may be done, for example, to utilize a banking card, which may host a NFC-ticketing application and an OpenID authentication OP application. It may be assumed that there is no prior knowledge about the type of device that the SC will communicate with. Given current SC specifications, however it may be possible to establish TCP/IP over USB connections to a SC, e.g. via a local link, SC-reader, NFC communication interface, etc. The SC may be equipped with a SCWS which is reachable by the external terminal.

4.5.2 Split-Terminal Scenarios

This section describes embodiments where the device containing the SC hosting the SCWS and OP applications may not be the same device which wants to access the RP website. In these embodiments, the SC may be used as an external authentication token. These split terminal embodiments may be combined with the different stakeholder models described herein.

4.5.2.1 Split Terminal with UICC in Mobile Device

FIG. 34 illustrates an example embodiment of a protocol flow for a split terminal. In one example embodiment, the user may own a mobile device, equipped with a UICC, with SCWS and OP installed. The user may use a device different than that mobile device to access the desired webpage at the RP, which may be referred to as the Browsing Agent (BA). When the BA visits the RP and submits the OpenID identifier to log in, the RP may redirect the BA to the OP, i.e. to the URL of the OP. The HTTP redirect message from the RP to the BA may contain necessary information, which may be needed for the OP application to calculate the signature on the assertion message. The contents of this message may be conveyed to the mobile and the OP on the SC. The OP may display the authentication page to the user on the mobile device and the user authorizes and authenticates the login. The OP may sign the assertion message. The signed assertion message may then be sent back to the RP, which may normally be done by the BA. The RP may then verify the signature and the user/BA is logged in at the RP.

In another example embodiment, involving the communication between the BA and the mobile device, it may be possible to establish a local link, e.g. via Bluetooth or WLAN between the two entities and register the device as the one which hosts the OP. The browser may then send the redirect to the mobile device via the local link which may forward it to the OP/SCWS. The OP may then ask the user for his credentials. The user may authenticate on his mobile device towards the OP, using whichever method is implemented for user authentication (e.g. password, PIN, biometrics). The OP may sign the assertion message and forwards it via the local link to the BA. The BA may then use this message to authenticate towards the RP. In this scenario, the BA may act as a MITM between the RP and the mobile device. Since the user may know that he initiated this OpenID session, he may be able to detect unauthorized requests on his mobile device.

Figure 35:
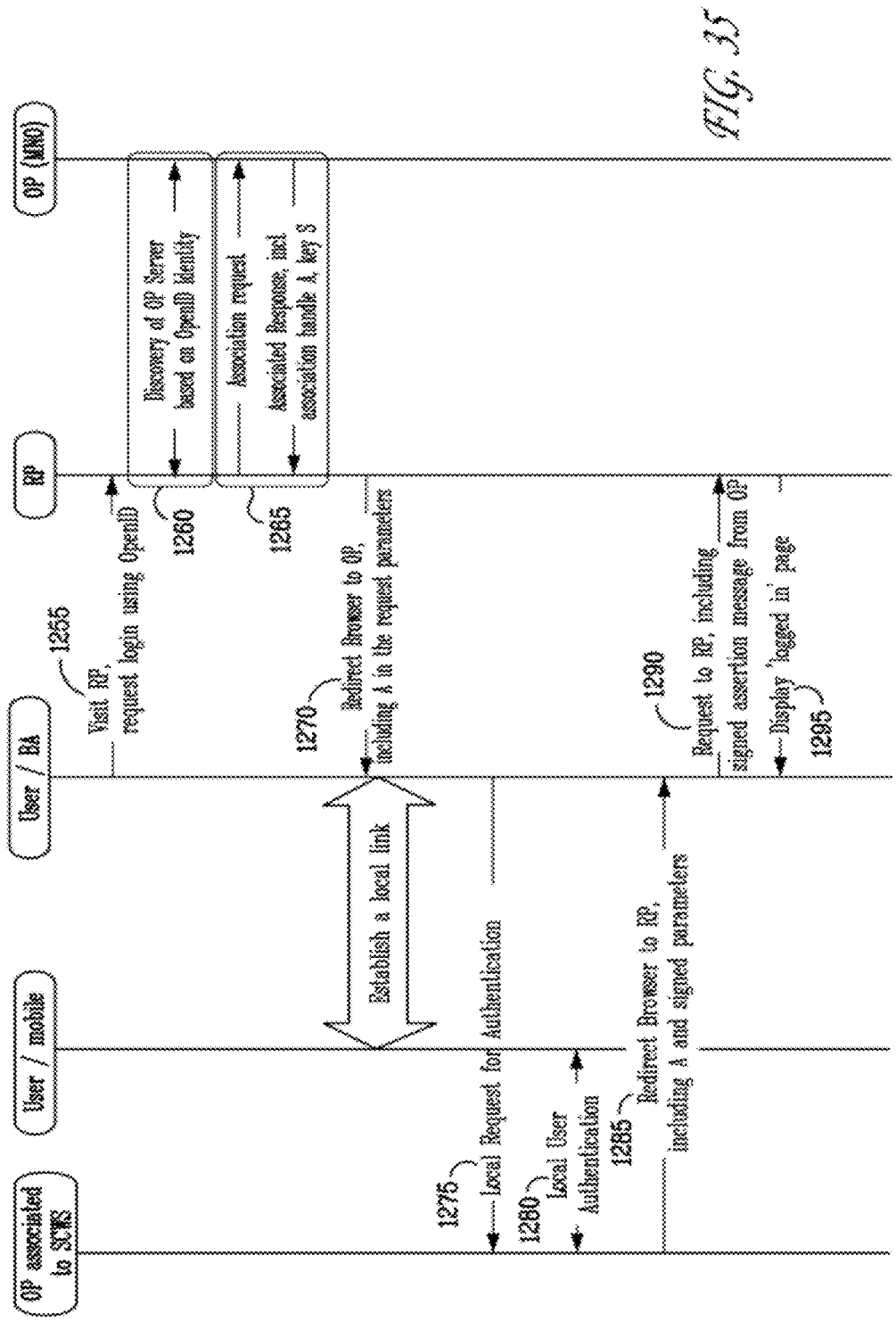
FIG. 35 illustrates an example embodiment including establishing a local link between the user and a browsing agent.

As shown in FIG. 35, at 1255 the BA may visit the RP and may request login using OpenID. At 1260, the RP may receive the login request and may initiate discovery of an OP server based on the OpenID identity with an OP (MNO). At 1265, the RP may transmit an association request to OP (MNO) and the OP (MNO) may transmit an association response. The association response may include an association handle A and a key S. The RP may redirect the browser to the OP associated to SCWS at 1270. The RP redirect may include A in the request parameters. The BA and the User may establish a local link.

At 1275, the BA may transmit a local request for authentication to the OP associated to SCWS. At 1280, local authentication may be established between the OP associated to SCWS and the User/mobile device.

At 1285, the OP associated to SCWS may redirect the BA to the RP. The direct may include association handle and may include signed parameters. The BA may transmit a request to the RP at 1290. The request may include the signed assertion message from the OP associated to SCWS. At 1295, the RP may enable the BA to display the logged in page.

4.5.2.2 Split Terminal with Smartcard in External Card Reader/NFC

In one example embodiment of a non-mobile SC deployment, the SC may be issued by a web-based OP or another third party (e.g. a bank). Similar steps as described in the mobile split-terminal case may apply. The establishment of the local link may then either be via an external smartcard reader or via a NFC (Near-field-communication) terminal attached to the computer. The interface may support HTTP messages which may be sent to the OP/SCWS implemented on the SC.

4.6 Trust Relations in OpenID

4.6.1 Trust Relations in the Existing OpenID

FIG. 35 illustrates Trust Relations in OpenID.

4.6.1.1 OpenID Protocol Step 1

Figure 36:
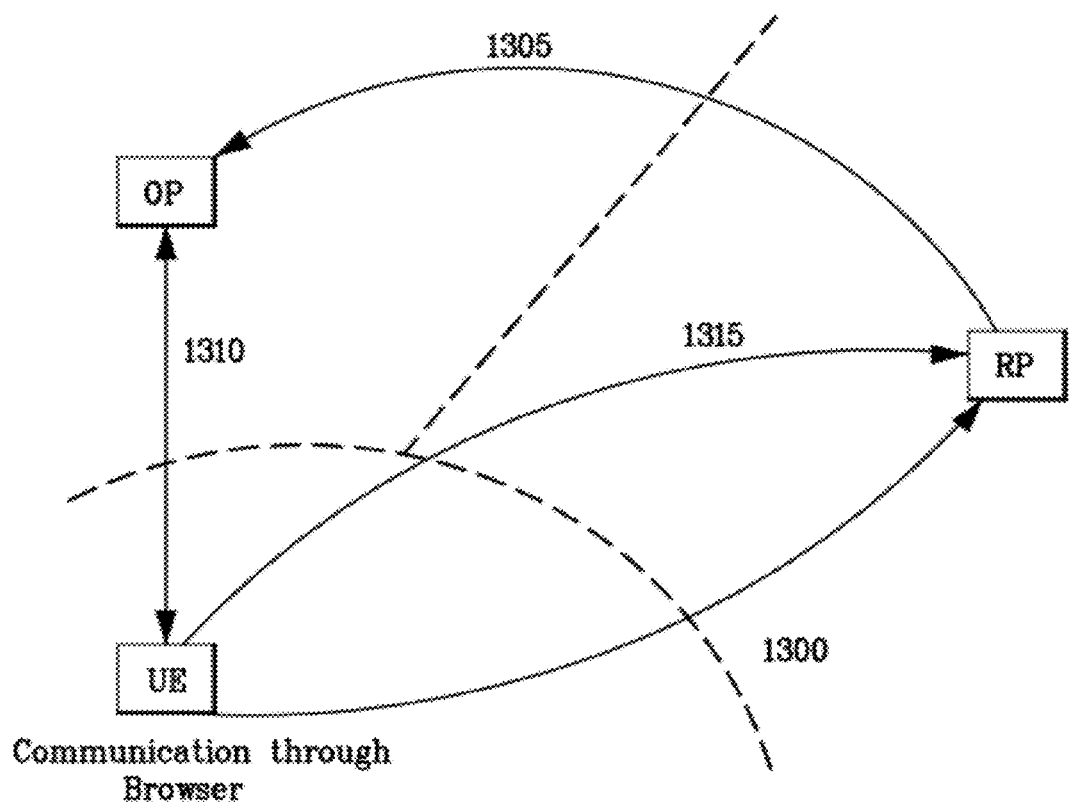
FIG. 36 illustrates Trust Relations in OpenID.

As shown in FIG. 36, at 1300, the user visits the RP website which allows him to access a service after logging in. If he decides to log in using OpenID, he is redirected to his OP. The user must trust the RP that the redirect is performed properly and not subject to a phishing attack. Furthermore, the user trusts the RP, that he will receive the service after being logged in and (for privacy reasons) that the RP will not reveal user interactions with the RP to third parties.

The user supplied OpenID\identifier enters the domain of the RP, and acts as a means to discover the correct OP for the RP as well as an identifier for the interaction between RP and the user. The RP only gains knowledge about this identifier and by resolving it, the RP gets to know the address of the OP.

From the OpenID specifications, discovery is the process where the Relying Party uses the Identifier to look up ("discover") the necessary information for initiating requests. OpenID Authentication has three paths through which to do discovery.

If the identifier is an XRI, [XRI_Resolution_2.0] (Wachob, G., Reed, D., Chasen, L., Tan, W., and S. Churchill, "Extensible Resource Identifier (XRI) Resolution V2.0-Committee Draft 02,") it will yield an XRDS document that contains the necessary information.

It should also be noted that Relying Parties can take advantage of XRI Proxy Resolvers. This will remove the need for the RPs to perform XRI Resolution locally.

If it is a URL, the Yadis protocol (Miller, J., "Yadis Specification 1.0,".) [Yadis] SHALL be first attempted. If it succeeds, the result is again an XRDS document. If the Yadis protocol fails and no valid XRDS document is retrieved, or no Service Elements (OpenID Service Elements) are found in the XRDS document, the URL is retrieved and HTML-Based discovery (HTML-Based Discovery) SHALL be attempted.

It is important to note that the discovery step can also provide an entry point for an attacker. An attacker could try to directly attack the RP, e.g. with a DNS Spoofing attack, to subvert the discovery step in a way which redirects the RP to a fake OP under attacker's control instead of the real OP. The RP would still think that it is the user's real OP, since the domain name is the same, although the host is another one. The flaw lies in the design of the OpenID protocol and protection against it seems to be out of scope of the OpenID specifications. This threat is also already captured in the Trusted OpenID document, where hints to some possible mitigation techniques are discussed.

4.6.1.2 OpenID Protocol Step 2

As shown in FIG. 36, at 1305, once the RP discovered the OP for the user, the RP establishes an association with the OP, which allows them to securely communicate via a shared key protected channel. The user identifier leaves the RP domain and enters the domain of the OP. While the OP will recognize that he really hosts a user identity with the given identifier, the OP also gets to know which site this user is now trying to access. If the establishment of the shared secret is not secured (the standard only defines Diffie-Hellman, which is MITM attackable) the OP cannot be sure that he is associated with the same RP as the user sees in his browser.

The user trusts the OP that he will not use the gathered information (e.g. which sites the user visited and how often) to build a user profile. Furthermore the user trusts the OP that he will not accept association requests from sites the user didn't visit (e.g. hidden login attempt to unknown sites by an attacker).

The RP trusts the OP that the OP will indeed authenticate the user and provide the RP with reliable information on the user's identity. In payment scenarios, where charging for RP services could be performed via the OP the RP would also trust the OP to provide the necessary means to perform this charging. e.g. in the case of MNO acting as OP in OpenID/GBA, the RP would recognize the OP as being run by a MNO which allows charging users via their phone bill. The RP then trusts the MNO-OP that charging is performed.

Since arbitrary OPs can be built and setup (e.g. OPs which don't authenticate users, and hence can be abused by spammers to give them an easy mechanism to create universal accounts to spam forums, blogs, etc.), RPs might want to limit access to a restricted set of OPs. Such a OP white/blacklisting approach is not specified in the OpenID protocol but can be implemented at the RP to protect from rogue OPs.

4.6.1.3 OpenID Protocol Step 3

As shown in FIG. 36, at 1310, the user is redirected to the OP page and performs authentication. The credentials leave the user domain and enter the OP domain. The interface between the user and the OP must hence be protected from eavesdropping. In typical scenarios a small protection is given by the use of HTTPS over HTTP. However, this does not protect against fake OPs with a valid certificate, given that users don't check the whole certificate chain.

The user trusts the OP that the OP does not misuse the credentials, i.e. the user does not expect his OP to be malicious. A malicious OP could easily access all services on behalf of its registered users. Hence, large OPs with a large user base become main targets for attackers, since a compromise of the OP would lead to immediate exposure of user credentials for all web services and compromised user identities.

As a result of the authentication phase, the user's browser is redirected to the RP with the assertion from the OP that he authenticated for the use of his identifier.

The compromise of a user identity can be of special concern, since OpenID identities are often used not only as a means to simplify access to different web services, but also as a means to build a reputation across multiple sites. Hence a reputable identity might be difficult to restore once the identifier has been abused.

4.6.1.4 OpenID Protocol Step 4

As shown in FIG. 36, at 1315, the user is redirected to the RP with the assertion from the OP. The RP gains enough information to trust the user (and OP) that authentication (of any type) has been performed and that the user knows the secret associated with the identifier. The RP does not gain any information or assurance about the authentication method being used between user and OP.

4.6.2 Embodiments for Trust Relations in Mobile Local OP 4.6.2.1 General

Figure 37:
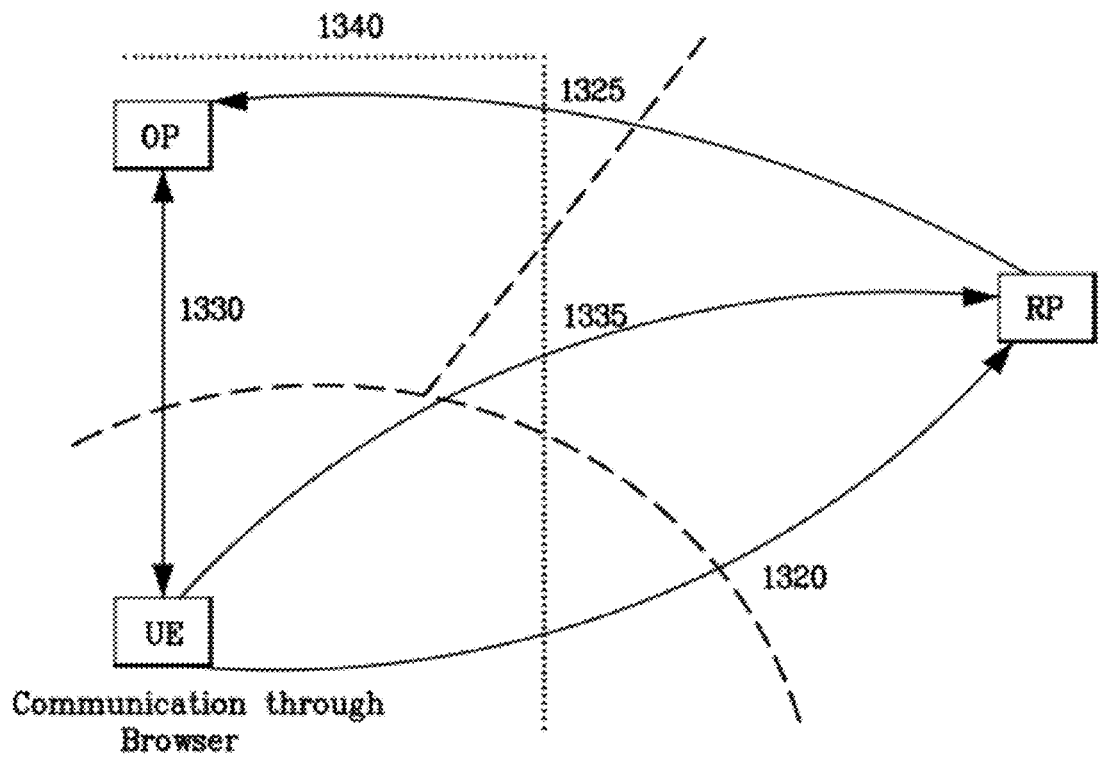
FIG. 37 illustrates an example embodiment for Trust Relations with a local OP.

FIG. 37 illustrates an example embodiment for Trust Relations with a local OP. In one example embodiment, if the OP becomes a local entity to the user, the OP and user domain may be considered as a single domain, identified by the dotted line 1340.

The user may perform authentication at 1330, which may reduce network load for the authentication procedure. The user may share his private data with a local entity giving him more control. The RP may need to contact the local OP directly if an association is to be built. This connection may not be needed for the OpenID protocol to work. Communication between the RP and OP may also be performed via indirect communication, i.e. via redirects using the user's browser.

The trust the RP may have in a local OP however depends on the amount of reliable information which may be derived from the assertion coming from the OP. In general, RPs accept every OP, but in security-demanding applications, RPs may restrict access to a set of OPs or OPs with given properties. The OP may then have to provide the RP with information on these properties. Such information may be conveyed from a local OP via a direct channel (e.g. the association channel) or via add-ons in the redirect message by indirect communication. In another example embodiment, such assertions about OP properties (e.g. being issued by a trustworthy MNO) may be derived from a TTP.

At 1325, the RP may proceed as described in 1305. At 1335, the UE may proceed as described in 1315. At 1320, the UE may proceed as described in 1300. In this scenario however, the user may perform local authentication in a variety of forms, without interaction over the Internet.

4.6.2.2 Trust Relations with MNO

Figure 38:
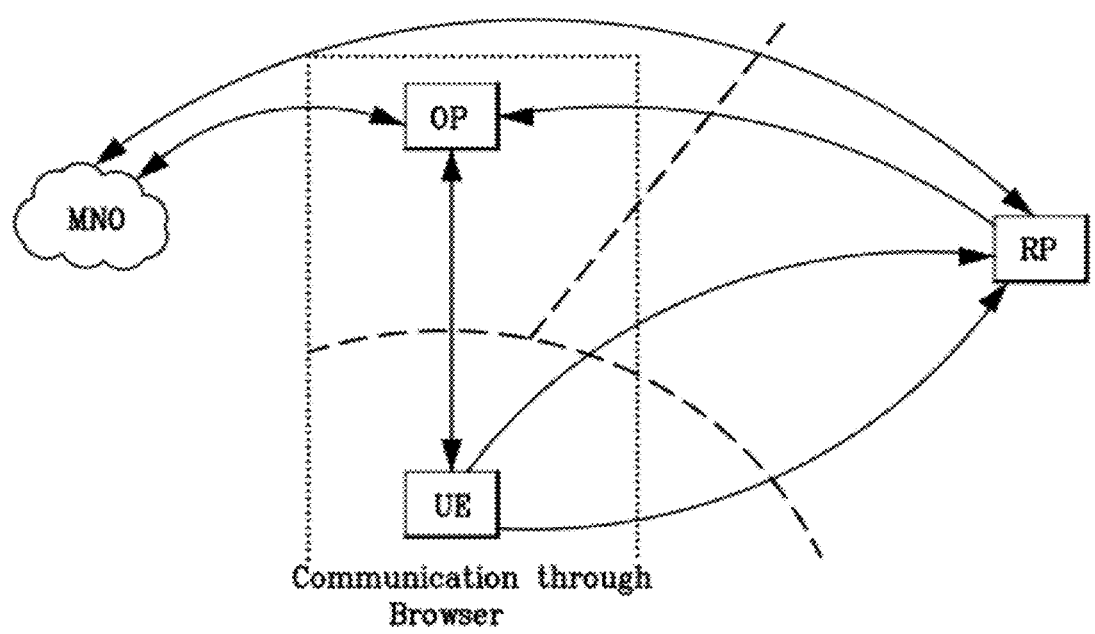
FIG. 38 illustrates an example embodiment for Trust Relations with a MNO.

FIG. 38 illustrates an example embodiment for Trust Relations with a local OP. As shown in FIG. 38, the MNO may have a direct relation to the OP since it runs on the smartcard. The RPs may have an indirect relation to the MNO, but in a standards-compliant OpenID protocol, they may not be required to establish such a relationship. RPs may need to establish a relation with the OP. For several reasons, e.g. billing via MNO, increased level of trust for the identities, etc. the RP may like to gain additional information on the identity of the user. Such trust may be based on the trust the RP has in the MNO.

Trust may be conveyed from the MNO via the OP to the RP. In an example embodiment, it may be assumed that the RP has a certain level of trust to the MNO (e.g. by reputation of the MNO, out-of-band processes like registration, service and contractual agreements). Additionally, it may be assumed that the RP may communicate with an entity of the MNO whenever needed and that this communication can be secured by appropriate means (e.g. IPSEC, HTTPS). It may also be assumed that the smartcard and (a server of) the MNO may have means to communicate in different ways according to needs.

The MNO may be involved in the discovery process, allowing the RP to establish a direct communication channel (association) with the OP by providing the RP with the current address of the OP. This may expose the services the user visits to the MNO, allowing him to generate a tracking profile of the user. Such a discovery may not be necessary if indirect via the user's browser is used.

If the MNO is involved in the OpenID protocol, the MNO may have several roles.

4.6.2.2.1 MNO as (direct) Trust Provider for the OP

Acting as a direct trust provider may mean that the MNO may be directly involved in the process of building trust between the OP and the RP. Such a direct involvement may assure the RP immediately that the identity asserted by the OP is registered with the MNO. If the MNO acts as a direct trust provider for the OP, several methods may be employed between OP, RP and a suitable service or a combination of existing services of the MNO:

a) Example Embodiment for Direct Connection between RP and MNO.

In one example, the MNO may provide a central service which may be reached by the RPs. The RP may not associate with the OP directly but via the MNO. The user's browser may be redirected to the local OP. After authenticating, the OP may send a message to the MNO stating that authentication succeeded. This message may be signed with a key issued by the MNO to the smartcard. The MNO may verify the signature, append its own signature and then forwards this message to the RP. The RP may receive two messages: an assertion from the OP that the user authenticated and a message from the MNO that the authentication has been performed by a valid OP. These messages may be combined in a single message from the MNO, such that the message contains the assertion that authentication took place successfully.

b) Example Embodiments for Indirect Communication Through OP.

In one example embodiment, the MNO may not want to provide such an external service to RPs; the communication may be conveyed indirectly through the OP. The trust may still be derived directly from a statement coming from the MNO, while the communication between RP and MNO may take place via the OP. The RP may redirect the browser to the OP with an additional field containing a nonce. The OP may then extract this field from the request and may forward it to the MNO. The MNO may sign it and the signed response may then be included in the assertion answer from the OP to the RP. This may also have the added benefit of hiding the service being accessed from the MNO, since the MNO may sign a nonce which is received from a known OP. If the real identity of the subscriber has to be revealed to the RP, the nonce may also be used as a session identifier, which then identifies the subscriber.

c) Example Embodiments for Combined Methods.

In one example embodiment, it may be possible to combine the communication types: The RP contacts the MNO and establishes a shared secret with the MNO in the association phase of the OpenID protocol when the user wants to log in to the RP using OpenID. The RP may then expect the OP to include this secret in the assertion message upon completed authentication. An option may be for the MNO to provide the RP with a signed statement by using a newly generated signing key which is generated in the MNO network and the smartcard using the GBA protocol. With the GBA protocol, the MNO may establish a secret with the smartcard, and both entities may sign the same statement. The OP may then include this signed statement in the assertion message to the RP. The RP may compare the signed statement from the MNO and the statement in the assertion message. The signed statement (or ticket) from the MNO may be generated on demand or it may be generated when the device first authenticates with the MNO and then stores this locally. When the device subsequently attempts to connect to a RP, the previously stored signed statement may be delivered to the RP.

The OpenID protocol may allow the RP to decide whether to establish an association with the OP (and hence shared secret) or to use the stateless protocol flow. Both modes of operation may be supported by the OP. If an association is used, a shared secret may be established for each RP and each OP. This means that a pre-shared statement between MNO and OP on the user's device may have to include this fresh secret between RP and MNO. What may be pre-shared (e.g. via GBA) between the device-OP and MNO is a signing key which is then used by both, the MNO and OP, to sign a secret/nonce on a per-session basis, where the nonce may be established between RP and MNO and forwarded to the OP by the MNO.

4.6.2.2.2 MNO as (indirect) Trust Provider for the OP

In one example embodiment, the MNO may also act as an indirect trust provider for the OP. As such, the MNO is not necessarily involved in the communication process during the OpenID authentication. In another example embodiment, the MNO may issue a certificate and key material to the smartcard, which may then be used to sign a field in the assertion message from OP to RP. The RP may then verify the signature and the certificate which assures him that the OP is derived from a trustworthy MNO. The verification of the certificate may take place without further involvement of the MNO, e.g. by a TTP.

4.6.2.2.3 MNO as Trust and Software Provider for the OP

In one example embodiment, the MNO may remotely download and manage an OP software package on the smartcard. For some solutions, e.g. the smartcard web server (SCWS) this management may be done via HTTPS management sessions between the SCWS and the MNO. The MNO may directly include secrets (e.g. credentials such as certified keys) to convey trust into the statements issued by the OP. The RP may then derive trust from the certified secrets. The MNO may even include a set of secrets in the OP software for use with different user identifiers. The RP may derive trust from OP software certificate issued by the MNO.

In one example embodiment, GBA may allow the MNO to establish a shared secret with the OP on the device. Since this secret may not be known to the RP, but the RP may have established a secure communication channel with the MNO, the MNO may forward this (GBA-derived) secret to the RP in the association channel, such that the RP may autonomously verify the OP assertion statement, which will be signed with the GBA-derived key.

In another example embodiment, after the GBA secret is established between the MNO and the OP, the MNO may ask for a nonce and RP ID from the RP, and, then, using the nonce and the RP ID, establish a further secret just for this particular RP and this particular session, out of the GBA secret, between it and the OP. This may be done, for example, to prevent re-use of the GBA-derived secret for the association with the RP, and exposure of the GBA-derived secret to the RP. Then, the MNO may forward this RP-and-session-specific secret to the RP. As in the first option, the RP may then be able to verify the OP signature on the assertion based on this session specific key.

4.7 Implementation on a Global Platform Smartcard

GP SCs may host multiple so-called security domains (SDs) whereby each SD may represent a stakeholder and may be able to store keys and install and personalize applications for that stakeholder. The main SD may be the issuer SD, which belongs to the card issuer. SDs may be organized in a hierarchy and SDs may have different privileges to manage content inside their hierarchy. The issuer SD may have Authorized Management (AM) privilege which means that it has autonomous control over the card and is able to install and delete SDs in its hierarchy. Other SDs may be given AM only if they reside in a separate hierarchy on the card. If the SD is in the same hierarchy, the SD may get Delegated Management (DM) privilege which allows the SD to manage card content in its sub-hierarchy. All actions performed by this SD may be authorized by the issuer by tokens which are presented to the Issuer SD by the DM SD and checked by the Issuer SD.

Applications in a GP SC which reside in different SDs may be able to communicate using the concept of Trusted Path (TP). TP may be a privilege which must be assigned to the applications and allows them to exchange commands via the GP Open API. Applications may otherwise be separated on a GP SC.

Figure 39:
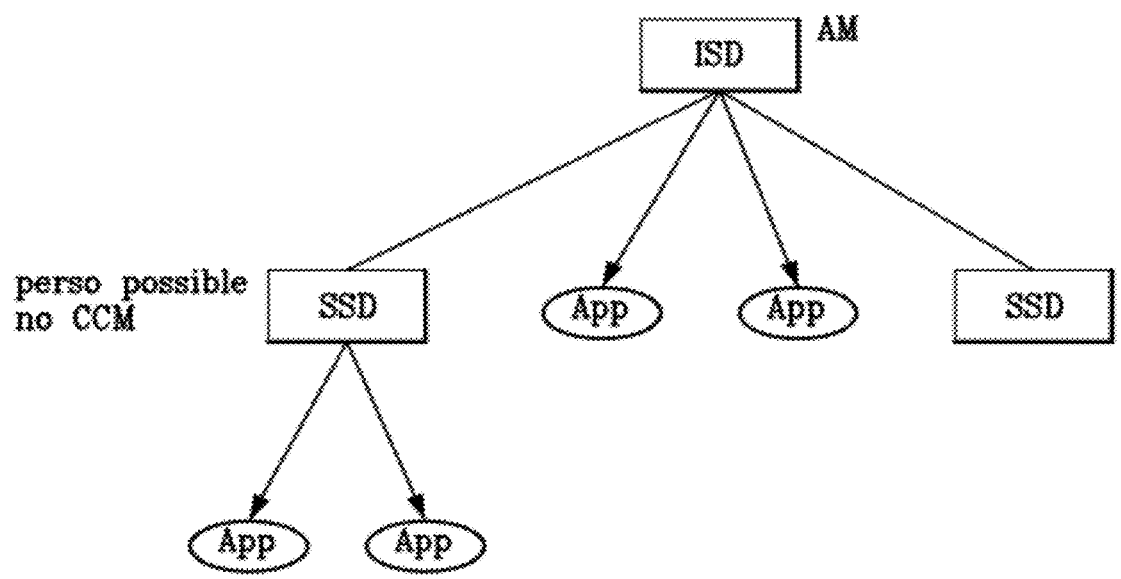
FIG. 39 illustrates an example embodiment of a SD hierarchy with an issuer SD.

FIG. 39 illustrates an example embodiment of a SD hierarchy with an issuer SD.

Figure 40:
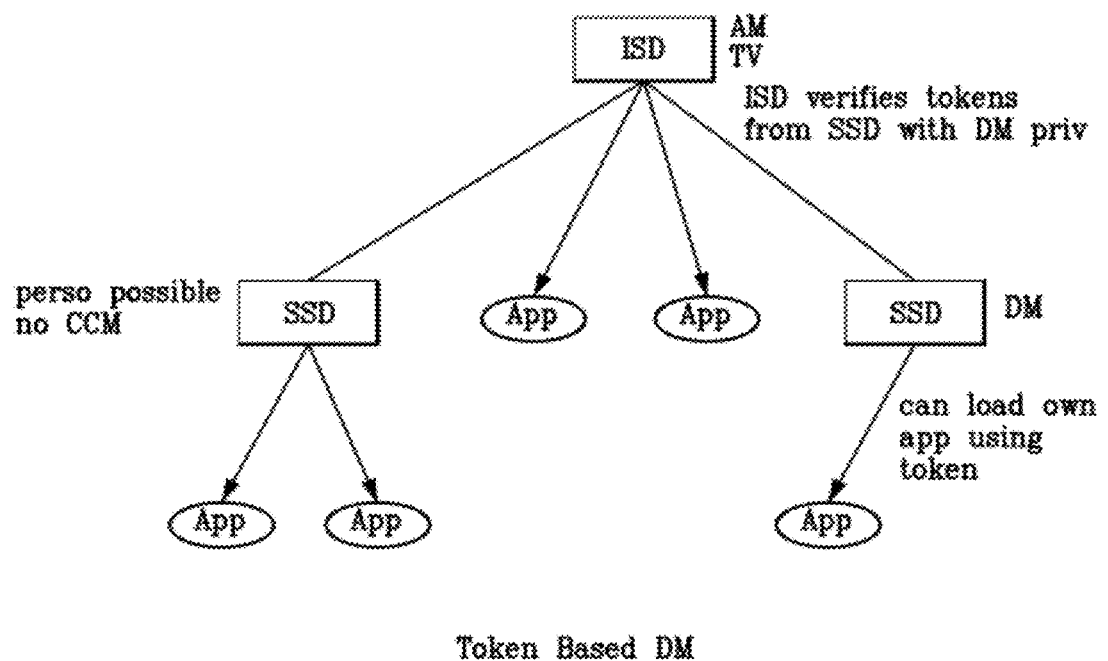
FIG. 40 illustrates an example embodiment of a SD hierarchy with DM.

FIG. 40 illustrates an example embodiment of a SD hierarchy with DM.

4.7.2 Implementation Options for Embodiment

Depending on how the SCWS may be implemented on the SC, enabling different stakeholder models may be utilized.

4.7.2.1 Embodiments for SCWS as GP Application

Figure 41:
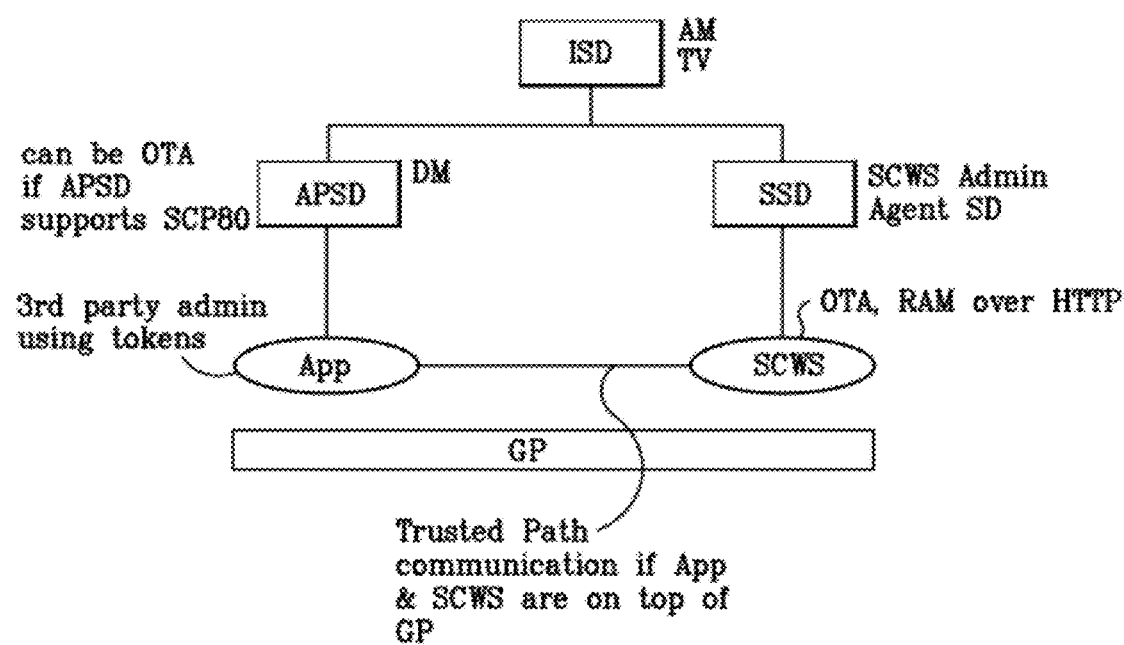
FIG. 41 illustrates an example embodiment for SCWS as GP application.

FIG. 41 illustrates an example embodiment for SCWS as GP application. In one example embodiment, the SCWS may be implemented as an application in an own SD as a GP application, e.g. owned by the SC issuer, the MNO model and the 3rd party OP model as well as the non-MNO model may be supported. We assume that the application logic of the OP may reside in a different SD as a different application and therefore may be owned and managed by a different entity than the one owning the SCWS application and domain. Both applications may communicate using Trusted Path capabilities. The 3rd party and the card issuer have to agree on a business relationship to implement this scenario, e.g. to grant the right privileges to the SDs and applications.

The application provider (3rd party OP) SD may be equipped with DM privileges and may manage the OP application. SCWS management may be performed by the card issuer via the SCWS admin agent SD, which normally supports OTA management capabilities, e.g. RAM over HTTP. If the APSD also supports the SCP80 protocol, the application and content may be managed OTA by the 3rd party, using DM tokens.

Figure 42:
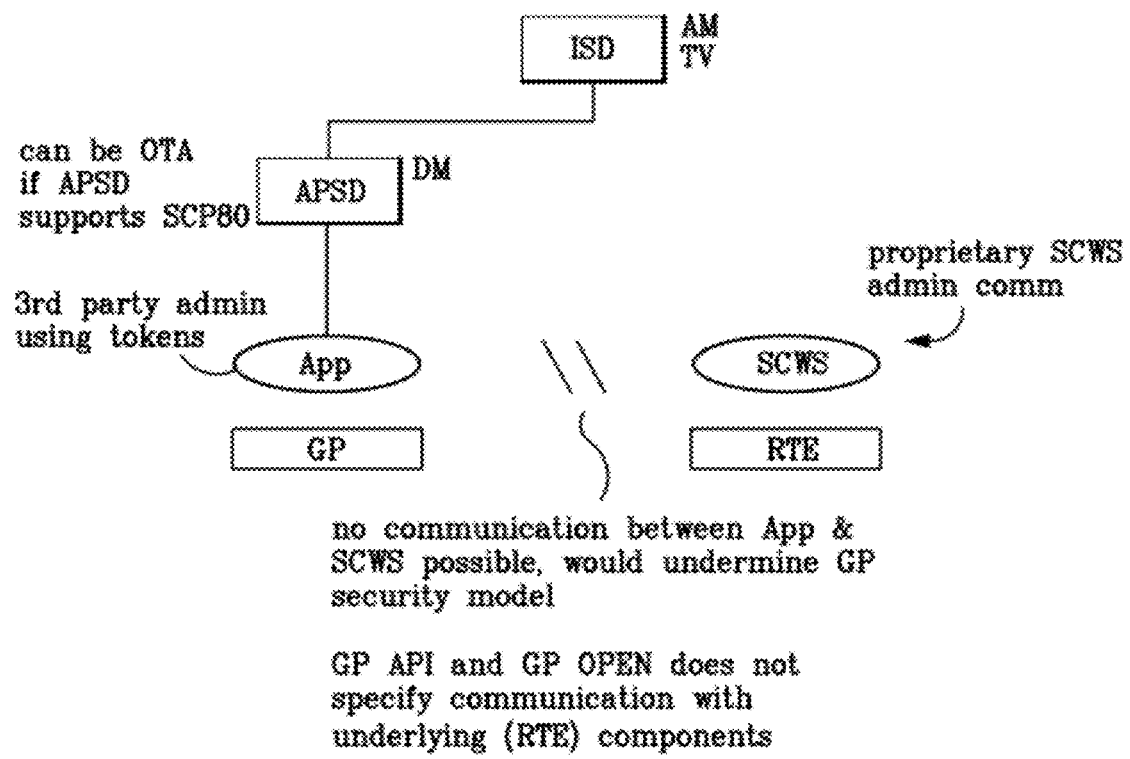
FIG. 42 illustrates an example embodiment for SCWS implemented in the Runtime Environment of a Card.

4.7.2.2 Case 2: SCWS Implemented in the Runtime Environment (RTE) of the Card FIG. 42 illustrates an example embodiment for SCWS implemented in the Runtime Environment of a Card. In one example embodiment, SCWS may be implemented in the RTE of the card, by the SC manufacturer, there may not be a way for a 3rd party application to communicate with the SCWS, since the access to the SCWS would not be exposed through the GP framework. Hence, the stakeholder model of a 3rd party OP may not be supported. However, the MNO model and the non-mobile model are supported.

4.8 Implementation of the OP on Platforms Other than SCWS

4.8.1 Using JavaCard as a Platform

On Java Cards, a Java runtime environment may be installed which allows interoperability of SIM card applications across different SIM cards (and vendors).

In one example embodiment, a JavaCard platform may be used to enable the MNO to create and deploy the applet OTA to Java Cards.

4.8.2 Embodiments for Using an Embedded Secure Element

As describe above, an embedded local OP application in a device which belongs to the user or is under a certain level of user control may be implemented in a smartcards. With the increasing spread of embedded security solutions in mobile devices, there may be multiple, different execution environments which provide different security properties. The design of an OP on a smartcard may be extended to other (embedded) security elements, which may allow the secure execution of code and secure storage of credentials. Furthermore, the execution environment may have to provide communication channels to the outside environment, especially for the OP—user authentication interaction, the OP—browser communication (HTTP(s) based) and the OP—RP association and assertion messages (also HTTP(s) based).

In one example embodiment, existing security environments which are already available inside mobile phones (e.g. Trust Zone, etc.) to provide a Trusted Execution Environment (TEE) for the OP software on the device may be utilized.

The smartcard may represent a key asset of MNOs as it may be considered to be under control of the MNO. In an implementation of an OP on an embedded execution environment, especially embodiment in which the MNO establishes a shared secret with the local OP, the MNO may need means to verify the security properties of the execution environment. Such means may include, but are not limited to:

Capabilities to perform integrity measurements of the Execution environment

Communication to report integrity measurements

Need for (integrity) verification of the device's Execution Environment, turning it into a Trusted Execution Environment (TEE)

Download/Provisioning protocols/processes for the OP from the MNO network into the embedded TEE Communication capabilities of the TEE; the OP must be able to communicate with the RP and the user (and the MNO)

In some example embodiments (on smartcard or inside a TEE), the MNO may gain additional information on user behavior (e.g. RPs the user visits, login frequencies, user behavior, etc.). In privacy demanding scenarios, e.g. corporate environments, where the company wants to hide user behavior from the MNO, it may be beneficial to not involve the MNO at large extent.

In another example embodiment, if embedded security features for the execution of the local OP implementation are used, the MNO may not be involved in the OpenID process. This may allow the user to autonomously set up, manage and maintain the OP installation inside the TEE of his device. In such a scenario, it may be unlikely that the OP would be able to share secrets with the MNO, since it may be assumed, that the MNO may lack trust in the OP implementation. However, there may be a local trust relationship between the user and his device. The user may trust the OP implementation not to leak any private, personal data to third parties. The increase in privacy may be bought at the cost of less trust in the OP from RPs, since the MNO may issue no assertions on the OP implementation.

4.8.3 Integration of Concepts from Trusted OpenID Innovation

In one example embodiment, the OP may be implemented on a smartcard. An assessment on device integrity may be included and may introduce the requirement for the device to be able to measure and report integrity. For devices which may support integrity verification/reporting towards the MNO, the MNO may first check the integrity of the device and the installation/runtime environment of the OP. The MNO may then trigger the (remote) software installation procedure for the OP software. Furthermore, the MNO may equip the OP application with reference values for the device. The OP may then check the reported measurements during OpenID authentication against these reference values and may allow authentication if integrity checks pass successfully.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A user environment for enabling authentication of a user attempting to access a service from a third party, the user environment comprising:
a user interface configured to:
communicate with the third party using a protocol to request access to the service provided by the third party; and
receive an association handle; and
a processor configured to:
establish a secret with an identity provider;
perform a local authentication of the user within the user environment; and
use the secret to generate a signed assertion that indicates to the third party a result of the user authentication, wherein the secret is configured to enable the third party to verify an authenticity of the signed assertion based on a key received from the identity provider and to allow the user to access the service provided by the third party,
wherein the user interface is further configured to transmit the signed assertion and the association handle to the third party.

2. The user environment of claim 1, wherein the user interface is further configured to receive an indication from the third party that the third party wishes to authenticate the user.

3. The user environment of claim 1, wherein the user interface is further configured to receive a redirection message from the third party, the redirection message being configured to instruct the user interface to authenticate the user.

4. The user environment of claim 1, wherein the user interface is further configured to receive user credentials from the user.

5. The user environment of claim 1, wherein the processor is a trusted computing environment.

6. The user environment of claim 5, wherein the user interface is protected in whole or part by the trusted computing environment.

7. The user environment of claim 5, wherein the trusted computing environment is further configured to transmit an authentication response to the third party when the user has been authenticated.

8. The user environment of claim 5, wherein the trusted computing environment is one of a Universal Integrated Circuit Card (UICC), a subscriber identity module (SIM), a machine to machine (M2M) device, a smart card, a java card, a GlobalPlatform smart card, or a secure integrated chip card (ICC).

9. The user environment of claim 5, wherein the trusted computing environment is implemented using a smart card web server.

10. The user environment of claim 5, wherein the trusted computing environment shares a secret with an OpenID provider (OP).

11. The user environment of claim 10, wherein the trusted computing environment is further configured to calculate a signature based on the shared secret with the OP and provide the signature to the third party via the user interface to allow the third party to verify credentials of the trusted computing environment.

12. The user environment of claim 10, wherein the trusted computing environment is further configured to calculate a signature based on the shared secret with the OP and provide the signature to the OP via the user interface to allow the OP to verify credentials of the trusted computing environment.

13. The user environment of claim 5, wherein the trusted computing environment is further configured to calculate a signature and provide the signature to the third party via the user interface to allow the third party to verify credentials of the trusted computing environment.

14. The user environment of claim 5, wherein the trusted computing environment is further configured to calculate a signature and provide the signature to an OpenID provider (OP) via the user interface to allow the OP to verify credentials of the trusted computing environment.

15. The user environment of claim 5, wherein the trusted computing environment is further configured to establish a shared secret with an OpenID provider (OP) via the user interface.

16. The user environment of claim 15, wherein the user interface is further configured to receive an authentication request from the third party that includes an association handle and provide the association handle to the trusted computing environment.

17. The user environment of claim 16, wherein the trusted computing environment is further configured to generate a signature based upon the shared secret with the OP and generate an authentication response that includes the signature and the association handle.

18. The user environment of claim 17, wherein the user interface is further configured to provide the authentication response generated by the trusted computing environment to the third party.

19. The user environment of claim 1, wherein the processor is further configured to generate a signature and receive a signature assertion message from an OpenID provider (OP).

20. The user environment of claim 19, wherein the processor is further configured to transmit a signature response message to the third party.

21. The user environment of claim 1, wherein the user interface and the processor are on the same device.

22. The user environment of claim 1, wherein the user interface and the processor are on separate devices.

23. The user environment of claim 1, wherein the user is authenticated by verifying the user through a password or PIN code, a biometric identity, a token or combinations thereof.

24. A method for authenticating a user attempting to access a service from a third party, the method comprising:
receiving an indication from the third party via a user interface that the third party wishes to authenticate the user, the indication including an association handle;
establishing a secret with an identity provider;
receiving user credentials from the user through the user interface;
locally authenticating the user at a user device with the received user credentials;
generating a signed assertion using the secret, wherein the signed assertion indicates to the third party a result of the user authentication, and wherein the secret is configured to enable the third party to verify an authenticity of the signed assertion based on a key received from the identity provider; and
transmitting the signed assertion and the association handle to the third party to allow the user to access the service provided by the third party.

25. The method of claim 24, wherein the indication is a redirection message.

26. The method of claim 25, wherein the redirection message instructs the user interface to use a trusted computing environment to authenticate the user.

27. The method of claim 24, wherein authenticating the user is performed via a trusted computing environment.

28. The method of claim 27, wherein the trusted computing environment is one of a universal integrated circuit card (UICC), a subscriber identity module (SIM), a machine to machine (M2M) device, a smart card, a java card, a global platform smartcard, or secure integrated chip card (ICC).

29. The method of claim 27, wherein authenticating the user with the trusted computing environment occurs through the use of a secure web server.

30. The method of claim 27, further comprising establishing a shared secret with the third party via the user interface.

31. The method of claim 30, further comprising generating a signature based upon the shared secret and generating an authentication response that includes the signature and the association handle.

32. The method of claim 31, further comprising receiving a signature assertion message from the third party.

33. The method of claim 32, further comprising transmitting a signature response message to the third party.

34. The method of claim 27, further comprising calculating a signature and providing the signature to an OpenID provider (OP) via the user interface to allow the OP to verify credentials of the trusted computing environment.

35. The method of claim 34, further comprising establishing a shared secret with the OP via the user interface.

36. The method of claim 35, further comprising receiving an association handle from the trusted computing environment and transmitting the association handle to the OP.

37. The method of claim 36, further comprising generating a signature based upon the shared secret and generating an authentication response that includes the signature and the association handle.

38. The method of claim 37, further comprising receiving a signature assertion message from the OP.

39. The method of claim 38, further comprising transmitting a signature response message to the OP.

40. The method of claim 24, wherein the signed assertion is transmitted when the user has been authenticated.

41. The method of claim 24, further comprising sharing a shared secret with an open management security provider associated with a mobile network operator (MNO).

42. The method of claim 24, further comprising sharing a shared secret with an OpenID provider associated with a mobile network operator (MNO).

43. The method of claim 24, wherein authenticating the user is performed by verifying the user through a password or PIN code, a biometric identity, a token or combinations thereof.

* * * * *